(12) United States Patent
Hashimoto et al.

(10) Patent No.: US 10,827,101 B2
(45) Date of Patent: Nov. 3, 2020

(54) COLOR INSPECTION DEVICE TO CORRECT COLOR READINGS OF A COLOR DETECTION OBJECT USING CORRECTION COEFFICIENTS

(71) Applicants: Hideki Hashimoto, Tokyo (JP); Masamoto Nakazawa, Kanagawa (JP); Manabu Komatsu, Tokyo (JP); Yoshio Konno, Kanagawa (JP)

(72) Inventors: Hideki Hashimoto, Tokyo (JP); Masamoto Nakazawa, Kanagawa (JP); Manabu Komatsu, Tokyo (JP); Yoshio Konno, Kanagawa (JP)

(73) Assignee: Ricoh Company, Ltd., Toyko (JP)

( * ) Notice: Subject to any disclaimer, the term of this patent is extended or adjusted under 35 U.S.C. 154(b) by 0 days.

(21) Appl. No.: 16/374,146

(22) Filed: Apr. 3, 2019

(65) Prior Publication Data

US 2019/0327387 A1    Oct. 24, 2019

(30) Foreign Application Priority Data

Apr. 24, 2018    (JP) .................................. 2018-083447

(51) Int. Cl.
*H04N 1/00* (2006.01)
*H04N 1/60* (2006.01)

(52) U.S. Cl.
CPC ......... *H04N 1/605* (2013.01); *H04N 1/00013* (2013.01); *H04N 1/00037* (2013.01); *H04N 1/00087* (2013.01); *H04N 1/6038* (2013.01); *H04N 1/6055* (2013.01); *H04N 1/6097* (2013.01)

(58) Field of Classification Search
CPC ............... H04N 1/605; H04N 1/00087; H04N 1/00037; H04N 1/6097; H04N 1/6038; H04N 1/00013; H04N 1/6055; H04N 9/3182

See application file for complete search history.

(56) References Cited

U.S. PATENT DOCUMENTS

| 5,831,751 A | 11/1998 | Ohneda et al. |
| 6,005,970 A | 12/1999 | Ohneda et al. |

(Continued)

FOREIGN PATENT DOCUMENTS

| JP | 2008-078798 | 4/2008 |
| JP | 2014-175710 | 9/2014 |
| JP | 2015-146493 | 8/2015 |

OTHER PUBLICATIONS

U.S. Appl. No. 16/255,872, filed Jan. 24, 2019, Ryohma Ikemoto, et al.

(Continued)

*Primary Examiner* — Juan M Guillermety
(74) *Attorney, Agent, or Firm* — Oblon, McClelland, Maier & Neustadt, L.L.P.

(57) ABSTRACT

A color inspection device includes a reading device and circuitry. The reading device images a reference object and a color detection object to obtain readings of each of the reference object and the color detection object. The circuitry corrects the readings of the color detection object by using a correction coefficient that is generated from the readings of the reference object and color information measured for each arbitrary region of the reference object.

18 Claims, 41 Drawing Sheets

(56) References Cited

U.S. PATENT DOCUMENTS

| | | | |
|---|---|---|---|
| 6,016,359 A | 1/2000 | Komatsu | |
| 7,003,176 B1 | 2/2006 | Suzuki et al. | |
| 2001/0019427 A1 | 9/2001 | Komatsu | |
| 2004/0004644 A1 | 1/2004 | Komatsu et al. | |
| 2005/0008258 A1 | 1/2005 | Suzuki et al. | |
| 2005/0146737 A1* | 7/2005 | Ono | H04N 1/6033 358/1.9 |
| 2005/0237544 A1 | 10/2005 | Suzuki et al. | |
| 2007/0013927 A1 | 1/2007 | Miyahara et al. | |
| 2007/0070438 A1 | 3/2007 | Yoshida et al. | |
| 2007/0076274 A1* | 4/2007 | Higashitani | H04N 1/00013 358/504 |
| 2007/0086068 A1 | 4/2007 | Ohkawa et al. | |
| 2007/0188638 A1 | 8/2007 | Nakazawa et al. | |
| 2008/0037036 A1 | 2/2008 | Togami et al. | |
| 2008/0186533 A1 | 8/2008 | Komatsu et al. | |
| 2008/0252787 A1 | 10/2008 | Nakazawa et al. | |
| 2008/0309994 A1 | 12/2008 | Komatsu | |
| 2009/0086295 A1* | 4/2009 | Murakami | H04N 1/6097 358/518 |
| 2010/0027061 A1 | 2/2010 | Nakazawa | |
| 2010/0171998 A1 | 7/2010 | Nakazawa | |
| 2011/0007372 A1* | 1/2011 | Shimizu | H04N 1/00087 358/518 |
| 2011/0026083 A1 | 2/2011 | Nakazawa | |
| 2011/0051201 A1 | 3/2011 | Hashimoto et al. | |
| 2011/0063488 A1 | 3/2011 | Nakazawa | |
| 2012/0147389 A1* | 6/2012 | Ishihara | H04N 1/00087 358/1.2 |
| 2012/0224205 A1 | 9/2012 | Nakazawa | |
| 2013/0063792 A1 | 3/2013 | Nakazawa | |
| 2014/0029065 A1 | 1/2014 | Nakazawa | |
| 2014/0204427 A1 | 7/2014 | Nakazawa | |
| 2014/0204432 A1 | 7/2014 | Hashimoto et al. | |
| 2014/0211273 A1 | 7/2014 | Konno et al. | |
| 2014/0268260 A1* | 9/2014 | Kitai | H04N 1/6038 358/521 |
| 2014/0368893 A1 | 12/2014 | Nakazawa et al. | |
| 2015/0002907 A1* | 1/2015 | Ukishima | H04N 1/6097 358/3.24 |
| 2015/0098117 A1 | 4/2015 | Marumoto et al. | |
| 2015/0116794 A1 | 4/2015 | Nakazawa | |
| 2015/0163378 A1 | 6/2015 | Konno et al. | |
| 2015/0172514 A1 | 6/2015 | Komatsu | |
| 2015/0222790 A1 | 8/2015 | Asaba et al. | |
| 2015/0304517 A1 | 10/2015 | Nakazawa et al. | |
| 2016/0003673 A1 | 1/2016 | Hashimoto et al. | |
| 2016/0006961 A1 | 1/2016 | Asaba et al. | |
| 2016/0088179 A1 | 3/2016 | Nakazawa et al. | |
| 2016/0112660 A1 | 4/2016 | Nakazawa et al. | |
| 2016/0119495 A1 | 4/2016 | Konno et al. | |
| 2016/0173719 A1 | 6/2016 | Hashimoto et al. | |
| 2016/0219163 A1 | 7/2016 | Shirado et al. | |
| 2016/0248942 A1* | 8/2016 | Horita | H04N 1/6033 |
| 2016/0268330 A1 | 9/2016 | Nakazawa et al. | |
| 2016/0295138 A1 | 10/2016 | Asaba et al. | |
| 2016/0373604 A1 | 12/2016 | Hashimoto et al. | |
| 2017/0019567 A1 | 1/2017 | Konno et al. | |
| 2017/0163836 A1 | 6/2017 | Nakazawa | |
| 2017/0170225 A1 | 6/2017 | Asaba et al. | |
| 2017/0201700 A1 | 7/2017 | Hashimoto et al. | |
| 2017/0244853 A1 | 8/2017 | Yabuuchi et al. | |
| 2017/0295298 A1 | 10/2017 | Ozaki et al. | |
| 2017/0302821 A1 | 10/2017 | Sasa et al. | |
| 2017/0324883 A1 | 11/2017 | Konno et al. | |
| 2017/0353613 A1* | 12/2017 | Morikawa | H04N 1/00602 |
| 2018/0013924 A1 | 1/2018 | Komatsu | |
| 2018/0139345 A1 | 5/2018 | Goh et al. | |
| 2018/0146150 A1 | 5/2018 | Shirado et al. | |
| 2018/0175096 A1 | 6/2018 | Inoue et al. | |
| 2018/0213124 A1 | 7/2018 | Yokohama et al. | |
| 2018/0261642 A1 | 9/2018 | Asaba et al. | |
| 2019/0297226 A1* | 9/2019 | Ohkubo | H04N 1/6033 |

OTHER PUBLICATIONS

U.S. Appl. No. 16/269,592, filed Feb. 7, 2019, Masamoto Nakazawa, et al.
U.S. Appl. No. 16/135,578, filed Sep. 19, 2018, Daisuke Nikaku, et al.
U.S. Appl. No. 16/153,936, filed Oct. 8, 2018, Manabu Komatsu.
U.S. Appl. No. 08/359,146, filed Dec. 19, 1994, Manabu Komatsu.

* cited by examiner

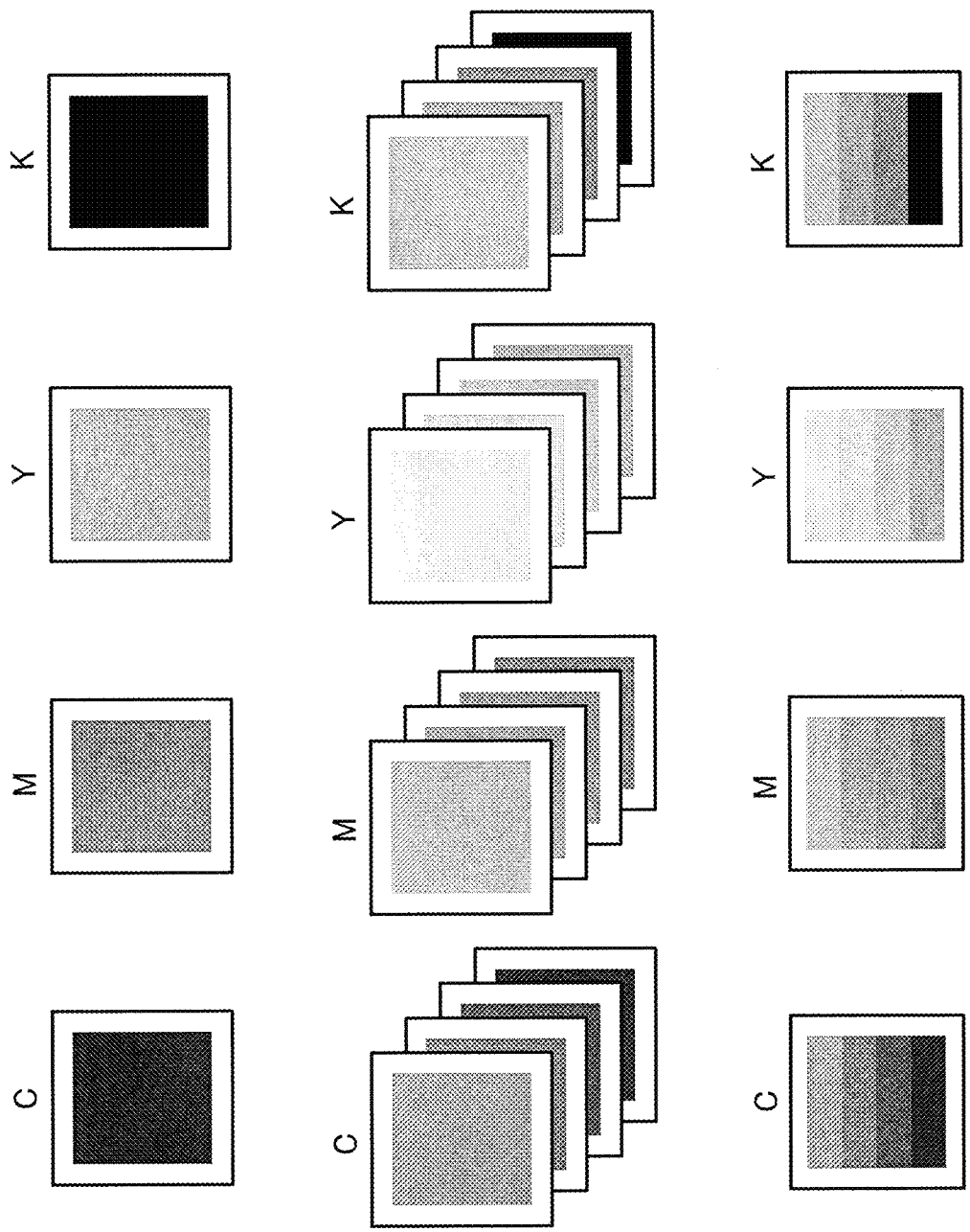

REFERENCE BOARD

COLOR DETECTION CHART

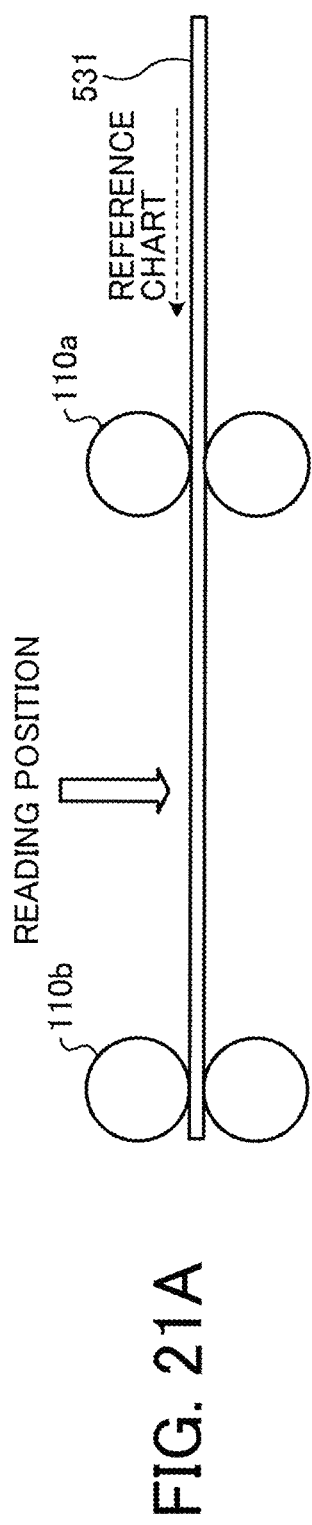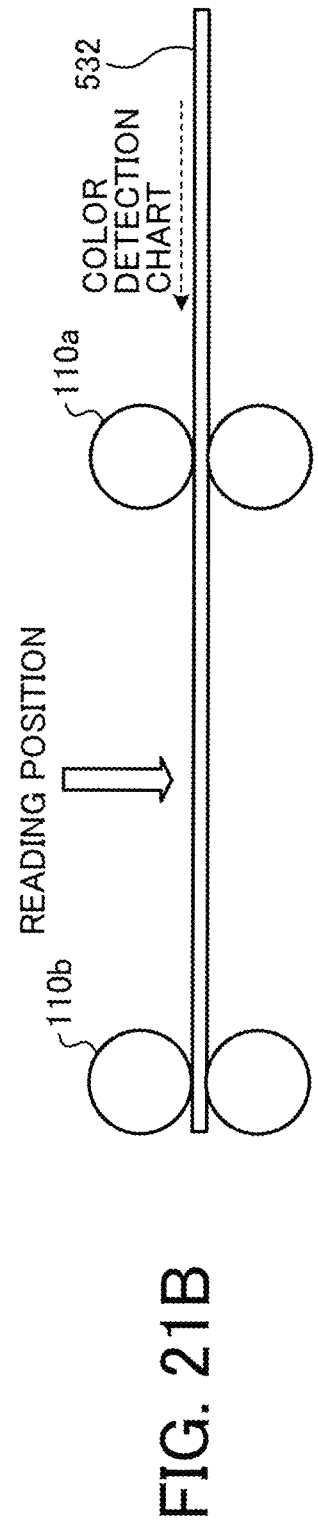

APPARATUS A

MAIN-SCANNING DIRECTION

APPARATUS B

MAIN-SCANNING DIRECTION

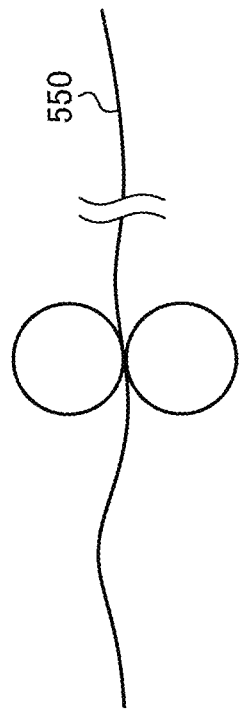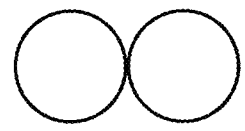
FIG. 44A
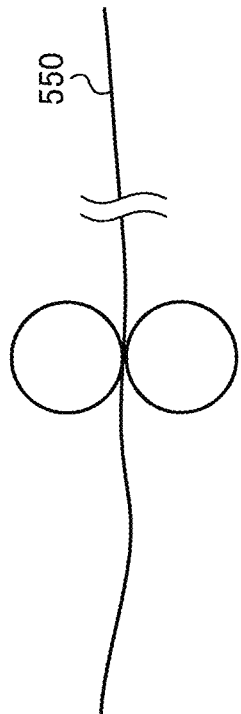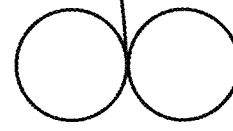
FIG. 44B
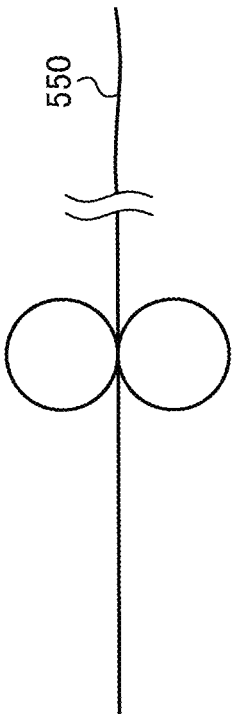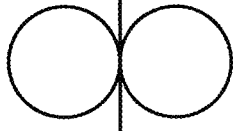
FIG. 44C

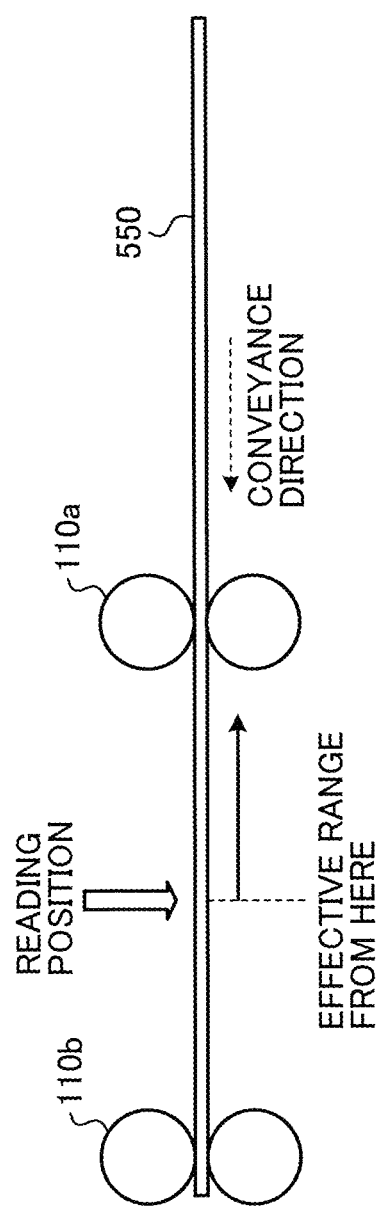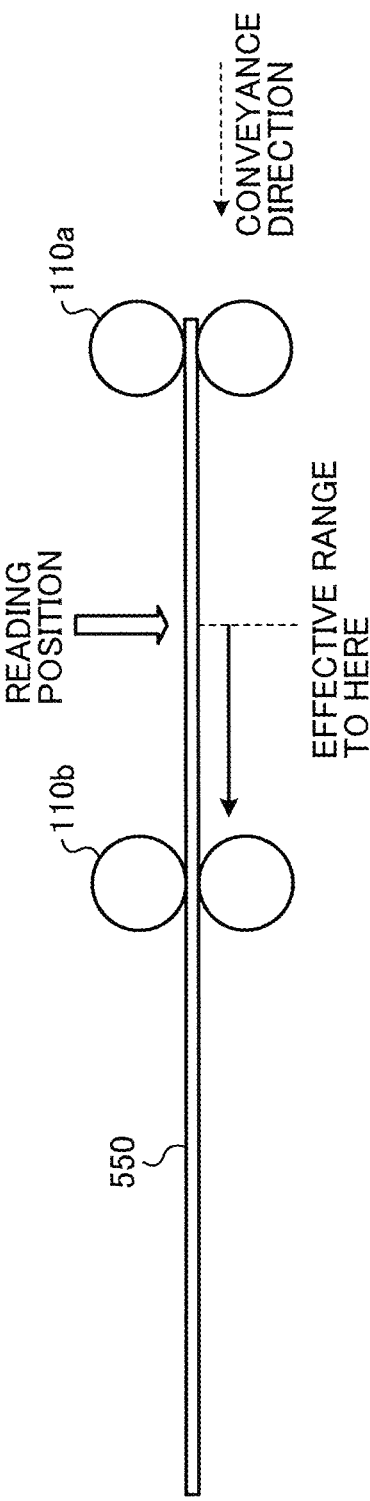

COLOR INSPECTION DEVICE TO CORRECT COLOR READINGS OF A COLOR DETECTION OBJECT USING CORRECTION COEFFICIENTS

CROSS-REFERENCE TO RELATED APPLICATION

This patent application is based on and claims priority pursuant to 35 U.S.C. § 119(a) to Japanese Patent Application No. 2018-083447, filed on Apr. 24, 2018, in the Japan Patent Office, the entire disclosure of which is hereby incorporated by reference herein.

BACKGROUND

Technical Field

Aspects of the present disclosure relate to a color inspection device, an image forming apparatus, a color inspection method, and a recording medium.

Related Art

In a production printing field in which high color stability of a printing image is required, in order to suppress a color deviation in the printing image and to uniform the printing image, a technology of providing an image reading unit in an image forming apparatus, of detecting a color deviation in a printing image, and of feeding back a result to a printing mechanism, is known. In the image reading unit used in such a technology, it is general that a reading system such as a scanner is used, a reading target is exposed by a light emitting diode (LED) light source, and reflection light is read by a line sensor. Then, a shading correction coefficient of the image reading unit is determined by reading a white reference board, and a printing sheet conveyed to a reading position, is read, and thus, normalized image data is obtained. However, in shading correction using the white reference board, there is a case where a characteristic difference which is not capable of being corrected, remains, and in a situation where a high detection accuracy is required, a detection error due to the characteristic difference is not capable of being allowed.

SUMMARY

In an aspect of the present disclosure, there is provided a color inspection device that includes a reading device and circuitry. The reading device images a reference object and a color detection object to obtain readings of each of the reference object and the color detection object. The circuitry corrects the readings of the color detection object by using a correction coefficient that is generated from the readings of the reference object and color information measured for each arbitrary region of the reference object.

In another aspect of the present disclosure, there is provided a color inspection method that includes imaging and correcting. The imaging images a reference object and a color detection object to obtain readings of each of the reference object and the color detection object. The correcting corrects the readings of the color detection object by using a correction coefficient that is generated from the readings of the reference object and color information measured for each arbitrary region of the reference object.

In still another aspect of the present disclosure, there is provided a non-transitory computer-readable recording medium storing program code for causing a computer to execute imaging and correcting. The imaging images a reference object and a color detection object to obtain readings of each of the reference object and the color detection object. The correcting corrects the readings of the color detection object by using a correction coefficient that is generated from the readings of the reference object and color information measured for each arbitrary region of the reference object.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 3A to 3C are diagrams illustrating an example of a reference chart at the time of correcting the image density;

FIGS. 21A and 21B are diagrams illustrating that the reference chart and the color detection chart are read in the same route, in Modification Example 1;

FIGS. 44A to 44C are diagrams illustrating fluttering of a sheet;

FIGS. 45A and 45B are diagrams illustrating a start position and an end position for reading a sheet in Modification Example 7;

Figure 1:
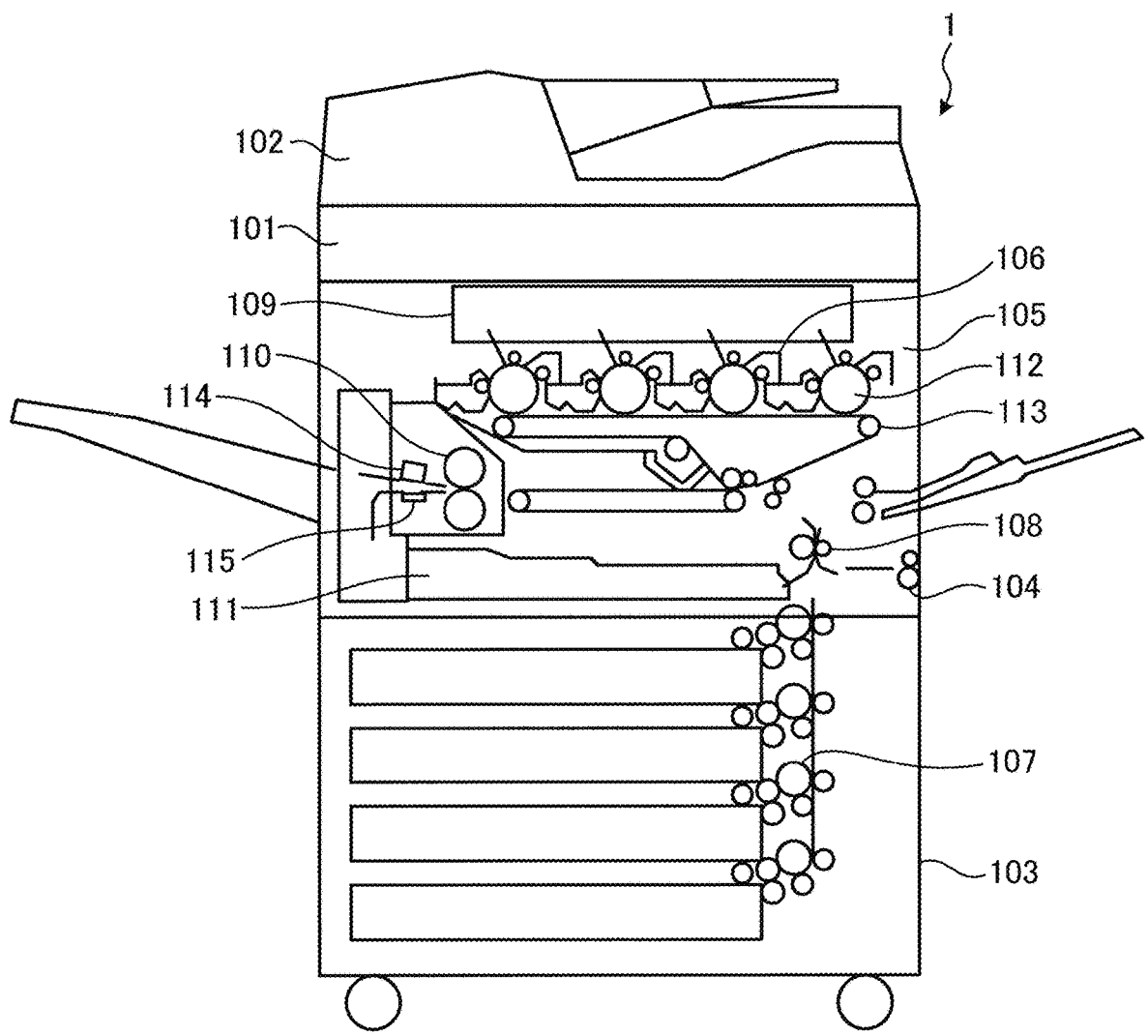
FIG. 1 is a diagram illustrating an example of an overall structure of an image forming apparatus according to an embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, a color inspection device, an image forming apparatus, a color inspection method, and a recording medium storing program code according to embodiments of the present disclosure will be described in detail, with reference to the drawings. In addition, embodiments of the present disclosure are not limited by the following embodiment, and constituents in the following embodiment include substantially the same constituents and so-called equivalents that can be easily conceived by a person skilled in the art. Further, various omissions, substitutions, changes, and combinations of the constituents can be performed within a range not departing from the gist of the following embodiment.

(Overall Structure of Image Forming Apparatus)

FIG. 1 is a diagram illustrating an example of an overall structure of an image forming apparatus according to an embodiment. A configuration of an image forming apparatus 1 according to this embodiment will be described with reference to FIG. 1. Furthermore, the image forming apparatus according to this embodiment will be described as a multifunction peripheral (MFP). Here, the multifunction peripheral is a device having at least two functions of a printing function, a copying function, a scanner function, and a facsimile function.

As illustrated in FIG. 1, the image forming apparatus 1 according to this embodiment includes an image reading device 101, an auto document feeder (ADF) 102, a sheet feeding device 103, and a main body 104.

The image reading device 101 is a device that reads an image of a document placed on a contact glass, and thus, acquires image data. The auto document feeder 102 is a device that automatically feeds the placed document onto the contact glass.

The sheet feeding device 103 is a portion in which a printing sheet for forming an image is fed to the main body 104. A conveyance path 107 in the sheet feeding device 103 is a conveyance path for conveying the printing sheet sent out from a sheet feeding cassette, to the main body 104.

The main body 104 is a portion in which an image is formed on the printing sheet fed from the sheet feeding device 103. The main body 104 includes a registration roller 108, an image forming device 105, an optical writing device 109, an intermediate transfer belt 113, a fixing conveyor 110, a reading device 114, a white reference board 115, and a duplex tray 111.

The registration roller 108 is a roller that feeds the printing sheet fed from the sheet feeding device 103 to be synchronized with a color toner image on the intermediate transfer belt 113.

The image forming device 105 is a tandem system device that forms images of each color of yellow (Y), cyan (C), magenta (M), and black (K). The image forming device 105 includes a developing unit 106 and a photoconductor drum 112, for each of the colors.

The developing unit 106 is a member that supplies toners of each of the colors to the photoconductor drum 112 on which an electrostatic image is formed, develops an electrostatic latent image, and forms the toner images of each of the colors. The photoconductor drum 112 is a member in which a front surface is charged, and is irradiated with modulated and deflected laser light by the optical writing device 109, on the basis of image data of each of the colors, and thus, electrostatic latent images of each of the colors are formed on the charged front surface.

The optical writing device 109 is a device that irradiates the front surfaces of the photoconductor drums 112 of each of the colors with laser light of a laser diode (LD) (a light source), which is modulated on the basis of the image data of each of the colors, and forms the electrostatic latent images of the images of each of the colors, on the photoconductor drum 112.

The intermediate transfer belt 113 is a belt subjected to tension stretching by a plurality of stretching rollers, and is a belt to which an intermediate transfer bias is applied from a power source (not illustrated), and thus, the toner images on each of the photoconductor drums 112 are transferred by being sequentially superimposed, and the color toner images are transferred (primarily transferred).

The fixing conveyor 110 is a member that fixes the color toner image onto the printing sheet by heating the printing sheet to which the color toner image is secondarily transferred from the intermediate transfer belt 113, and conveys the printing sheet to a sheet discharge unit side.

The reading device 114 is a device that performs reading for performing density correction of a printing image. The white reference board 115 is provided in a position facing the reading device 114, and is a reference board of a white color that performs shading correction of the reading device 114.

The duplex tray 111 is provided on a lower side of the fixing conveyor 110, and is a unit that inverts upside down the printing sheet sent through the fixing conveyor 110 by switching the conveyance route, on which the image is formed, and conveys again the printing sheet to the registration roller 108.

(General Method of Image Correction)

Figure 2A:
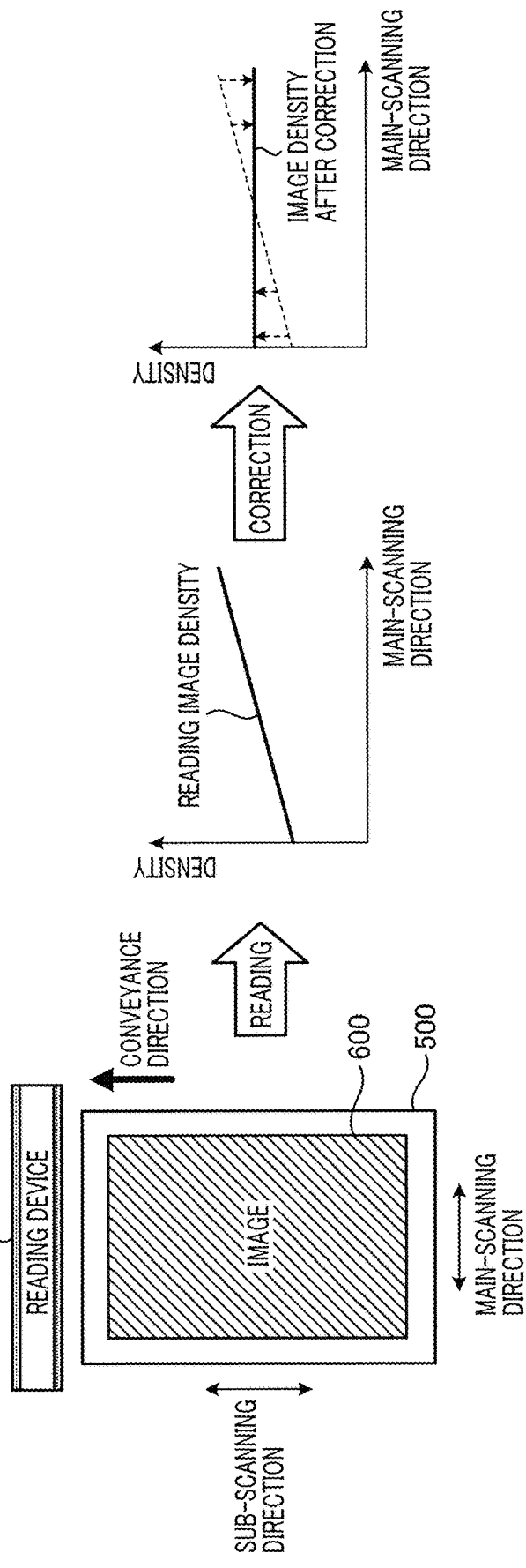
FIGS. 2A and 2B are diagrams illustrating an example of a correcting technology of an image density.
Figure 2B:
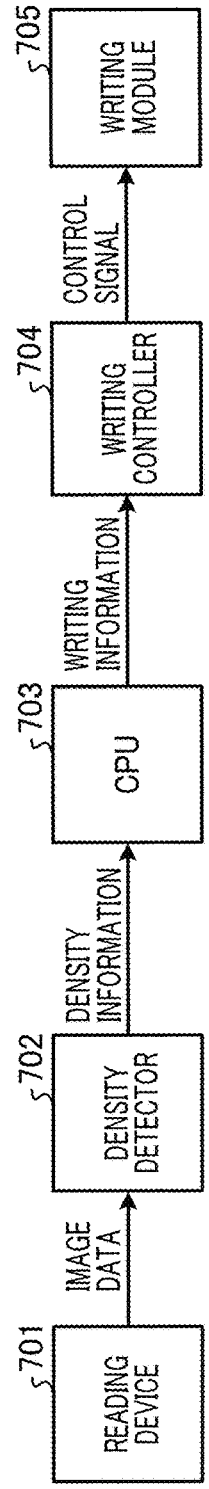

FIGS. 2A and 2B are diagrams illustrating an example of a correcting technology of an image density. FIGS. 3A to 3C are diagrams illustrating an example of a reference chart at the time of correcting the image density. A general method of correcting the image density will be described with reference to FIGS. 2A and 2B, and FIGS. 3A to 3C.

As illustrated in FIG. 2B, for example, a configuration including a reading device 701, a density detector 702, a central processing unit (CPU) 703, a writing controller 704, and a writing module 705, is considered as a general configuration for implementing the correction of the image density.

As illustrated in FIG. 2A, the reading device 701 obtains image data by reading an image 600 printed on a sheet 500 that is conveyed in a sub-scanning direction, and outputs the image data to the density detector 702. The density detector 702 converts the image data input from the reading device 701, into density information by using a conversion parameter held in advance, and outputs the density information to the CPU 703. Here, as illustrated in FIG. 2A, the density information converted by the density detector 702, for example, indicates a distribution of an inclination (a positive slope) in a main-scanning direction. In such a case, it is required to correct the distribution to be flat.

In order to make a distribution of correction information input from the density detector 702 flat, the CPU 703 corrects the correction information by using a correction coefficient, and outputs the correction information as writing information of an image. The writing controller 704 controls the writing module 705 such that a light intensity of the light source (LD) is adjusted by a control signal, and an attachment amount of a toner (a color material) is adjusted, and thus, writing is performed with respect to the sheet, on the basis of the writing information input from the CPU 703.

In a case where the printing image is subjected to density correction, as illustrated in FIG. 3A, in order to correct each color (each of CMYK) to be used in the toner, an image with a uniform density of CMYK, is printed, and is read by the reading device 701, and a density distribution in the main-scanning direction is grasped. More desirably, the density distribution in the main-scanning direction is obtained by a plurality of densities in which the densities of each of CMYK are gradually changed, and is corrected, and thus, optimal density correction can be performed for each gradation. At this time, as illustrated in FIG. 3B or FIG. 3C, images of a plurality of gradations are printed for each of the colors, and the density distribution in the main-scanning direction for each of the colors and each of the gradations, is obtained by the reading device 701.

In such a correcting technology, it is significant that a correct image density is read by the reading device 701, and in a case where a density different from the original image density, is read, and an image corrected on the basis of a reading result, is not corrected to an on-target density.

(Problem in Shading Correction)

Figure 4A:
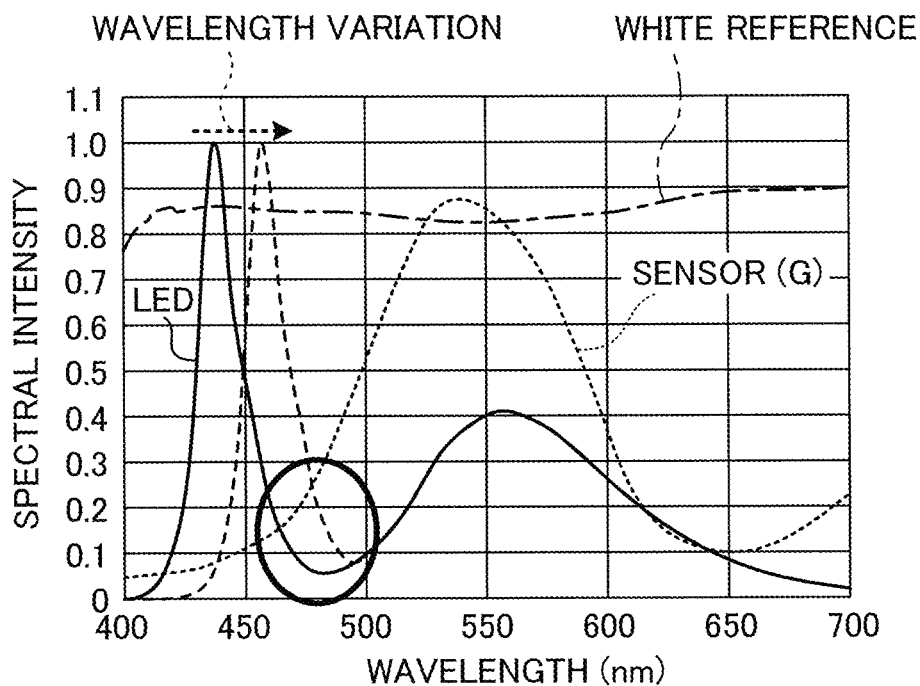
FIGS. 4A and 4B are diagrams illustrating a variation in an LED.
Figure 4B:
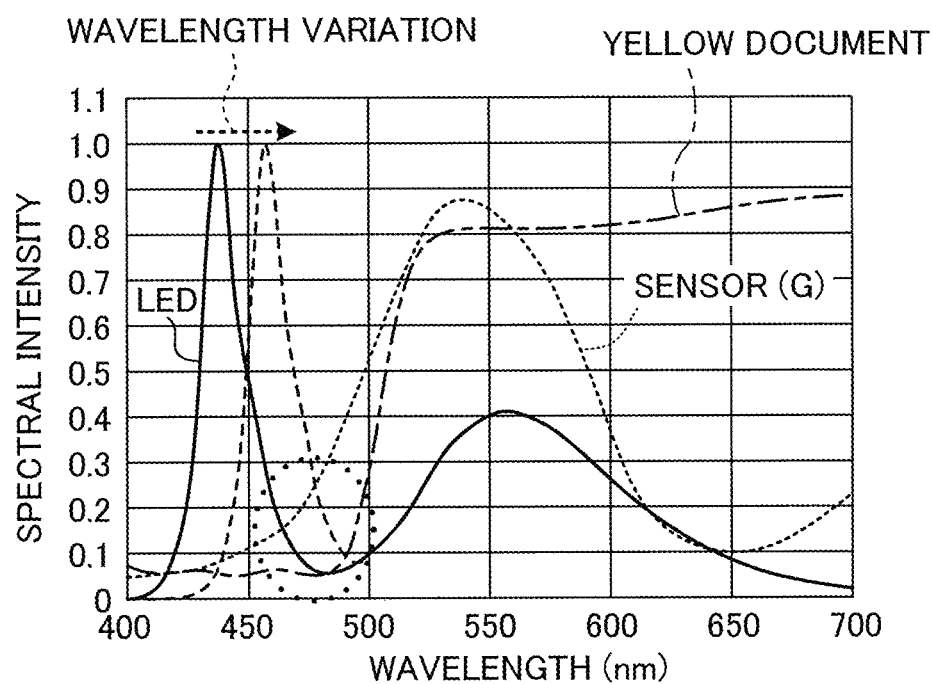
Figure 5A:
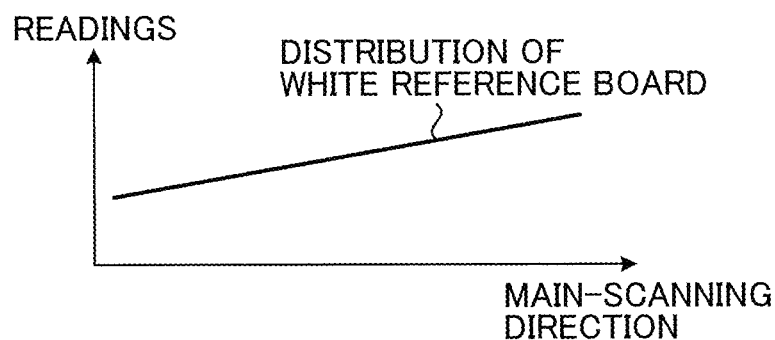
FIGS. 5A to 5C are diagrams illustrating a problem in which correction is not capable of being performed in shading correction.
Figure 5B:
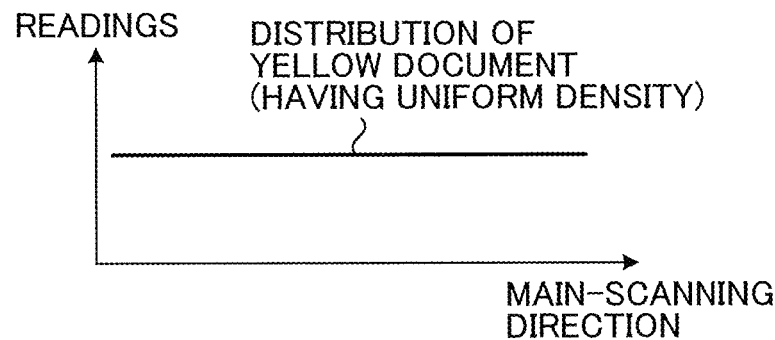
Figure 5C:
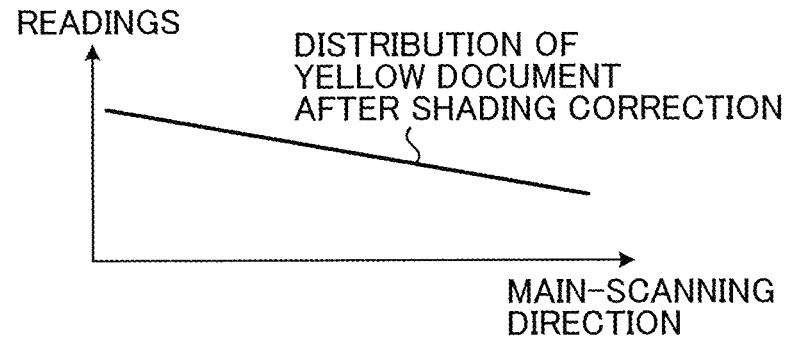

FIGS. 4A and 4B are diagrams illustrating a variation in an LED. FIGS. 5A to 5C are diagrams illustrating a problem in which correction is not capable of being performed in the shading correction. A problem in which the correction is not capable of being performed in the shading correction, will be described with reference to FIGS. 4A and 4B and FIGS. 5A to 5C.

In a reading device for correcting the density of the image (for example, the reading device 701), as with a general scanner (for example, the image reading device 101), the LED is generally used in a light source, and LED chips that emit blue light to a yellow fluorescent body, to be white light, are arranged in a plurality of arrays in the main-scanning direction. As illustrated in FIGS. 4A and 4B, there is a case where in a plurality of LED chips, a shift of a peak wavelength of the blue light is generated due to a so-called manufacturing variation or the like. FIGS. 4A and 4B illustrate a difference between readings of green (G) at the time of reading the white reference board, and readings of green (G) at the time of reading a yellow document, in a case where the peak wavelength of the blue light is shifted to a long wavelength side, and FIG. 4A illustrates the LED, the readings of green (G) read by the reading device, and a spectral intensity (a spectral spectrum) of the white reference board, and FIG. 4B illustrates the LED, the readings of green (G) read by the reading device, and the spectral intensity (the spectral spectrum) of the yellow document.

The white reference board has a high reflection rate in the entire band of a wavelength band of 400 [nm] to 700 [nm], and in a case where the blue light of the LED is shifted to the long wavelength side, an intensity increases in a wavelength band in a solid circle portion of FIG. 4A, and thus, the readings of green (G) increase. On the other hand, even in a case where the blue light of the LED is shifted to the long wavelength side at the time of reading the yellow document, as illustrated in FIG. 4B, a reflection rate of the yellow document in a dotted circle portion is considerably small, and thus, there is no fluctuation in the readings of green (G).

As illustrated in FIGS. 4A and 4B, the blue light of the LED is shifted to the long wavelength side in the main-scanning direction, and thus, for example, as illustrated in FIG. 5A, a distribution of readings of the white reference board becomes a distribution of a positive slope. In contrast, in the reading of the yellow document of which the density is uniform in the main-scanning direction, as illustrated in FIGS. 4A and 4B, there is no fluctuation in the readings due to the shift of the blue light of the LED to the long wavelength side, and thus, as illustrated in FIG. 5B, a distribution of readings of the yellow document becomes flat. However, the shading correction of making the distribution of the readings of the white reference board, which was the distribution of the positive slope, flat, is also applied to the readings of the yellow document, and thus, as illustrated in FIG. 5C, a distribution of values after the shading correction with respect to the readings of the yellow document, becomes a distribution of a negative slope. Thus, the yellow document of which the density is uniform, is detected as the distribution of the negative slope, and thus, a result that is not capable of being accurately detected, is fed back, and therefore, it is not possible to uniform the printing image of the image forming apparatus. Here, the "values after the correction (the shading correction) with respect to the readings" may be simply referred to as the "readings after the correction (the shading correction)".

Problem of Related Art

Figure 6A:
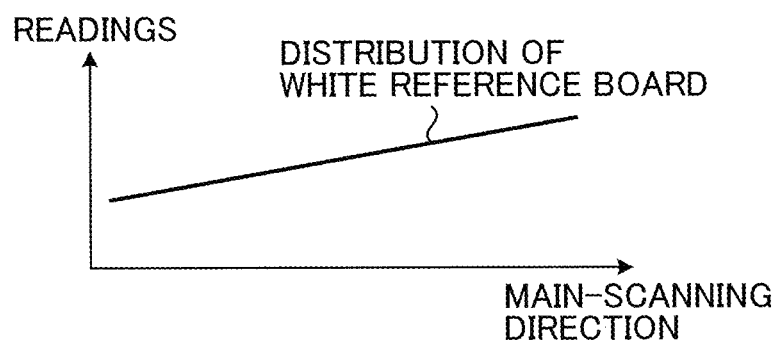
FIGS. 6A to 6C are diagrams illustrating an effect of the related art.
Figure 6B:
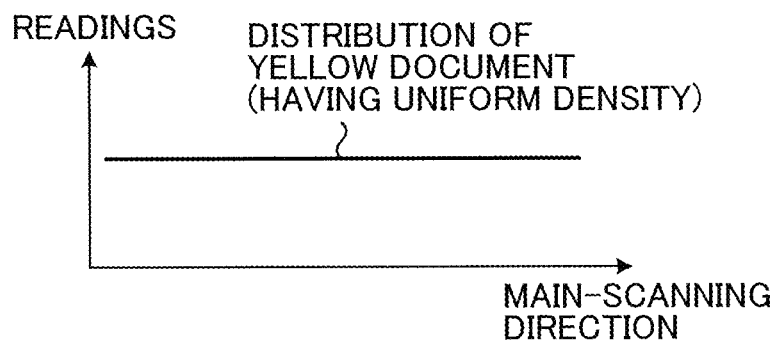
Figure 6C:
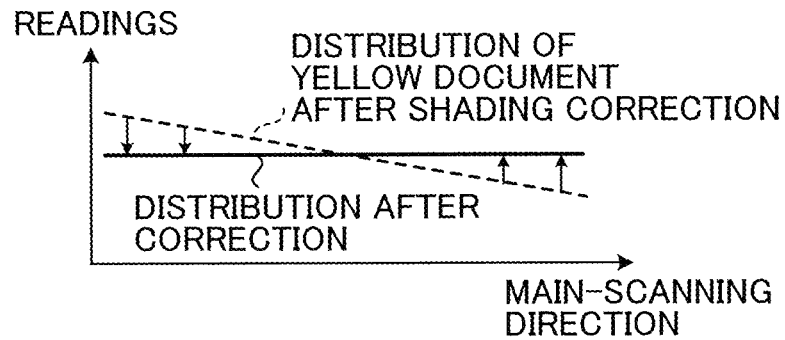

FIGS. 6A to 6C are diagrams illustrating an effect of the related art. FIGS. 7A to 7D are diagrams illustrating a problem of the related art. The effect and the problem of the related art will be described with reference to FIGS. 6A to 6C and FIGS. 7A to 7D.

As illustrated in FIGS. 4A and 4B, the blue light of the LED is shifted to the long wavelength side in the main-scanning direction, and thus, as illustrated in FIG. 6A, as with FIG. 5A, the distribution of the readings of the white reference board, becomes the distribution of the positive slope. In contrast, in the reading of the yellow document of which the density is uniform in the main-scanning direction, as illustrated in FIGS. 4A and 4B, there is no fluctuation in the readings due to the shift of the blue light of the LED to the long wavelength side, and thus, as illustrated in FIG. 6B, the distribution of the readings of the yellow document becomes flat. Then, as described above, the shading correction is also applied to the readings of the yellow document, and thus, the distribution of the values after the shading correction with respect to the readings of the yellow document, becomes the distribution of the negative slope, but in the related art, as illustrated in FIG. 6C, the correction coefficient is calculated for each position in the main-scanning direction, and the correction is performed such that the distribution becomes a flat distribution. Accordingly, as illustrated in a solid line graph of FIG. 6C, the readings of the yellow document after the correction, becomes a flat distribution, and thus, it is possible to resolve a characteristic difference in the main-scanning direction due to a manufacturing variation of the LED.

Figure 7A:
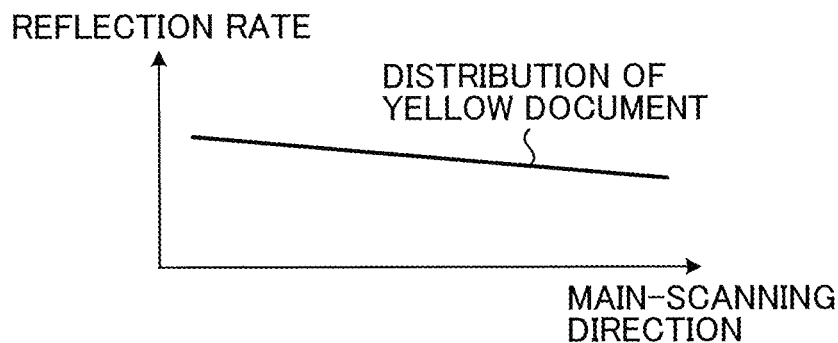
FIGS. 7A to 7D are diagrams illustrating a problem of the related art.
Figure 7B:
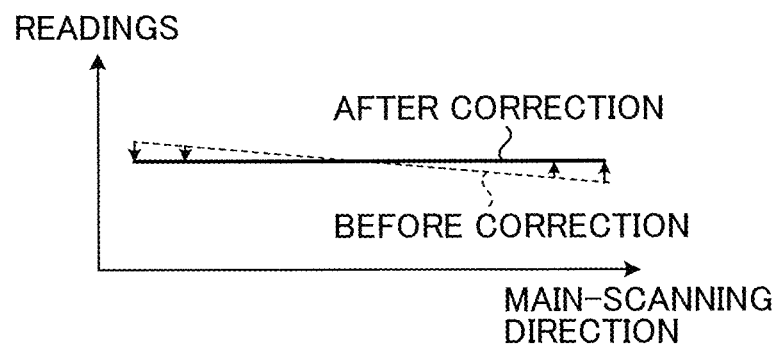

However, a correcting operation of the related art, illustrated in FIGS. 6A to 6C, is based on the premise that the density of the yellow document is uniform in the main-scanning direction. Therefore, in a case where unevenness occurs in the density of the yellow document, in the correcting operation of the related art, the characteristic difference remains in the main-scanning direction. For example, as illustrated in FIG. 7A, a case is considered in which there is unevenness in the density of the yellow document, and for example, a distribution of the reflection rate of the yellow document becomes the distribution of the negative slope (a distribution in which the density has a negative slope). In such a case, as illustrated in a broken line graph of FIG. 7B, the distribution of the readings of the yellow document also becomes to the distribution of the negative slope, and in the case of applying the related art, the correction coefficient is calculated by using readings of the distribution of the negative slope such that a flat distribution as illustrated in a solid line graph of FIG. 7B is obtained (in form, such that the characteristic difference in the main-scanning direction is resolved).

Figure 7C:
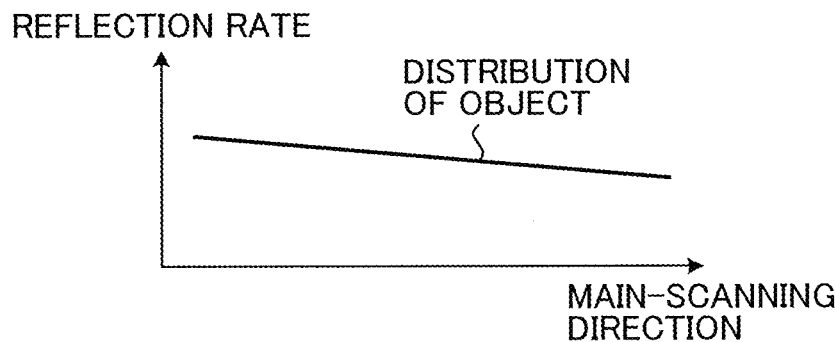
Figure 7D:
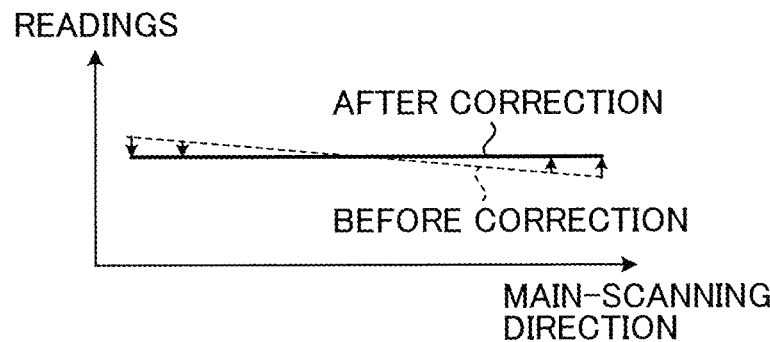

In a state where such a correction coefficient is calculated, as illustrated in FIG. 7C, for example, as with the yellow document, in a case where a reflection rate of an object to be a correction target, has the distribution of the negative slope, a distribution of readings of the object also becomes the distribution of the negative slope, as illustrated in a broken line graph of FIG. 7D. Then, in a case where the readings of the object are corrected by using the calculated correction coefficient, as illustrated in a solid line graph of FIG. 7D, the distribution of the readings of the object after the correction, becomes a flat distribution, a distribution different from the distribution in the main-scanning direction (the distribution of the negative slope illustrated in FIG. 7C) that the object originally has, is detected, and thus, detection with a high accuracy is not capable of being performed. Furthermore, it is possible to decrease the density unevenness of the yellow document described above by strictly performing management at the time of producing the yellow document, but in this case, a cost for producing the yellow document increases.

In the image forming apparatus 1 according to this embodiment, as described above, even in a case where there is the density unevenness in the yellow document (the reference chart) for generating the correction coefficient, the density unevenness is corrected with a high accuracy, and thus, color detection can be performed with a high accuracy. Hereinafter, the details of the configuration and the operation of the image forming apparatus 1 according to this embodiment, illustrated in FIG. 1, will be described.

(Hardware Configuration of Image Forming Apparatus)

Figure 8:
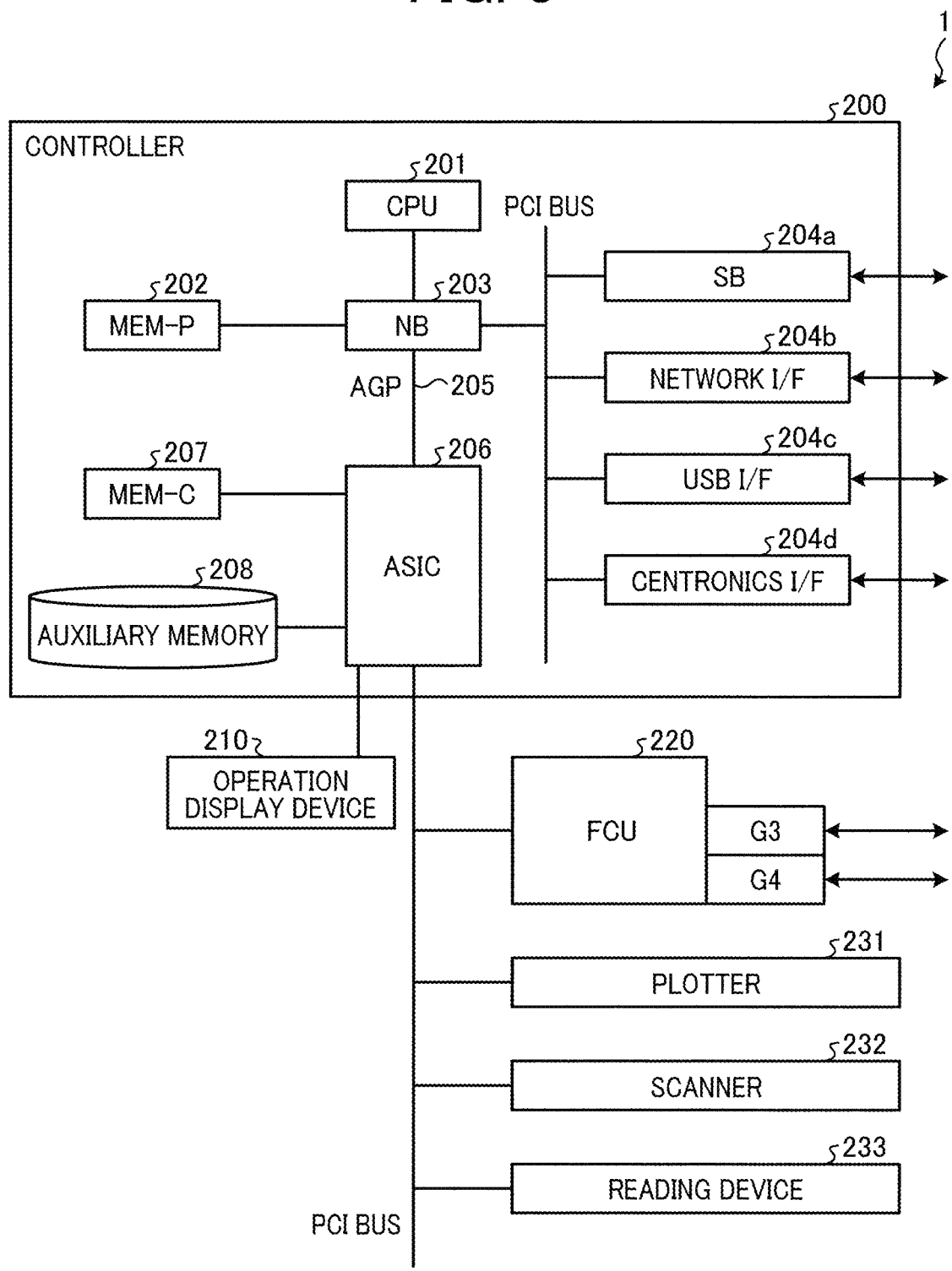
FIG. 8 is a diagram illustrating an example of a hardware configuration of the image forming apparatus according to the embodiment.

FIG. 8 is a diagram illustrating an example of a hardware configuration of the image forming apparatus according to the embodiment. The hardware configuration of the image forming apparatus 1 according to this embodiment will be described with reference to FIG. 8.

As illustrated in FIG. 8, in the image forming apparatus 1 according to this embodiment, a controller 200, an operation display device 210, a facsimile control unit (FCU) 220, a plotter 231 (a forming unit), a scanner 232, and a reading device 233 are connected to each other through a peripheral component interface (PCI) bus.

The controller 200 is a device that controls the control, the drawing, and the communication of the entire image forming apparatus 1, and the input from the operation display device 210.

The operation display device 210, for example, is a touch panel or the like, is a device that receives the input with respect to the controller 200 (an input function), and displays the state of the image forming apparatus 1, or the like (a display function), and is directly connected to an application specific integrated circuit (ASIC) 206 described below.

The FCU 220 is a device that implements a facsimile function, and for example, is connected to the ASIC 206 through the PCI bus.

The plotter 231 is a device that implements a printing function, and for example, is connected to the ASIC 206 through the PCI bus. The scanner 232 has a function of implementing a scanner function, and for example, is connected to the ASIC 206 through the PCI bus. The reading device 233 corresponds to the reading device 114 illustrated in FIG. 1, and for example, is connected to the ASIC 206 through the PCI bus.

The controller 200 includes a CPU 201, a system memory (MEM-P) 202, a north bridge (NB) 203, a south bridge (SB) 204a, a network interface (I/F) 204b, a universal serial bus (USB) I/F 204c, a Centronics I/F 204d, the ASIC 206, a local memory (MEM-C) 207, and an auxiliary memory 208.

The CPU 201 controls the entire image forming apparatus 1, is connected to a chip set including the system memory 202, the north bridge 203, and the south bridge 204a, and is connected to other devices through the chip set.

The system memory 202 is a memory used as a storage memory of a program and data, an expansion memory of a program and data, a drawing memory of a printer, and the like, and includes a read only memory (ROM) and a random access memory (RAM). Among the memories, the ROM is a read only memory used as the storage memory of the program and the data, and the RAM is a writable and readable memory used as the expansion memory of the program and the data, the drawing memory of the printer, and the like.

The north bridge 203 is a bridge for connecting the CPU 201, and the system memory 202, the south bridge 204a, and an accelerated graphics port (AGP) bus 205 together, and includes a memory controller controlling reading, writing, or the like with respect to the system memory 202, and a PCI master and an AGP target.

The south bridge 204a is a bridge for connecting the north bridge 203, and a PCI device and a peripheral device together. The south bridge 204a is connected to the north bridge 203 through the PCI bus, and the network I/F 204b, the USB I/F 204c, the Centronics I/F 204d, and the like are connected to the PCI bus.

The AGP bus 205 is a bus interface for a graphics accelerator card, proposed to accelerate graphic processing. The AGP bus 205 is a bus that accelerates the graphics accelerator card by directly accessing the system memory 202 with a high throughput.

The ASIC 206 is an integrated circuit (IC) for image processing, including a hardware element for image processing, and has a bridge function of connecting the AGP bus 205, the PCI bus, the auxiliary memory 208, and the local memory 207, respectively. The ASIC 206 includes a PCI target and an AGP master, an arbiter (ARB) forming the central core of the ASIC 206, a memory controller controlling the local memory 207, a plurality of direct memory access controllers (DMAC) rotating image data according to hardware logic or the like, and a PCI unit performing data transmission between the plotter 231 and the scanner 232 through the PCI bus. For example, the FCU 220, the plotter 231, the scanner 232, and the reading device 233 are connected to the ASIC 206 through the PCI bus. In addition, the ASIC 206 is also connected to a host personal computer (PC, not illustrated), a network, and the like.

The local memory 207 is a memory used as an image buffer for copying, and a code buffer.

The auxiliary memory 208 is a storage device such as a hard disk drive (HDD), a solid state drive (SSD), a secure digital (SD) card, or a flash memory, and is a storage for performing the accumulation of image data, the accumulation of a program, the accumulation of font data, the accumulation of a form, and the like.

Furthermore, a program of the image forming apparatus 1 described above, may be recorded in a computer-readable recording medium (the auxiliary memory 208 or the like) by a file in an installable format or an executable format, and may be distributed.

In addition, the hardware configuration of the image forming apparatus 1, illustrated in FIG. 8, is merely an example, is not required to include all configuration devices, and may include other configuration devices.

(Functional Block Configuration of Image Forming Apparatus)

Figure 9:
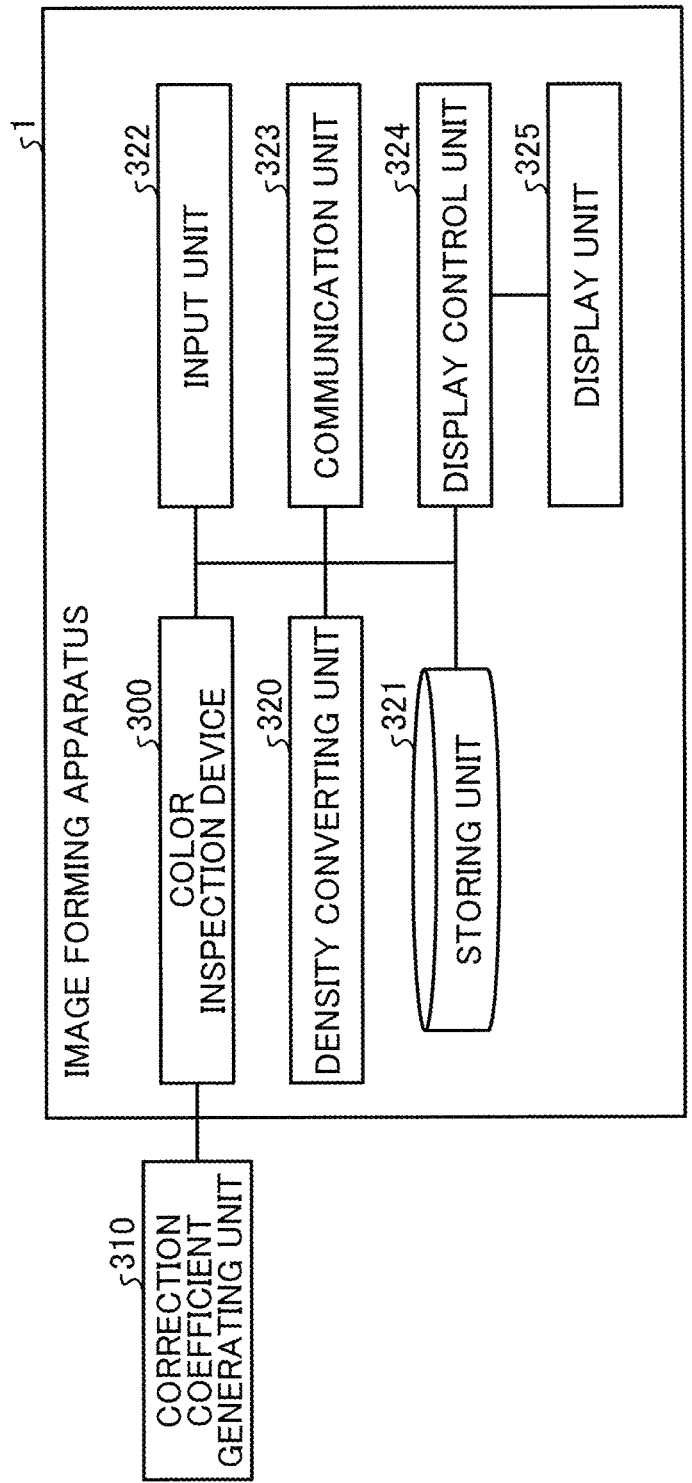
FIG. 9 is a diagram illustrating an example of a configuration of a functional block of the image forming apparatus according to the embodiment.
Figure 10:
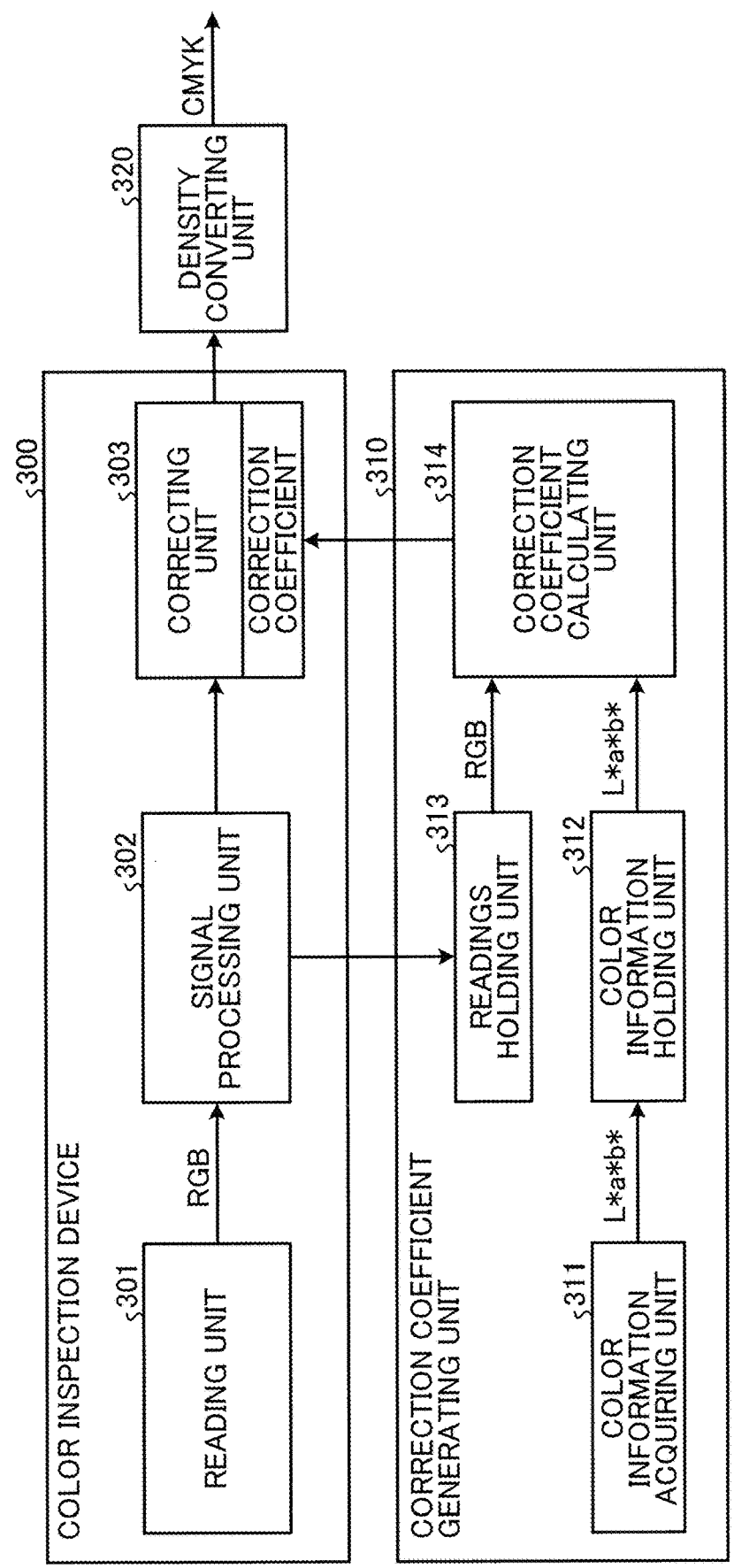
FIG. 10 is a diagram illustrating an example of a configuration of a functional block of a main part of the image forming apparatus according to the embodiment.

FIG. 9 is a diagram illustrating an example a configuration of a functional block of the image forming apparatus according to the embodiment. FIG. 10 is a diagram illustrating an example a configuration of a functional block of a main part of the image forming apparatus according to the embodiment. The configuration of the functional block of the image forming apparatus 1 according to this embodiment, will be described with reference to FIGS. 9 and 10.

As illustrated in FIG. 9, the image forming apparatus 1 according to this embodiment includes a color inspection device 300, a density converting unit 320, a storing unit 321, an input unit 322, a communication unit 323, a display control unit 324, and a display unit 325. In addition, as described below, a correction coefficient generating unit 310 (a generating unit) sending the correction coefficient to the color inspection device 300, is provided outside the image forming apparatus 1.

The color inspection device 300 is a device that performs the shading correction with respect to the image data obtained by reading the printing image (the object), and the correction according to the correction coefficient generated by the reference chart (a reference object). A specific configuration of the color inspection device 300 will be described below in FIG. 10.

The correction coefficient generating unit 310 is a function unit that generates the correction coefficient for correcting the image data read in the printing image (the object), on the basis of color information measured with respect to the reference chart, and readings obtained by reading the reference chart. In this embodiment, as described above, the correction coefficient generating unit 310 is provided outside the image forming apparatus 1, and sends the generated correction coefficient to the color inspection device 300. A specific configuration of the correction coefficient generating unit 310 will be described below in FIG. 10.

The density converting unit 320 is a function unit that converts the image data (RGB values) after the correction, output from the color inspection device 300, into the density information of CMYK. The density converting unit 320, for example, is implemented by the program executed by the CPU 201 illustrated in FIG. 8, or the ASIC 206.

The storing unit 321 is a function unit that stores the accumulation of the image data, the program, the font data, the correction coefficient for image processing, and the like. The storing unit 321 is implemented by the auxiliary memory 208 or the system memory 202, illustrated in FIG. 8.

The input unit 322 is a function unit that receives operation input of a user. The input unit 322 is implemented by an input function of the operation display device 210 illustrated in FIG. 8.

The communication unit 323 is a function unit that communicates with the external device through a network. The communication unit 323, for example, receives image data for printing, or the like, from the external device. The communication unit 323, for example, is implemented by the network I/F 204b illustrated in FIG. 8, the program operated by the CPU 201 illustrated in FIG. 8, and the like.

The display control unit 324 is a function unit that controls a display operation of a screen of the display unit 325. The display control unit 324, for example, is implemented by the program executed by the CPU 201 illustrated in FIG. 8, or the ASIC 206.

The display unit 325 is a function unit that displays various data items, on the screen, according to the control of the display control unit 324. The display unit 325 is implemented by the display function of the operation display device 210 illustrated in FIG. 8 (a liquid crystal display device or the like).

As illustrated in FIG. 10, the color inspection device 300 includes a reading unit 301, a signal processing unit 302, and a correcting unit 303.

The reading unit 301 is a function unit that includes the RGB values obtained by reading (imaging) the printing image printed on a sheet (a medium), the reference chart, the white reference board (the white reference board 115 illustrated in FIG. 1), and the like. The reading unit 301 is implemented by the reading device 233 illustrated in FIG. 8.

The signal processing unit 302 is a function unit that performs signal processing such as shading correction, with respect to the image data (the RGB values) read by the reading unit 301. The signal processing unit 302 outputs the RGB values subjected to the signal processing, to a readings holding unit 313 of the correction coefficient generating unit 310, described below. The signal processing unit 302, for example, is implemented by the program executed by the CPU 201 illustrated in FIG. 8, or the ASIC 206.

In a color detection operation, the correcting unit 303 is a function unit that corrects the RGB values subjected to the signal processing by the signal processing unit 302, by using the correction coefficient generated by the correction coefficient generating unit 310. The correcting unit 303 outputs the corrected RGB values, for example, to the density converting unit 320. The correcting unit 303, for example, is implemented by the program executed by the CPU 201 illustrated in FIG. 8, or the ASIC 206.

As illustrated in FIG. 10, the correction coefficient generating unit 310 includes a color information acquiring unit 311, a color information holding unit 312, a readings holding unit 313, and a correction coefficient calculating unit 314. As described above, the correction coefficient generating unit 310 is a function unit provided outside the image forming apparatus 1, and for example, includes a general information processing device (a PC or the like).

The color information acquiring unit 311 is a function unit that acquires the color information (for example, L*a*b* values) measured with respect to a color of the reference chart by a colorimeter or the like for each arbitrary region. Furthermore, the color information acquiring unit 311 acquires the color information measured by the colorimeter, but in a case where an absolute color distribution of the actual reference chart is known, a unit for acquiring the color information is not limited. The color information acquiring unit 311, for example, is implemented by the program executed by the CPU of the information processing device described above, or the like.

The color information holding unit 312 is a function unit that holds the color information acquired by the color information acquiring unit 311. The color information holding unit 312, for example, is implemented by the storage device of the information processing device described above.

The readings holding unit 313 is a function unit that acquires the RGB values subjected to the signal processing by the signal processing unit 302 of the color inspection device 300, and holds the RGB values. The readings holding unit 313, for example, is implemented by the storage device of the information processing device described above.

The correction coefficient calculating unit 314 is a function unit that calculates the correction coefficient, from the color information held by the color information holding unit 312, and the readings of the reference chart (subjected to shading correction), held by the readings holding unit 313. The correction coefficient calculating unit 314 outputs the calculated correction coefficient to the correcting unit 303 of the color inspection device 300. The correction coefficient calculating unit 314 is implemented by the program executed by the CPU of the information processing device described above, or the like.

Furthermore, as illustrated in FIG. 10, the density converting unit 320 is described as a function unit outside the color inspection device 300, but may be included in the color inspection device 300.

In addition, at least a part of a function unit implemented by software (a program) in each of the function units of the correction coefficient generating unit 310, may be implemented by a hardware circuit such as a field-programmable gate array (FPGA) or an ASIC.

In addition, each of the function units of the image forming apparatus 1 illustrated in FIGS. 9 and 10 conceptually illustrates the function, and is not limited to such a configuration. For example, in the image forming apparatus 1 illustrated in FIGS. 9 and 10, a plurality of function units that is illustrated as an independent function unit, may be configured as one function unit. On the other hand, in the image forming apparatus 1 illustrated in FIGS. 9 and 10, the function of one function unit may be divided into a plurality of functions, and may be configured as a plurality of function units.

In addition, each of the function units of the correction coefficient generating unit 310 illustrated in FIG. 10, conceptually illustrates the function, and is not limited to such a configuration. For example, in the correction coefficient generating unit 310 illustrated in FIG. 10, a plurality of function units that is illustrated as an independent function unit, may be configured as one function unit. On the other hand, in the correction coefficient generating unit 310 illustrated in FIG. 10, the function of one function unit may be divided into a plurality of functions, and may be configured as a plurality of function units.

(Correction Coefficient Generating Processing)

Figure 11:
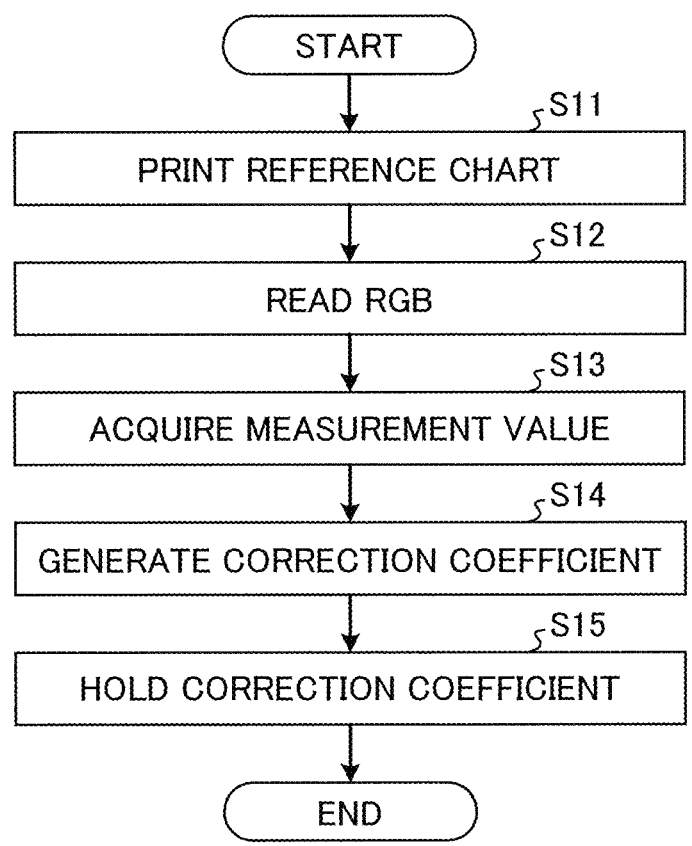
FIG. 11 is a flowchart illustrating an example of a flow of correction coefficient generating processing in the embodiment.
Figure 12:
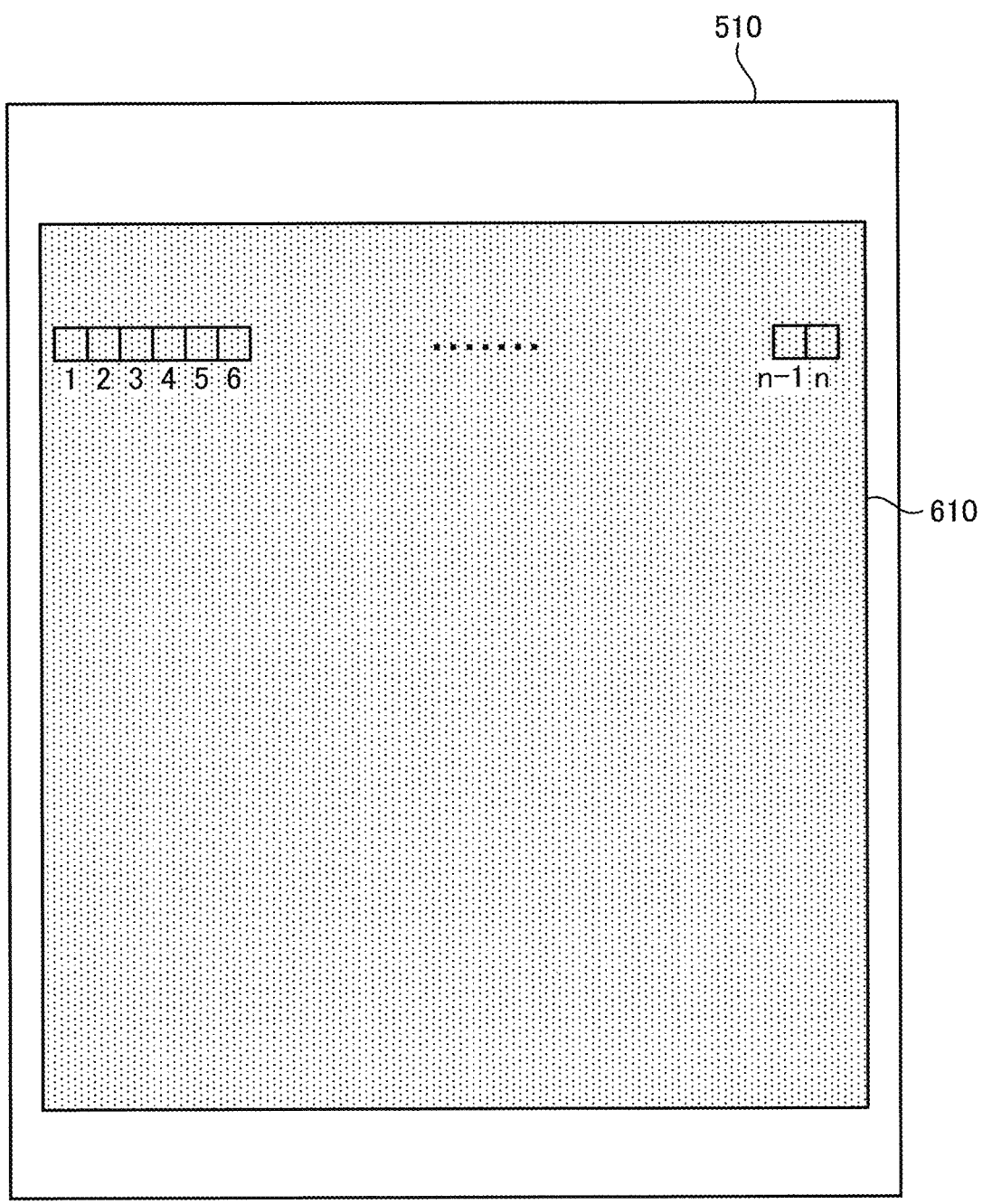
FIG. 12 is a diagram illustrating an example of a reading point and a color measurement point in a yellow reference chart.
Figure 13A:
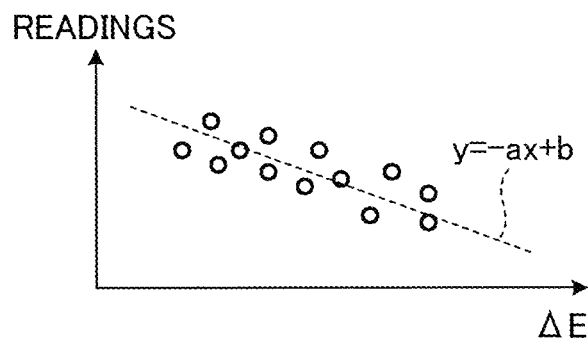
FIGS. 13A to 13D are diagrams illustrating a calculation method of a correction coefficient.

FIG. 11 is a flowchart illustrating an example of a flow of correction coefficient generating processing in the embodiment. FIG. 12 is a diagram illustrating an example of a reading point and a color measurement point in a yellow reference chart. FIGS. 13A to 13D are diagrams illustrating a calculation method of the correction coefficient. FIGS. 14A to 14C are diagrams illustrating a calculation result of the correction coefficient. The correction coefficient generating processing in this embodiment will be described with reference to FIGS. 11 to 14C.

<Step S11>

The image forming apparatus 1 prints a reference chart of a specific color on a sheet, in order to generate the correction coefficient. For example, as illustrated in FIG. 12, the image forming apparatus 1 prints a yellow reference chart 610 on a sheet 510. Then, the process proceeds to step S12.

<Step S12>

The reading unit 301 of the color inspection device 300 reads the reference chart printed by the image forming apparatus 1, and obtains the RGB values. For example, as illustrated in FIG. 12, the reading unit 301 performs reading at each of points 1, 2, ..., n−1, and n, in the main-scanning direction on the reference chart, and obtains readings (the RGB values) at each of the points (regions).

The signal processing unit 302 of the color inspection device 300 performs the shading correction with respect to the image data (the RGB values) read by the reading unit 301, and outputs the RGB values after the shading correction, to the readings holding unit 313 of the correction coefficient generating unit 310. The readings holding unit 313 acquires the RGB values after the shading correction, and holds the RGB values. Then, the process proceeds to step S13.

<Step S13>

The color information acquiring unit 311 of the correction coefficient generating unit 310 acquires the color information (color measurement values) (for example, the L*a*b* values) measured by the colorimeter or the like at each of the points (1 to n) of the reference chart that is printed and output by the image forming apparatus 1. The color information holding unit 312 of the correction coefficient generating unit 310 holds the color information acquired by the color information acquiring unit 311. Then, the process proceeds to step S14.

<Step S14>

The correction coefficient calculating unit 314 of the correction coefficient generating unit 310 calculates the correction coefficient, from the color information held by the color information holding unit 312, and the RGB values (the readings) of the reference chart after the shading correction, held by the readings holding unit 313. Specifically, as illustrated in FIG. 13A, the correction coefficient calculating unit 314 plots the readings (the RGB values) and the color measurement values (the color information) of each of the points (1 to n) on the reference chart. In a graph illustrated in FIG. 13A, a horizontal axis (an x axis) is set to a color difference ΔE from ideal white (L*/a*/b*=100/0/0) of the color measurement value, and a vertical axis (a y axis) is set to the readings. Then, as illustrated in FIG. 13A, the correction coefficient calculating unit 314 calculates a straight line (y=−ax+b) from the obtained plot, for example, by a least-square method or the like. Furthermore, a result calculated from the obtained plot by the correction coefficient calculating unit 314 is not limited to the straight line, and may be a curve.

Figure 13B:
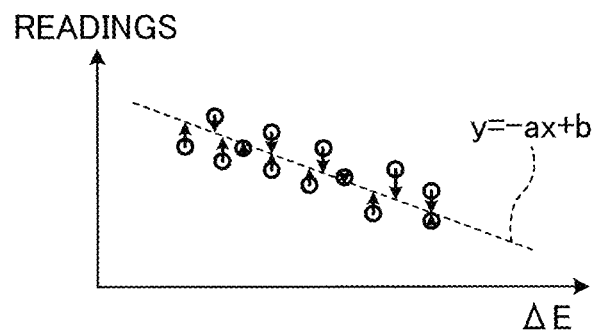
Figure 13C:
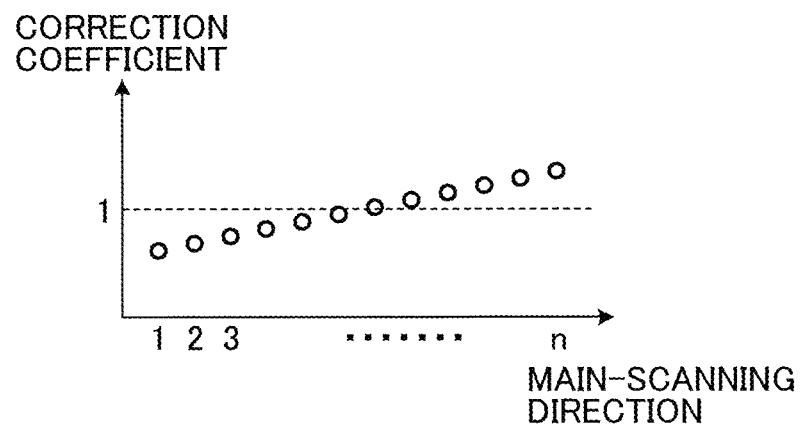
Figure 13D:
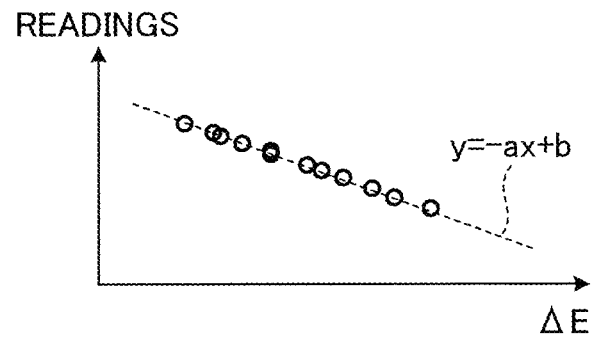
Figure 14A:
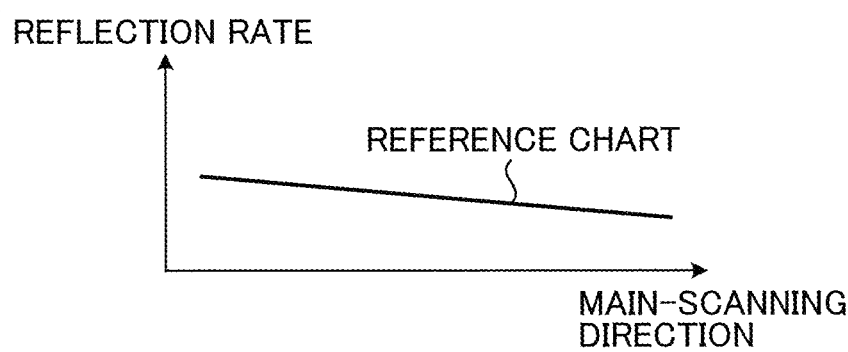
FIGS. 14A to 14C are diagrams illustrating a calculation result of the correction coefficient.
Figure 14B:
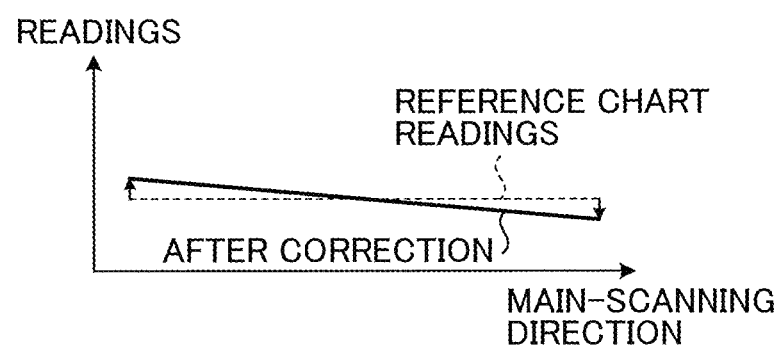
Figure 14C:
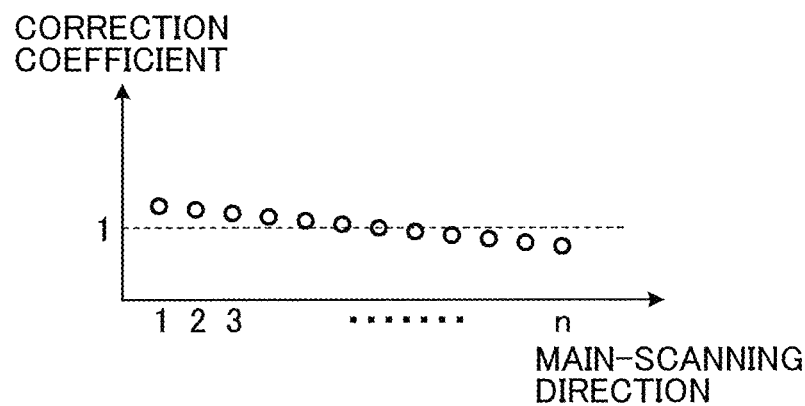

Then, the correction coefficient calculating unit 314 sets the calculated straight line (y=−ax+b) as an ideal straight line, and as illustrated in FIG. 13B, calculates the correction coefficient such that each plot is positioned on an ideal straight line. That is, as illustrated in FIG. 13C, the correction coefficient calculating unit 314 calculates correction coefficients αy1 to αyn for resolving a shift from the ideal straight line, at each of the points (1 to n) in the main-scanning direction. Specifically, the correction coefficient at each of the points (1 to n) is calculated by (−a×ΔE+b)/(Readings). As illustrated in FIG. 13D, a value obtained by multiplying the correction coefficient and the readings (the RGB values) at each of the points (1 to n) on the reference chart, together, is positioned on the ideal straight line. Such a state indicates that the readings are corrected such that a color difference in each position of the reference chart from ideal white (L*/a*/b*=100/0/0) which is an index in the calculation of the correction coefficient, becomes a color difference according to the color measurement value (the color information).

Furthermore, ideal white is set as the index, but ideal black (L*/a*/b*=0/0/0) may be set as an index, or may be a color measurement value out of a range in which the color measurement value of the reference chart is obtained.

According to the calculation method of the correction coefficient of the correction coefficient calculating unit 314 as described above, the correction coefficient as illustrated in FIGS. 14A to 14C, is calculated. That is, for example, there is a case where the distribution of the reflection rate of the reference chart, which is a reading target of the reading unit 301, is the distribution of the negative slope as illustrated in FIG. 14A, and the distribution of the readings (accurately, the readings after the shading correction), read by the reading unit 301, is a flat distribution as illustrated in FIG. 14B. In such a case, the correction coefficient calculating unit 314 calculates the correction coefficient illustrated in FIG. 14C to be the distribution of the readings after the correction illustrated in FIG. 14B.

Then, the process proceeds to step S15.

<Step S15>

The correction coefficient calculating unit 314 outputs the calculated correction coefficient to the correcting unit 303 of the color inspection device 300. The correcting unit 303 holds the correction coefficient for correction processing at the time of performing the color detection operation. The correcting unit 303, for example, may hold the correction coefficient in the storing unit 321. Then, the correction coefficient generating processing is ended.

The correction coefficient generating processing is performed according to the flow described in steps S11 to S15 as described above.

Furthermore, in FIGS. 11 to 14C, it has been described that the correction is performed with respect to the readings in the main-scanning direction, as an example, but the correction is not limited thereto, and for example, the correction can also be applied to correction in the sub-scanning direction. In addition, it has been described that the correction coefficient calculating unit 314 calculates the correction coefficient by using the readings (the RGB values), and the L*a*b* values as an example of the color measurement value, as an example, but the calculation is not limited thereto, and the correction coefficient may be calculated by using color information of a color specification system other than the L*a*b* values, or the density information, and the readings (the RGB values).

(Color Detection Operation of Color Inspection Device)

Figure 15:
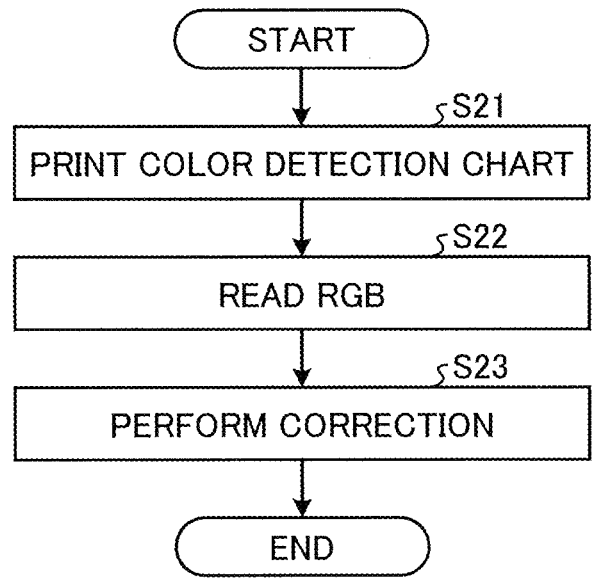
FIG. 15 is a flowchart illustrating an example of a flow of a color detection operation of a color inspection device according to the embodiment.

FIG. 15 is a flowchart illustrating an example of a flow of the color detection operation of the color inspection device according to the embodiment. The color detection operation of the color inspection device 300 according to this embodiment will be described with reference to FIG. 15.

<Step S21>

The image forming apparatus 1 prints a color detection chart (a color detection object) of a specific color on a sheet, in order to perform the color detection operation. Then, the process proceeds to step S22.

<Step S22>

The reading unit 301 of the color inspection device 300 reads the color detection chart printed by the image forming apparatus 1, and obtains the RGB values. For example, as with the reference chart illustrated in FIG. 12 described above, the reading unit 301 performs the reading at each of the points 1, 2, . . . , n−1, and n, in the main-scanning direction, and obtains the readings (the RGB values) at each of the points (regions).

The signal processing unit 302 of the color inspection device 300 performs the shading correction with respect to the image data (RGB values) read by the reading unit 301, and outputs the RGB values after the shading correction, to the correcting unit 303. Then, the process proceeds to step S23.

<Step S23>

The correcting unit 303 of the color inspection device 300 corrects the readings (the RGB values) subjected to the signal processing (the shading correction or the like) by the signal processing unit 302, by using the correction coefficient that is generated from the correction coefficient generating unit 310 and is held. The correcting unit 303 outputs the corrected readings (RGB values) to a latter stage side (for example, the density converting unit 320). Then, the color detection operation is ended.

The color detection operation of the color inspection device 300 is performed according to the flow described in steps S21 to S23 described above.

As described above, the color inspection device 300 performs the correction reflecting the correction coefficient, with respect to the RGB values before being converted into the density (CMYK values), and outputs the corrected RGB values to the density converting unit 320 on the latter stage side, and the density converting unit 320 converts the RGB values into the density information (the CMYK values). A conversion method into the density includes a method of performing conversion into a general color space such as RGB Values→L*a*b* Values→Density, and then, of performing conversion into the density, or the like, in addition to a method of directly converting the RGB values into the density as with the density converting unit 320 described above, but in any method, a color conversion coefficient for converting the RGB values is required to be generated. As described above, the RGB values after the correction reflecting the correction coefficient is used at the time of generating the color conversion coefficient, and thus, the color conversion coefficient can be generated by using the RGB values in which the characteristic difference in the main-scanning direction is corrected, and therefore, color conversion at the time of performing density conversion, can be performed with a high accuracy.

In addition, the reference chart used for generating the correction coefficient, and the printing image of the color detection chart are printed by the color material of the image forming apparatus 1, and thus, it is possible to generate the correction coefficient optimized to printing characteristics of the image forming apparatus 1, and to further improve a color detection accuracy.

Effect of this Embodiment

Figure 16:
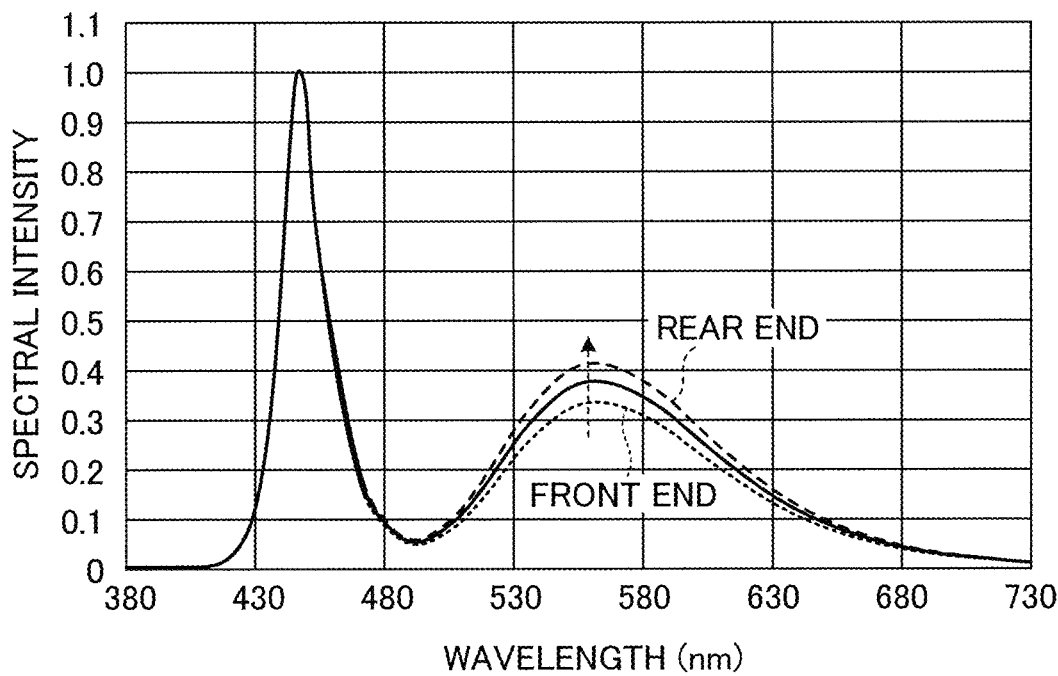
FIG. 16 is a diagram illustrating a variation in a wavelength of the LED.
Figure 17A:
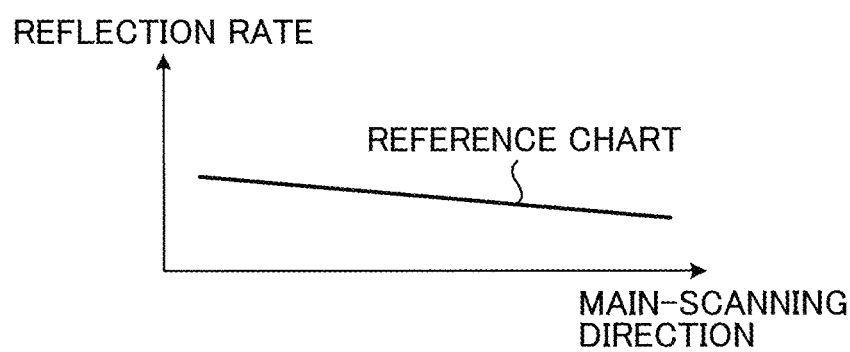
FIGS. 17A to 17C are diagrams illustrating an operation of obtaining the correction coefficient from the reference chart.
Figure 17B:
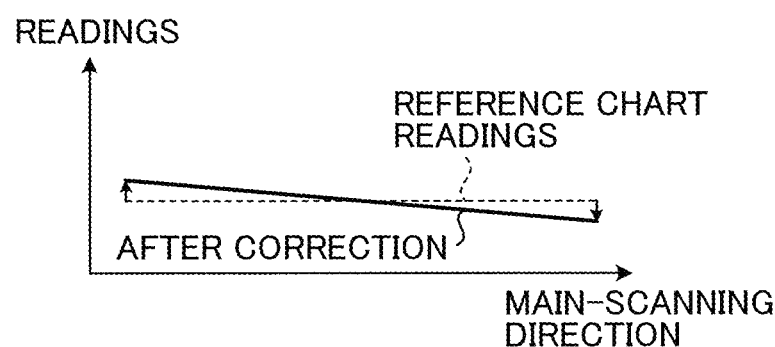
Figure 17C:
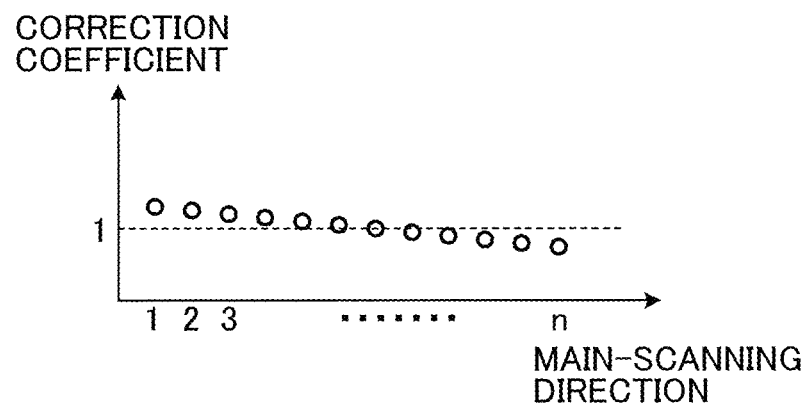
Figure 18A:
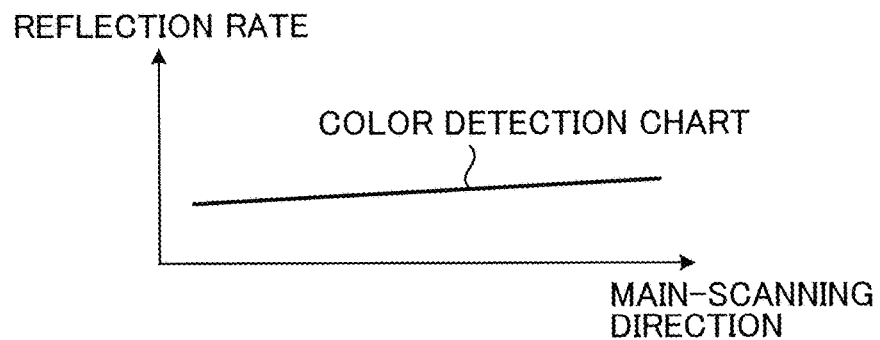
FIGS. 18A and 18B are diagrams illustrating an operation of correcting readings of a color detection chart.
Figure 18B:
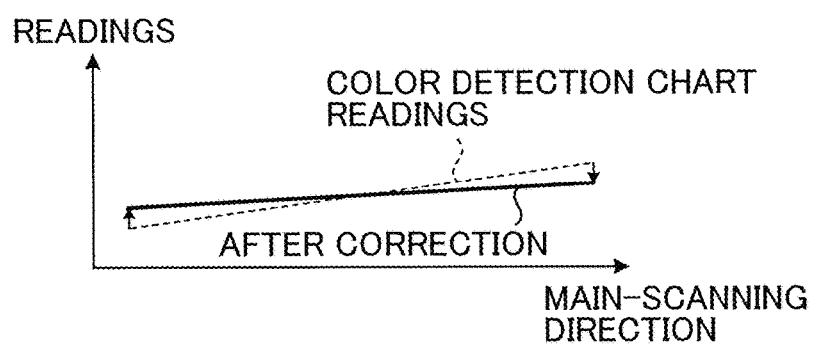

FIG. 16 is a diagram illustrating a variation in the wavelength of the LED. FIGS. 17A to 17C are diagrams illustrating an operation for obtaining the correction coefficient from the reference chart. FIGS. 18A and 18B are diagrams illustrating an operation for correcting the readings of the color detection chart. Effects of this embodiment will be described with reference to FIGS. 16 to 18B.

The effects of the color inspection device 300 and the image forming apparatus 1 according to this embodiment, will be described by using a case where spectral characteristics of the LED varies as illustrated in FIG. 16, due to a manufacturing variation of the LED of the reading unit 301 (the reading device 233), as an example.

As illustrated in FIG. 16, a variation in the spectral characteristics of the LED of the reading unit 301, occurs from a front end to a rear end, in the main-scanning direction. At this time, as illustrated in FIG. 17A, in a case where the reflection rate of the yellow reference chart for generating the correction coefficient, has a negative slope, as illustrated in FIG. 17B, the distribution of the readings (a B component) of the reference chart in the main-scanning direction, for example, becomes the distribution of the positive slope with respect to a distribution of a reflection rate of the original reference chart. In the correction coefficient generating unit 310, the correction coefficient is calculated such that the distribution of the positive slope of the readings, becomes the distribution of the reflection rate of the original reference chart, and thus, a correction coefficients αy (αy1 to αyn) as illustrated in FIG. 17C, are obtained.

Then, in a case where the color detection operation is performed, and a yellow color detection chart is read, for example, a case is considered in which a density deviation of the image forming apparatus 1 is changed, and as illustrated in FIG. 18A, the reflection rate of the color detection chart has the distribution of the positive slope. In such a case, as described above, the spectral characteristics of the LED are changed in the main-scanning direction, as illustrated in FIG. 16, and thus, the distribution of the readings (the B component) at the time of reading the color detection chart in the main-scanning direction, as illustrated in FIG. 18B, becomes the distribution of the positive slope, compared to a distribution of a reflection rate of the original color detection chart. Such a reading result is corrected by using the correction coefficient illustrated in FIG. 17C, which is generated in advance and is held, and thus, the distribution of the readings of the color detection chart after the correcting, as illustrated in FIG. 18B, can be detected as the same distribution as the distribution of the reflection rate of the original color detection chart.

As described above, unlike the related art described above, even in a case where the density unevenness occurs in the reference chart for generating the correction coefficient, the color inspection device 300 according to this embodiment is capable of correcting the characteristic difference in each position (for example, each position in the main-scanning direction), is capable of detecting the color of the object (for example, the color detection chart) according to the distribution of the reflection rate of the object, and is capable of performing the color detection with a high accuracy.

Furthermore, as illustrated FIG. 9, it has been described that the color inspection device 300 is included in the image forming apparatus 1, but the color inspection device 300 is not limited to being included in the image forming apparatus 1, and the color inspection device 300 may be configured as a device independent from the image forming apparatus 1.

Modification Example 1

The image forming apparatus 1 according to Modification Example 1 will be described focusing on a difference from the image forming apparatus 1 according to the embodiment described above. Furthermore, a hardware configuration and a configuration of a functional block of the image forming apparatus 1 according to this modification example are the same as the hardware configuration and the configuration of the functional block of the image forming apparatus 1 according to the embodiment described above.

<Case where there is Difference in Parallelism Between Reference Chart and Color Detection Chart>

Figure 19A:
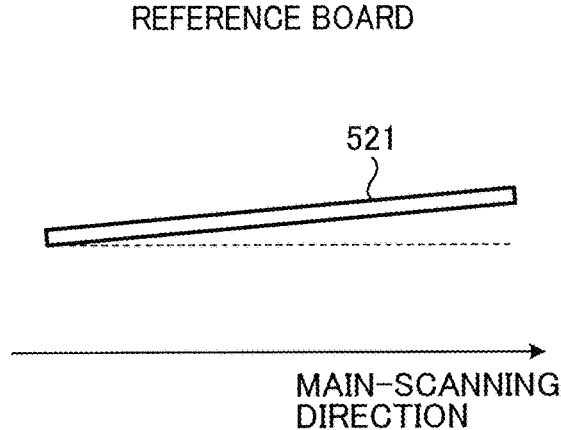
FIGS. 19A and 19B are diagrams illustrating a case where there is a difference in a parallelism between the reference chart and the color detection chart.
Figure 19B:
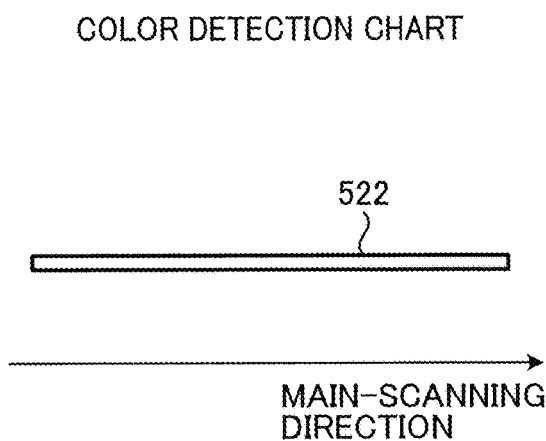
Figure 20A:
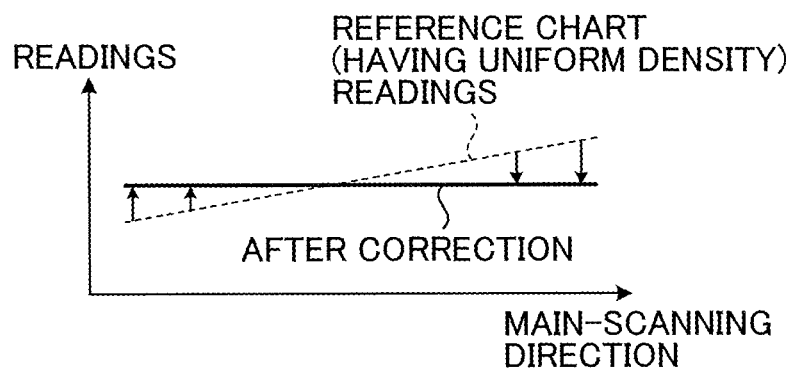
FIGS. 20A to 20C are diagrams illustrating a problem in a case where there is a difference in the parallelism between the reference chart and the color detection chart.
Figure 20B:
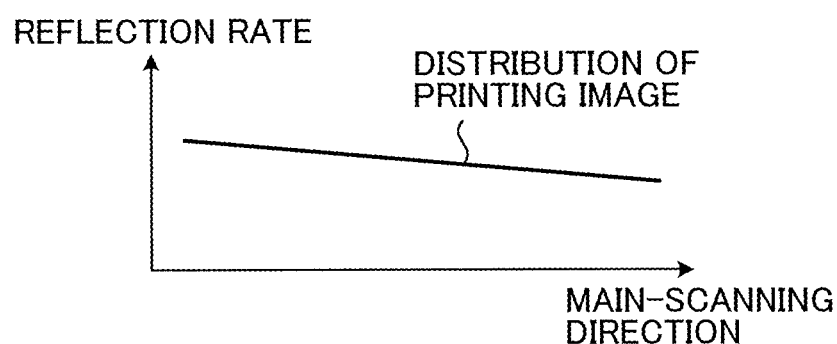
Figure 20C:
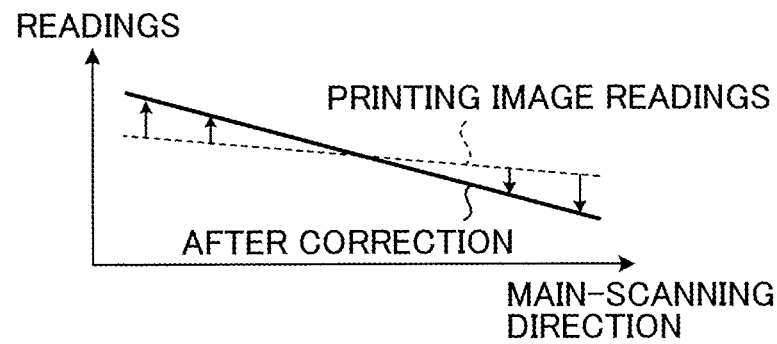

FIGS. 19A and 19B are diagrams illustrating a case where there is a difference in a parallelism between the reference chart and the color detection chart. FIGS. 20A to 20C are diagrams illustrating a problem in a case where there is a difference in the parallelism between the reference chart and the color detection chart.

For example, as illustrated in FIGS. 19A and 19B, for example, a case is considered in which the reference chart (of which the density is uniform) is formed, and there is a difference in the parallelism in the main-scanning direction at the time of reading a reference board 521 (refer to FIG. 19A) fixed in the image forming apparatus, and a sheet 522 (refer to FIG. 19B) on which the color detection chart is printed (in FIGS. 19A and 19B, an example of a case where the reference board 521 is inclined, is illustrated). In a case where the correction coefficient with respect to the reference chart, is generated, and the correction is performed with respect to the readings of the color detection chart, by the method of the embodiment described above, it is not possible to accurately perform the color detection. The details will be described with reference to FIGS. 20A to 20C.

As illustrated in FIG. 19A, in the case of reading the reference chart of the reference board 521 inclined in the main-scanning direction, the distribution of the readings in the main-scanning direction, as illustrated by a broken line of FIG. 20A, has the distribution of the positive slope, and thus, the correction coefficient calculating unit 314 calculates the correction coefficient by using the readings of the distribution of the positive slope such that the characteristic difference in the main-scanning direction disappears, that is, a flat distribution illustrated by a solid line of FIG. 20A is obtained. On the other hand, in a case where the distribution of the reflection rate of the color detection chart (the color detection chart printed on the sheet 522 as the printing image) for performing the color detection, as illustrated in FIG. 20B, has the distribution of the negative slope, the distribution of the readings in the main-scanning direction, as illustrated by a broken line of FIG. 20C, becomes the distribution of the negative slope. Here, the distribution of the readings after being corrected by the correcting unit 303 by using the correction coefficient calculated by the correction coefficient calculating unit 314, as illustrated by a solid line of FIG. 20C, becomes the distribution of the negative slope with a larger inclination, and is detected as being different from the distribution of the reflection rate of the original color detection chart, and thus, it is not possible to accurately perform the color detection. Therefore, in this modification example, the reference chart and the color detection chart are read in the manner as illustrated in FIGS. 21A to 23D described below.

<Reading State of Reference Chart and Color Detection Chart in Modification Example 1>

FIGS. 21A and 21B are diagrams illustrating that the reference chart and the color detection chart are read in the same route, in Modification Example 1. FIGS. 22A to 22D are diagrams illustrating a reading state in a case where the reference chart and the color detection chart are flat. FIGS. 23A to 23D are diagrams illustrating a reading state in a case where the reference chart and the color detection chart are inclined. The reading state of the reference chart and the color detection chart in this modification example, will be described with reference to FIGS. 21A to 23D.

In this modification example, in order to prevent a difference in the reading state between the reference chart for generating the correction coefficient and the color detection chart for performing the color detection (as described above, for example, a case where there is a difference in the parallelism between the reference board 521 on which the reference chart is formed, and the sheet 522 on which the color detection chart is printed) from occurring, the reference chart and the color detection chart are set to a chart printed on the sheet by the same image forming apparatus 1 on which the color inspection device 300 is mounted. For example, as illustrated in FIG. 21A, in the case of reading the reference chart printed on a sheet 531 in the image forming apparatus 1, the reading is performed in a state where the sheet 531 is interposed between a conveyance roller 110*a* on an upstream side and a conveyance roller 110*b* on a downstream side (each included in the fixing conveyor 110 illustrated in FIG. 1). Similarly, in the case of reading the color detection chart printed on a sheet 532, as illustrated in FIG. 21B, the reading is performed in a state where the sheet 532 is interposed between the conveyance roller 110*a* on the upstream side and the conveyance roller 110*b* on the downstream side, in the same image forming apparatus 1.

Figure 22A:
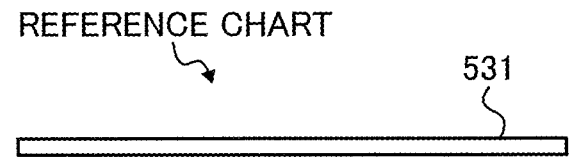
FIGS. 22A to 22D are diagrams illustrating a reading state in which the reference chart and the color detection chart are flat.
Figure 23A:
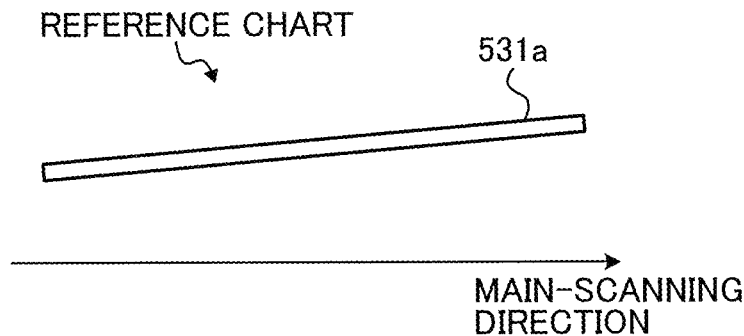
FIGS. 23A to 23D are diagrams illustrating a reading state in a case where the reference chart and the color detection chart are inclined.

FIG. 22A illustrates a case where in a certain image forming apparatus, the sheet 531 to be conveyed is in a flat state in the main-scanning direction, and FIG. 23A illustrates a case where in another image forming apparatus, the sheet 531*a* to be conveyed has a positive slope in the main-scanning direction, due to an assembly error of the conveyance roller or the like. In both cases, in the case of the same apparatus (image forming apparatus), the reference chart and the color detection chart can be read in the same state, and thus, it is possible to suppress the characteristic difference in the main-scanning direction, which occurs due to a difference in the reading state of the reference chart and the color detection chart, as illustrated in FIGS. 20A to 20C, and to perform the color detection with a high accuracy.

Figure 22B:
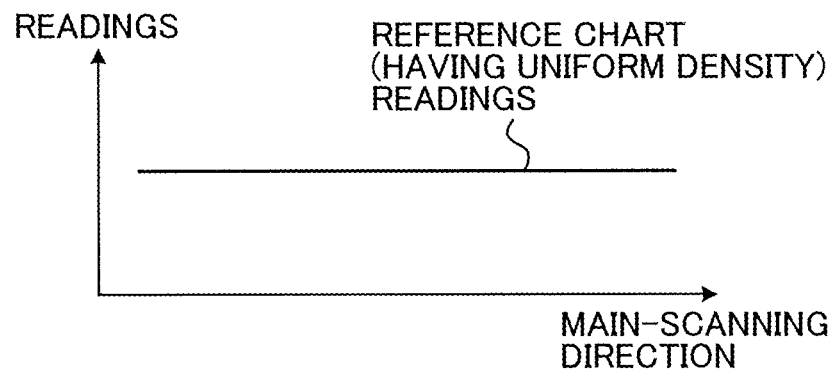
Figure 22C:
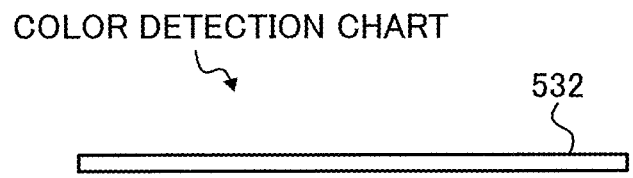
Figure 22D:
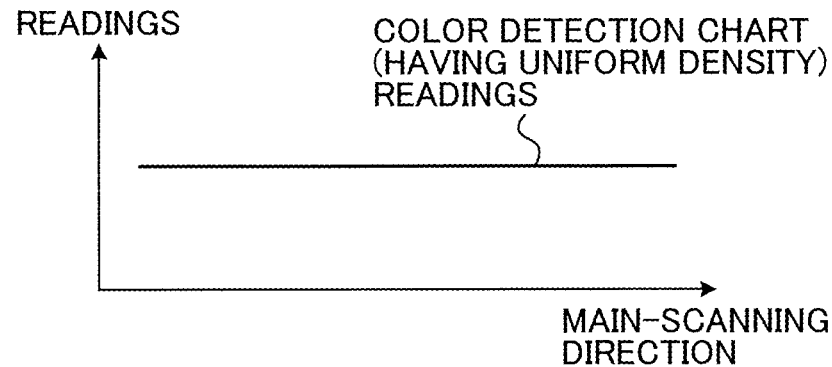

For example, as illustrated in FIG. 22A, in a case where in a certain image forming apparatus, the sheet 531 on which the reference chart having a uniform density is printed, is in a flat state in the main-scanning direction, a case is considered in which the distribution of the readings of the reference chart, which are read, is a flat distribution as illustrated in FIG. 22B. In such a case, in the same image forming apparatus, as illustrated in FIG. 22C, the sheet 532 on which the color detection chart having a uniform density, is printed, is also in a flat state in the main-scanning direction, and thus, the distribution of the readings of the color detection chart, which are read, also becomes a flat distribution as illustrated in FIG. 22D.

Figure 23B:
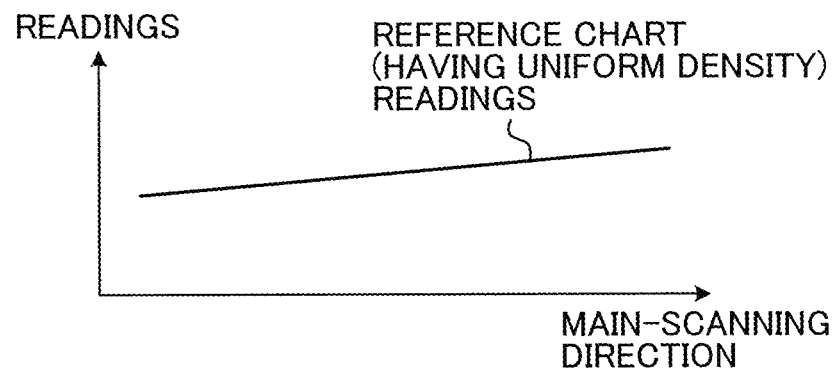
Figure 23C:
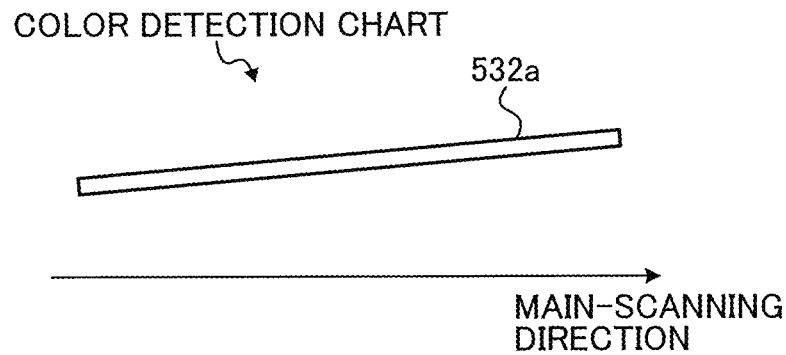
Figure 23D:
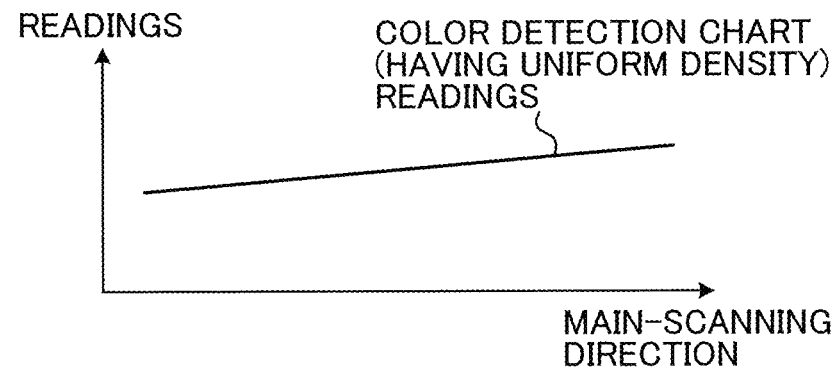

In addition, as illustrated in FIG. 23A, in a case where in a certain image forming apparatus, a sheet 531a on which the reference chart having a uniform density is printed, has a positive slope in the main-scanning direction, a case is considered in which the distribution of the readings of the reference chart, which are read, is the distribution of the positive slope as illustrated in FIG. 23B. In such a case, in the same image forming apparatus, as illustrated in FIG. 23C, a sheet 532a on which the color detection chart having a uniform density is printed, is also in a positive slope state in the main-scanning direction, and thus, the distribution of the readings of the color detection chart, which are read, also becomes the distribution of the positive slope as illustrated in FIG. 23D.

As described above, in the case of the same apparatus (image forming apparatus), both of the sheet on which the reference chart is printed, and the sheet on which the color detection chart is printed, are conveyed to a reading position through the same route, and thus, it is possible to read the reference chart and the color detection chart in the same reading condition, that is, in the same posture of the sheet. Accordingly, it is possible to suppress the characteristic difference in the main-scanning direction, which occurs due to a difference in the reading state between the reference chart and the color detection chart, as illustrated in FIGS. 20A to 20C, and to perform the color detection with a high accuracy.

Furthermore, in this modification example, a printing sheet to be printed by the image forming apparatus, has been exemplified, but is not limited thereto, and for example, can also be applied to an inspection device to which the object and the reference object are conveyed by a belt conveyor or the like.

Modification Example 2

The image forming apparatus 1 according to Modification Example 2 will be described focusing on a difference from the image forming apparatus 1 according to the embodiment described above. Furthermore, a hardware configuration and a configuration of a functional block of the image forming apparatus 1 according to this modification example are the same as the hardware configuration and the configuration of the functional block of the image forming apparatus 1 according to the embodiment described above.

<Difference at Time of Reading Reference Charts of Different Colors>

FIGS. 24A to 24D are diagrams illustrating a different at the time of reading the yellow reference chart and a magenta reference chart.

Figure 24A:
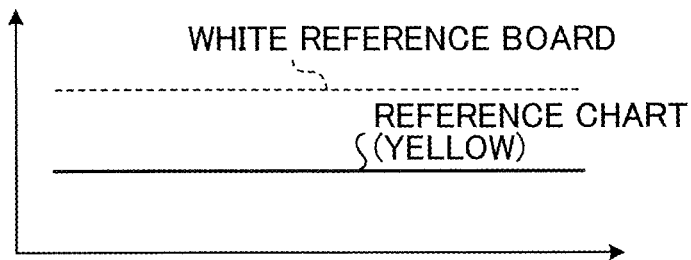
FIGS. 24A to 24D are diagrams illustrating a difference at the time of reading the yellow reference chart and a magenta reference chart.
Figure 24B:
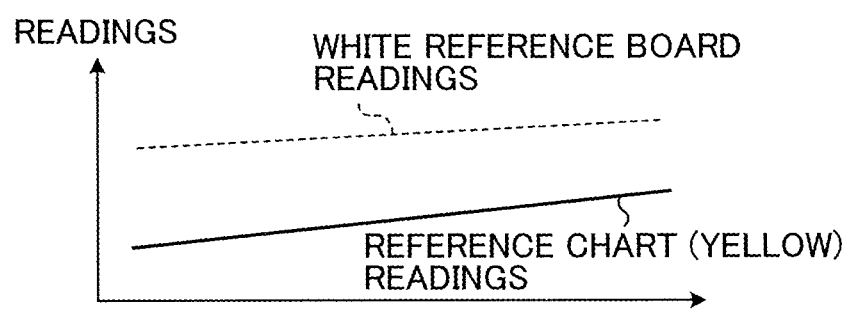
Figure 24C:
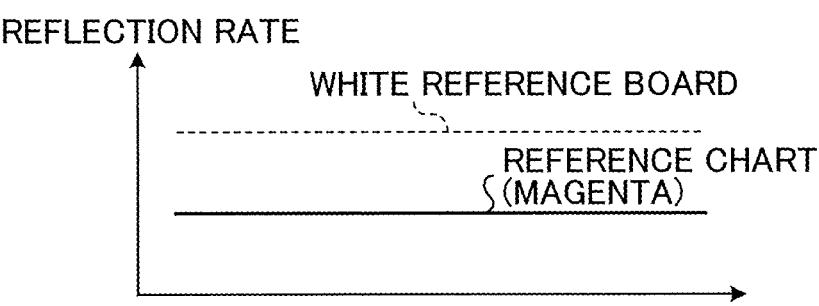
Figure 24D:
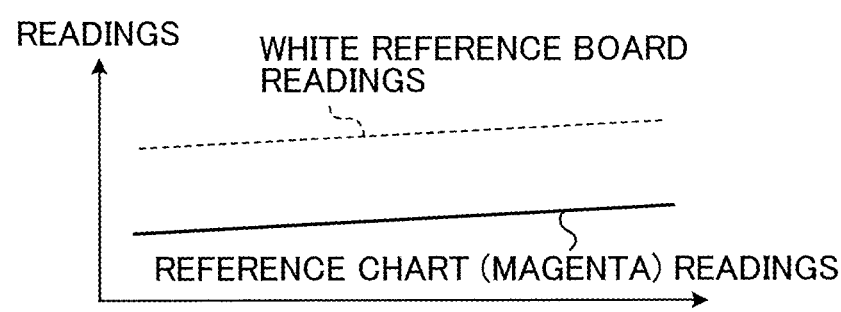

For example, there is a variation in the spectral characteristics of the LED, as illustrated in FIG. 16 described above. In addition, as illustrated in FIGS. 24A and 24C, the distributions of the reflection rates of the white reference board, the yellow reference chart, and the magenta reference chart, are each flat, that is, the density is uniform in the main-scanning direction. In such a case, as illustrated in FIG. 24B, readings of blue (B) of the yellow reference chart are changed at a rate larger than a change rate of readings of blue (B) of the white reference board. On the other hand, as illustrated in FIG. 24D, readings of blue (B) of the magenta reference chart is changed at the same rate as the change rate of the readings of blue (B) of the white reference board. For this reason, an optimal correction coefficient used at the time of performing yellow color detection, is different from an optimal correction coefficient used at the time of performing magenta color detection, and thus, in the case of using the same correction coefficient at the time of performing the color detection of each of yellow and magenta, a detection accuracy is degraded.

<Correction Coefficient Generating Processing for Each Color>

Figure 25A:
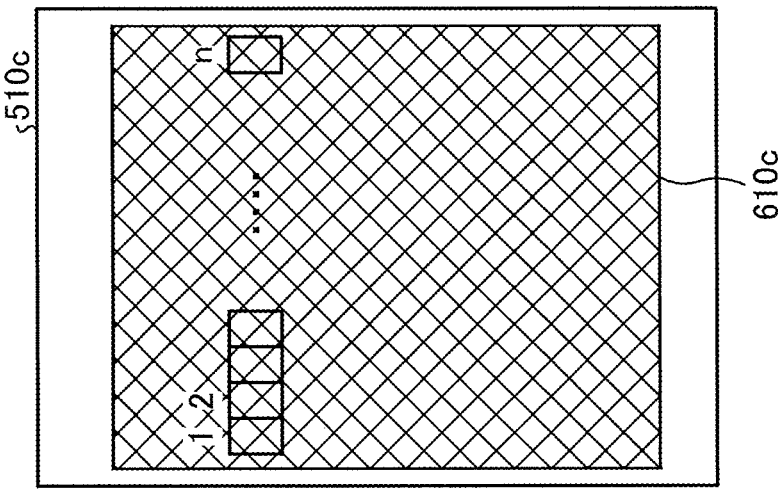
FIGS. 25A to 25C are diagrams illustrating an example of a reading point and a color measurement point in a reference chart of each color.
Figure 25B:
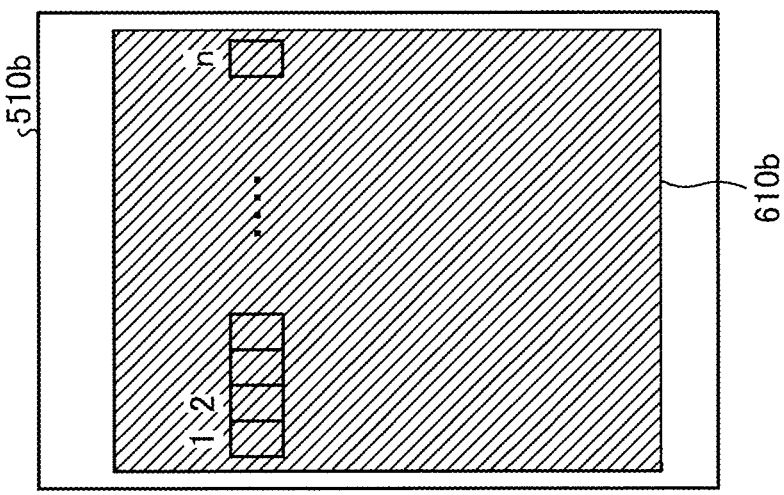
Figure 25C:
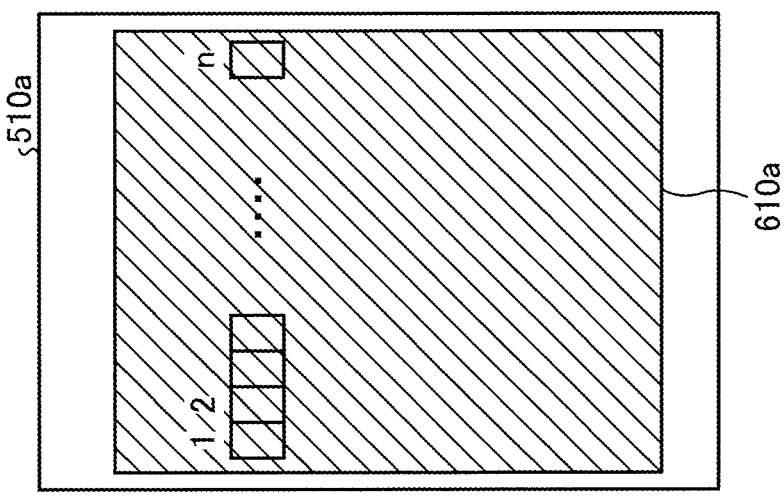
Figure 26:
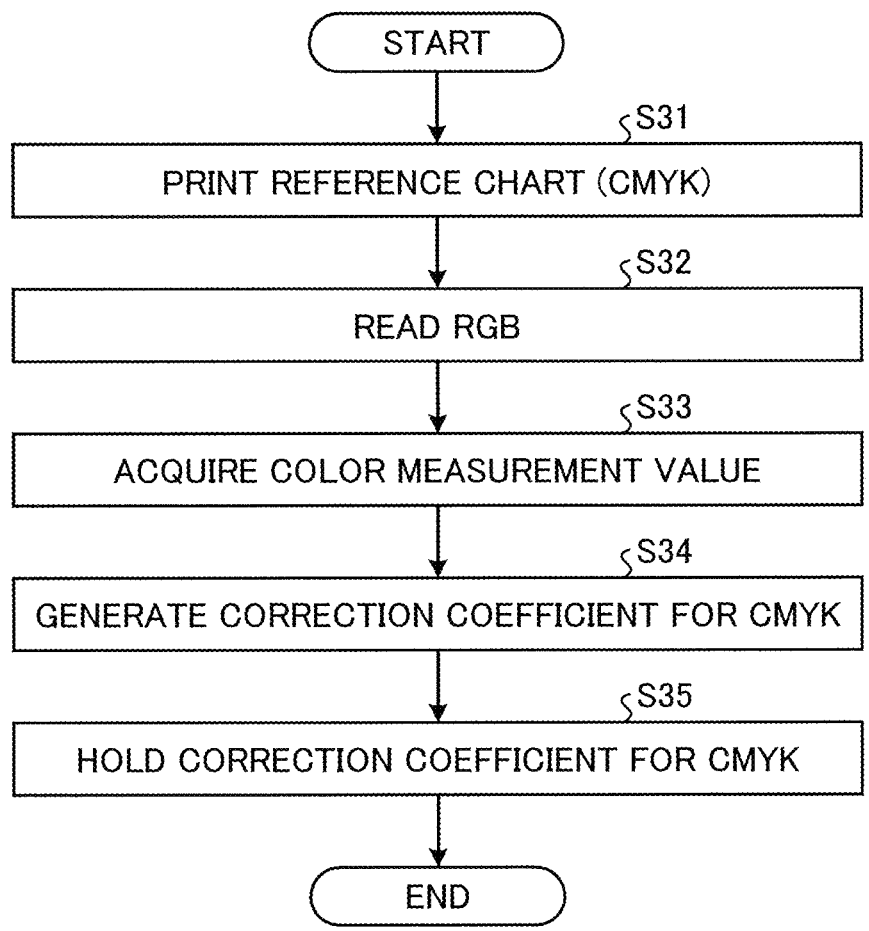
FIG. 26 is a flowchart illustrating an example a flow of correction coefficient generating processing in Modification Example 2.

FIGS. 25A to 25C are diagrams illustrating an example of a reading point and a color measurement point in a reference chart of each color. FIG. 26 is a flowchart illustrating an example of a flow of correction coefficient generating processing in Modification Example 2. The correction coefficient generating processing for each color in this modification example will be described with reference to FIGS. 25A to 25C and FIG. 26.

<<Step S31>>

The image forming apparatus 1 prints a reference chart of each color (CMYK) on a sheet, in order to generate the correction coefficient for each color. For example, as illustrated in FIG. 12 and FIGS. 25A to 25C described above, the image forming apparatus 1 prints the yellow reference chart 610 on the sheet 510, prints a cyan reference chart 610a on a sheet 510a (refer to FIG. 25A), prints a magenta reference chart 610b on a sheet 510b (refer to FIG. 25B), and then, prints a black reference chart 610c on a sheet 510c (refer to FIG. 25C). Then, the process proceeds to step S32.

<<Step S32>>

The reading unit 301 of the color inspection device 300 reads the reference charts of each of the colors, printed by the image forming apparatus 1, and obtains the RGB values of each of the colors. For example, as illustrated in FIG. 12 and FIGS. 25A to 25C described above, the reading unit 301 performs reading at each of the points 1, 2, . . . , n−1, and n, in the main-scanning direction on the reference charts of each of the colors, and obtains the readings (the RGB values) at each of the points (regions).

The signal processing unit 302 of the color inspection device 300 performs the shading correction with respect to the image data (the RGB values) of the reference charts of each of the colors read by the reading unit 301, and outputs the RGB values after the shading correction, to the readings holding unit 313 of the correction coefficient generating unit 310. The readings holding unit 313 acquires the RGB values after the shading correction, and holds the RGB values, with respect to each of the colors. Then, the process proceeds to step S33.

<<Step S33>>

The color information acquiring unit 311 of the correction coefficient generating unit 310 acquires the color information (the color measurement values) (for example, the L*a*b* values) measured by the colorimeter or the like at each of the points (1 to n) in the reference charts of each of the colors, which are printed and output by the image forming apparatus 1. The color information holding unit 312 of the correction coefficient generating unit 310 holds the color information acquired by the color information acquiring unit 311, with respect to the reference charts of each of the colors. Then, the process proceeds to step S34.

<<Step S34>>

The correction coefficient calculating unit 314 of the correction coefficient generating unit 310 calculates the correction coefficient for each of the colors (CMYK), from the color information held by the color information holding unit 312, and the RGB values (the readings) of the reference chart after the shading correction, held by the readings holding unit 313. The calculation method of the correction coefficient is the same as the method described in FIGS. 13A to 13D. Then, the process proceeds to step S35.

<<Step S35>>

The correction coefficient calculating unit 314 outputs the calculated correction coefficient for each of the colors (CMYK), to the correcting unit 303 of the color inspection device 300. The correcting unit 303 holds the correction coefficient for each of the colors (CMYK), in order to perform the correction processing at the time of performing the color detection operation with respect to each of the colors. The correcting unit 303, for example, may hold the correction coefficient in the storing unit 321. Then, the correction coefficient generating processing is ended.

The correction coefficient generating processing for each of the colors is performed according to the flow illustrated in steps S31 to S35 described above.

Furthermore, in FIGS. 25A to 25C and FIG. 26, it has been described that the readings in the main-scanning direction are corrected, as an example, but the correction is not limited thereto, and for example, the correction can also be applied to the correcting in the sub-scanning direction. In addition, it has been described that the correction coefficient calculating unit 314 calculates the correction coefficient by using the readings (the RGB values), and the L*a*b* values as an example of the color measurement value, but the calculation is not limited thereto, and the correction coefficient may be calculated by using the color information of the color specification system other than the L*a*b* values, or the density information, and the readings (the RGB values).

<Color Detection Operation for Each Color of Color Inspection Device>

Figure 27:
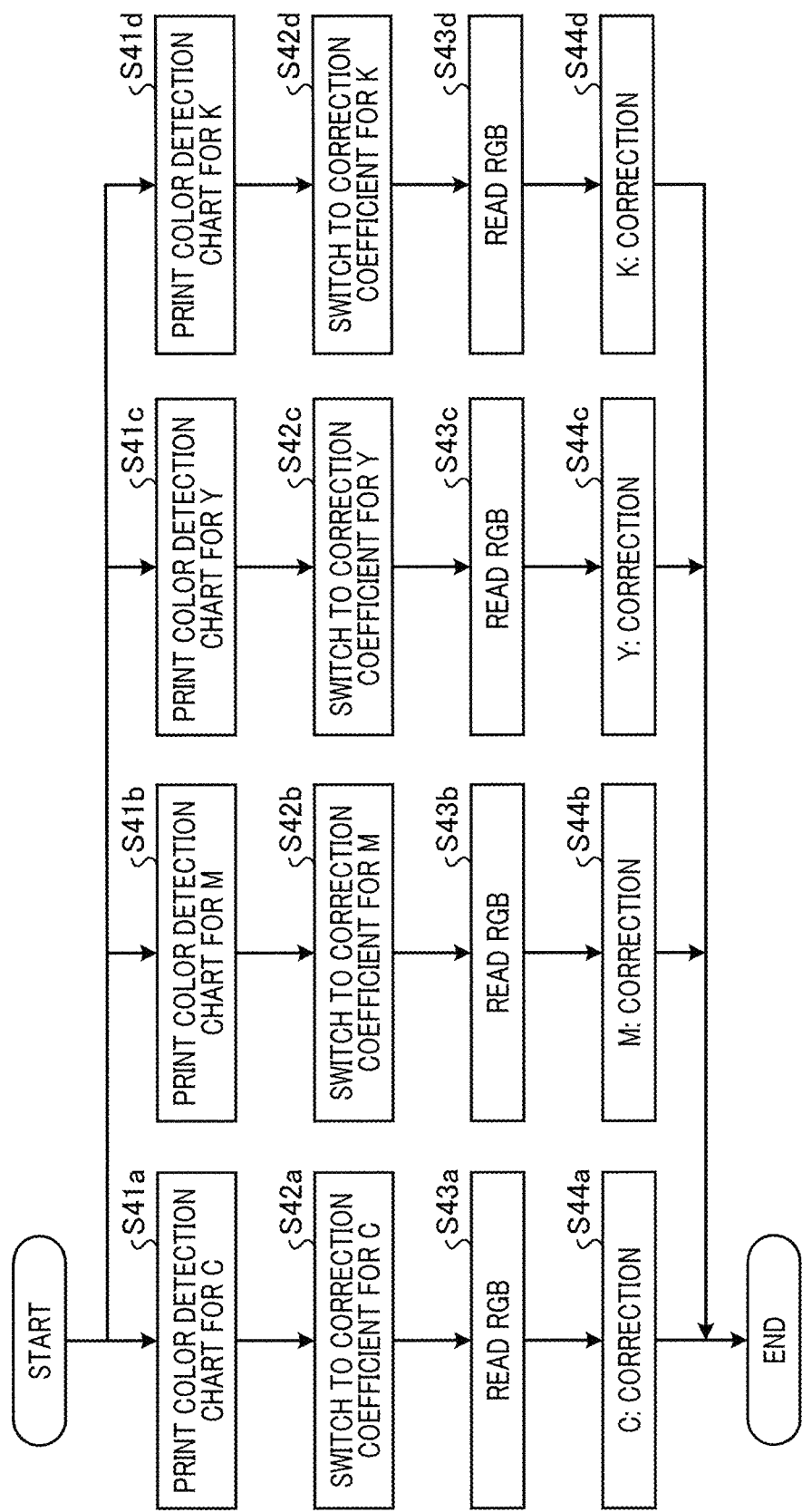
FIG. 27 is a flowchart illustrating an example of a flow of a color detection operation of a color inspection device according to Modification Example 2.

FIG. 27 is a flowchart illustrating an example of a flow of a color detection operation of a color inspection device according to Modification Example 2. The color detection operation for each of the colors of the color inspection device 300 according to this modification example will be described with reference to FIG. 27.

<<Steps S41a to S41d>>

The image forming apparatus 1 prints a color detection chart of a specific color on a sheet, in order to perform the color detection operation. In a case where the printed color detection chart is a cyan (C) chart, steps S42a to S44a are executed. In a case where the printed color detection chart is a magenta (M) chart, steps S42b to S44b are executed. In a case where the printed color detection chart is a yellow (Y) chart, steps S42c to S44c are executed. In a case where the printed color detection chart is a black (K) chart, steps S42d to S44d are executed.

<<Steps S42a to S42d>>

The correcting unit 303 of the color inspection device 300 switches the correction coefficient corresponding to the color of the color detection chart printed by the image forming apparatus 1. Specifically, in a case where the color of the printed color detection chart is cyan (C), the correcting unit 303 switches the correction coefficient to a correction coefficient for cyan (C). In addition, in a case where the color of the printed color detection chart is magenta (M), the correcting unit 303 switches the correction coefficient to a correction coefficient for magenta (M). In addition, in a case where the color of the printed color detection chart is yellow (Y), the correcting unit 303 switches the correction coefficient to a correction coefficient for yellow (Y). In addition, in a case where the color of the printed color detection chart is black (Y), the correcting unit 303 switches the correction coefficient to a correction coefficient for black (K). Then, the process proceeds to steps S43a to S43d.

<<Steps S43a to S43d>>

The reading unit 301 of the color inspection device 300 reads the color detection charts of each of the colors, printed by the image forming apparatus 1, and obtains the RGB values. For example, as with the reference chart as illustrated in FIG. 12 and FIGS. 25A to 25C, the reading unit 301 performs reading at each of the points 1, 2, . . . , n−1, and n, in the main-scanning direction on the color detection charts of each of the colors, and obtains the readings (the RGB values) at each of the points (regions).

The signal processing unit 302 of the color inspection device 300 performs the shading correction with respect to the image data (the RGB values) of the color detection charts of each of the colors, read by the reading unit 301, and outputs the RGB values after the shading correction, to the correcting unit 303. Then, the process proceeds to steps S44a to S44d.

<<Steps S44a to S44d>>

The correcting unit 303 of the color inspection device 300 corrects the readings (the RGB values) subjected to the signal processing (the shading correction or the like) by the signal processing unit 302, by using the correction coefficient corresponding to the color of the color detection chart, in the correction coefficients for each of the colors (CMYK), which are generated by the correction coefficient generating unit 310 and are held. The correcting unit 303 outputs the corrected readings (RGB values) to the latter stage side (for example, the density converting unit 320). Then, the color detection operation is ended.

The color detection operation for each of the colors is performed by the color inspection device 300, according to the flow illustrated in steps S41a (S41b to S41d) to S44a (S44b to S44d) described above.

As described above, the correction coefficient is switched to the correction coefficients for each of the colors (CMYK) corresponding to the color of the correction image (the color detection chart) to be printed, at the time of performing the color detection operation, and thus, it is possible to perform an optimal color detection according to the color of the printing image, and to improve a color detection accuracy.

Modification Example 3

The image forming apparatus 1 according to Modification Example 3 will be described focusing on a difference from the image forming apparatus 1 according to the embodiment described above. Furthermore, a hardware configuration and a configuration of a functional block of the image forming apparatus 1 according to this modification example are the same as the hardware configuration and the configuration of the functional block of the image forming apparatus 1 according to the embodiment described above.

<Configuration of Reading Device>

Figure 28:
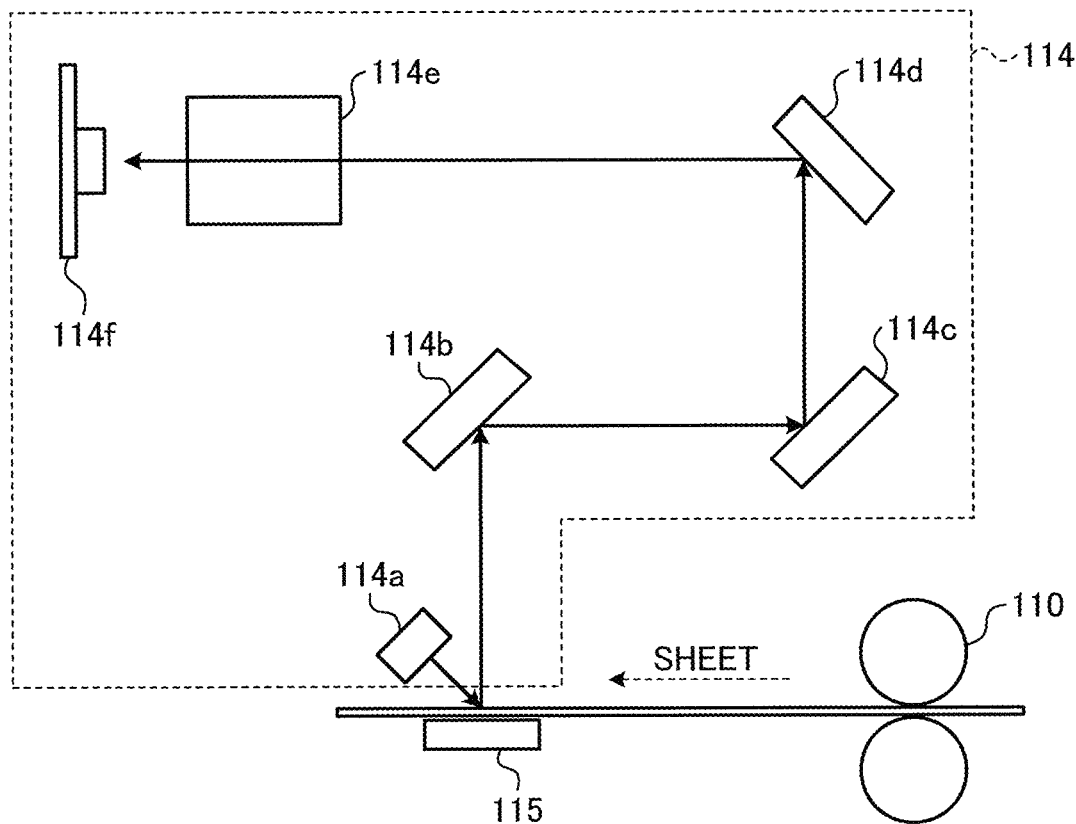
FIG. 28 is a diagram illustrating an example of a configuration of a reading device of an image forming apparatus according to Modification Example 3.

FIG. 28 is a diagram illustrating an example of a configuration of a reading device of an image forming apparatus according to Modification Example 3. An example of the configuration of the reading device 114 will be described with reference to FIG. 28.

As illustrated in FIG. 28, the reading device 114 includes a light source 114a, mirrors 114b to 114d, a lens 114e, and a sensor 114f.

The light source 114a is a light source irradiating the sheet or the white reference board 115 with light by the LED. The mirrors 114b to 114d are a reflection member that guides light emitted from the light source 114a and reflected on the sheet or the white reference board 115, to the lens 114e while further reflecting the light. The lens 114e is an optical member that condenses the incident light, and guides the light to the sensor 114f. The sensor 114f is a line sensor that detects the light condensed by the lens 114e, and converts the light to the RGB values.

In such a configuration of the reading device 114, for example, a color filter of the sensor 114f, and a spectral characteristic difference of the light source 114a in the main-scanning direction, are strictly different for each apparatus. Further, an assembled state of the white reference board 115 for performing the shading correction with respect to the image data read by the sensor 114f, is also different for each of the apparatuses.

<Correction Coefficient Generating Processing for Each Apparatus>

Figure 29A:
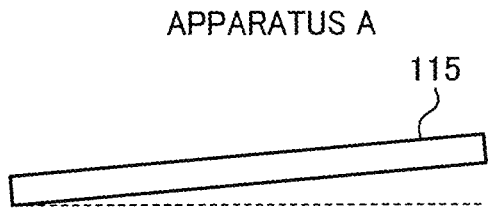
FIGS. 29A and 29B are diagrams illustrating a difference in an assembled state of a white reference board for each apparatus.
Figure 29B:
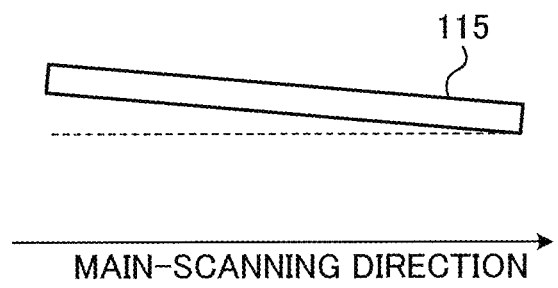
Figure 30:
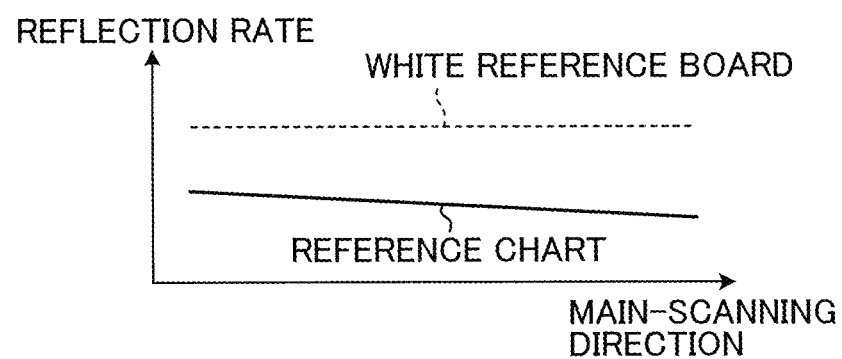
FIG. 30 is a diagram illustrating an example of a reflection rate of the white reference board and the reference chart.
Figure 31A:
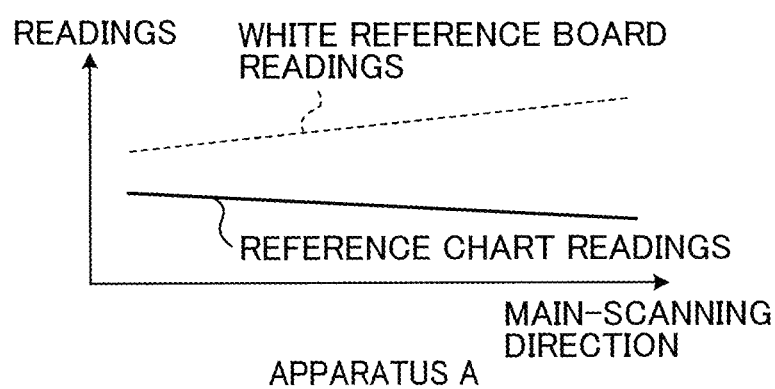
FIGS. 31A and 31B are diagrams illustrating an example of readings of the white reference board and the reference chart for each apparatus.
Figure 31B:
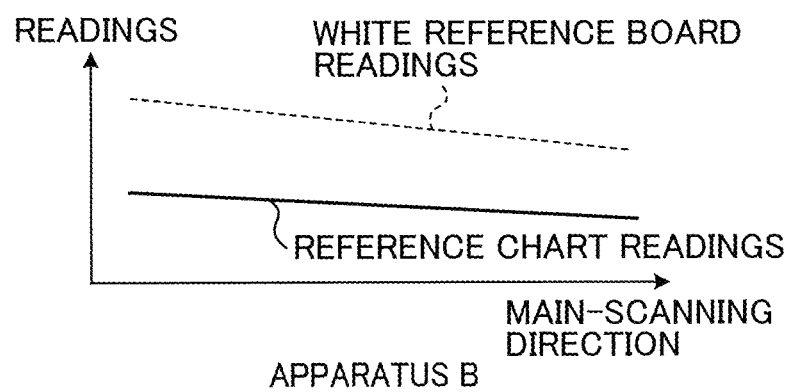
Figure 32A:
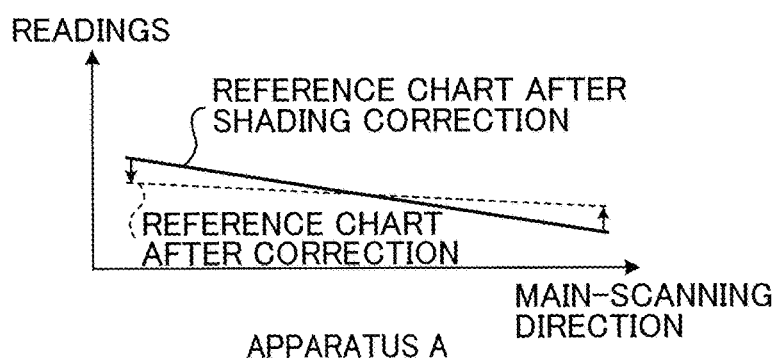
FIGS. 32A and 32B are diagrams illustrating an example of a value after correction with respect to readings for each apparatus.
Figure 32B:
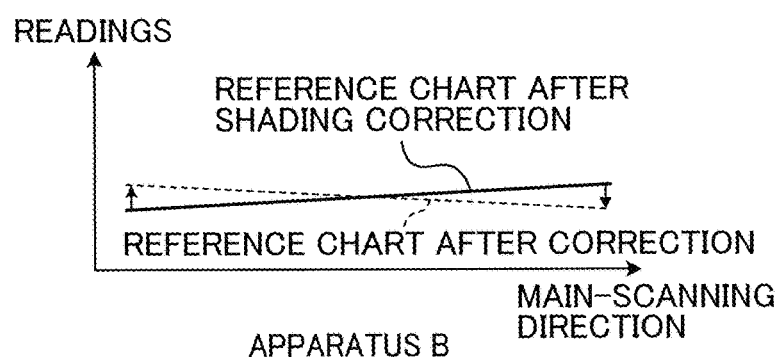
Figure 33A:
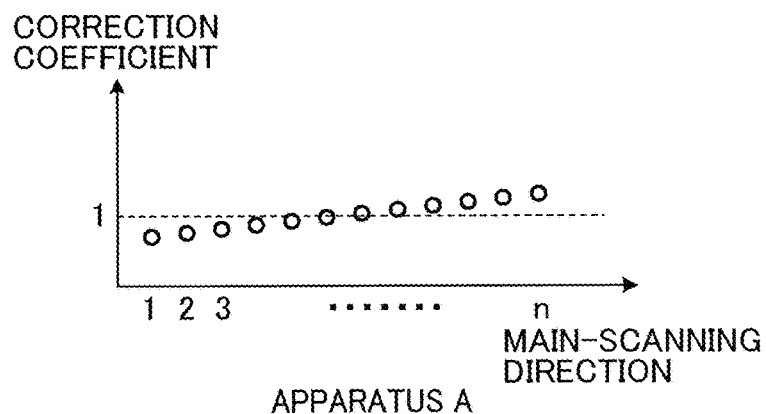
FIGS. 33A and 33B are diagrams illustrating an example of a correction coefficient generated for each apparatus.
Figure 33B:
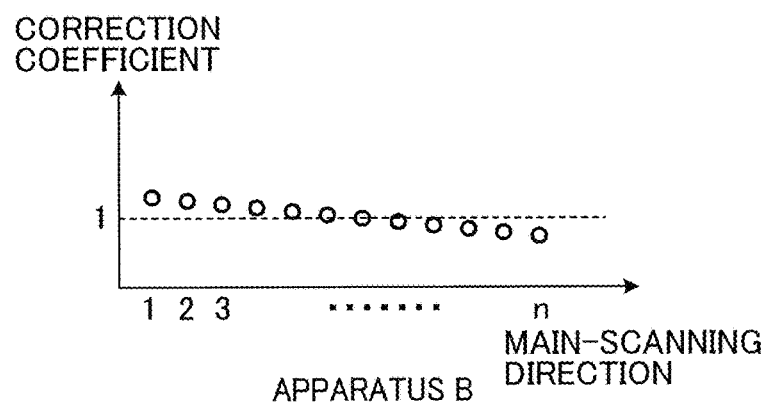

FIGS. 29A and 29B are diagrams illustrating a difference in the assembled state of the white reference board for each of the apparatuses. FIG. 30 is a diagram illustrating an example of the reflection rate of the white reference board and the reference chart. FIGS. 31A and 31B are diagrams illustrating an example of the readings of the white reference board and the reference chart for each of the apparatuses. FIGS. 32A and 32B are diagrams illustrating an example of a value after the correction with respect to the readings for each of the apparatuses. FIGS. 33A and 33B are diagrams illustrating an example of the correction coefficient generated for each of the apparatuses. The correction coefficient generating processing for each of the apparatuses in this modification example, will be described with reference to FIGS. 29A to 33B.

For example, as illustrated in FIG. 29A, in a certain image forming apparatus 1 (referred to as an apparatus A), the white reference board 115 is assembled such that the white reference board 115 is inclined with a positive slope, and as illustrated in FIG. 29B, in another image forming apparatus 1 (referred to as an apparatus B), the white reference board 115 is assembled such that the white reference board 115 is inclined with a negative slope. Then, the distribution of the reflection rate in the main-scanning direction of each of the white reference board 115 assembled in the apparatuses A and B, and the reference chart for generating the correction coefficient, is a distribution illustrated in FIG. 30.

In the case of reading the white reference board 115 and the reference chart, having such a distribution of the reflection rate, the distribution of the readings in the main-scanning direction becomes a distribution illustrated in FIG. 31A in the apparatus A, and becomes a distribution illustrated in FIG. 31B, in the apparatus B. Then, the distribution after the shading correction with respect to the readings of the reference chart, becomes a distribution illustrated in FIG. 32A, in the apparatus A, and becomes a distribution illustrates in FIG. 32B, in the apparatus B. The correction coefficient to be generated in order to correct the distribution to the same distribution as the distribution (FIG. 30) of the reflection rate of the original reference chart, is a different coefficient as obvious from FIGS. 32A and 32B.

Therefore, the correction coefficient generating processing illustrated in FIGS. 13A to 13D described above, is performed in each of the apparatuses (the apparatuses A and B). Accordingly, as illustrated in FIGS. 33A and 33B, it is possible to generate an optimal correction coefficient for each of the apparatuses (the apparatuses A and B), and to perform the color detection with a high accuracy.

Modification Example 4

An image forming apparatus according to Modification Example 4 will be described focusing on a difference from the image forming apparatus 1 according to the embodiment described above. Furthermore, a hardware configuration of the image forming apparatus according to this modification example is the same as the hardware configuration of the image forming apparatus 1 according to the embodiment described above.

<Density Dependency of Spectral Reflection Intensity of Reference Chart>

Figure 34:
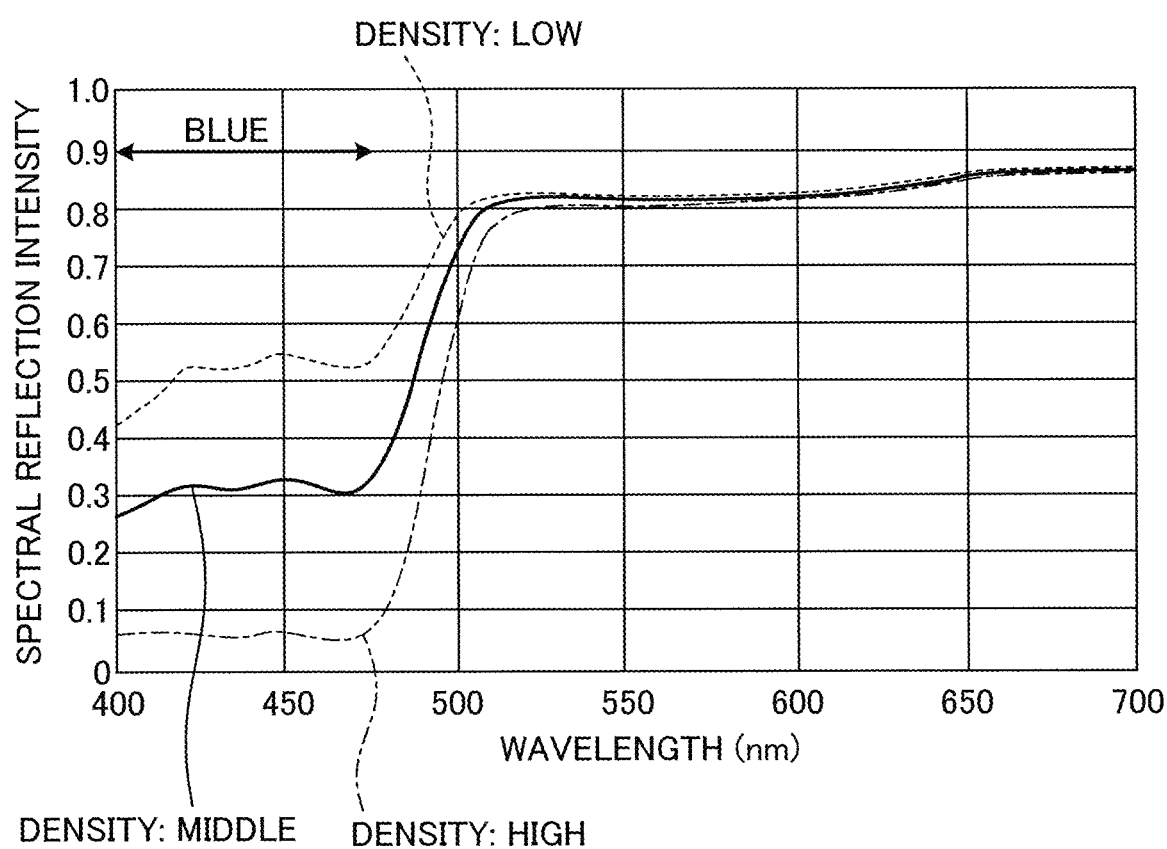
FIG. 34 is a diagram illustrating a difference according to a density of a spectral reflection intensity of the reference chart.

FIG. 34 is a diagram illustrating a difference according to a density of a spectral reflection intensity of the reference chart. The density dependency of the spectral reflection intensity (a spectral reflection rate) will be described with reference to FIG. 34 by using the yellow reference chart as an example.

FIG. 34 illustrates a change in the spectral reflection rate of the reference chart in a case where a yellow density is converted in three steps. As illustrated in FIG. 34, it is possible to grasp that reflection rate characteristics of a blue wavelength band are greatly changed from a high density to a low density. It is indicated that a blue color that is a complementary color, sensitively reacts with a change in the yellow density, and in the case of accurately detecting a change in the blue color, it is possible to detect the change in the yellow density.

Therefore, in this modification example, a correction coefficient for yellow color detection is generated by using the readings of blue (B) that is a complementary color, similarly, a correction coefficient for magenta color detection is generated by using the readings of green (G) that is a complementary color, and a correction coefficient for cyan color detection is generated by using the readings of red (R) that is a complementary color. In addition, in a correction coefficient for black color detection, there is no large difference in the case of selecting which color of RGB, but here, the correction coefficient is generated by using the readings of green (G) having a wide sensitivity range in a visible light range. That is, a color most sensitively changing with respect to a density change of the color material printed by the image forming apparatus 1, is selected form RGB, and the correction coefficient is generated.

<Functional Block Configuration of Main Part of Image Forming Apparatus>

Figure 35:
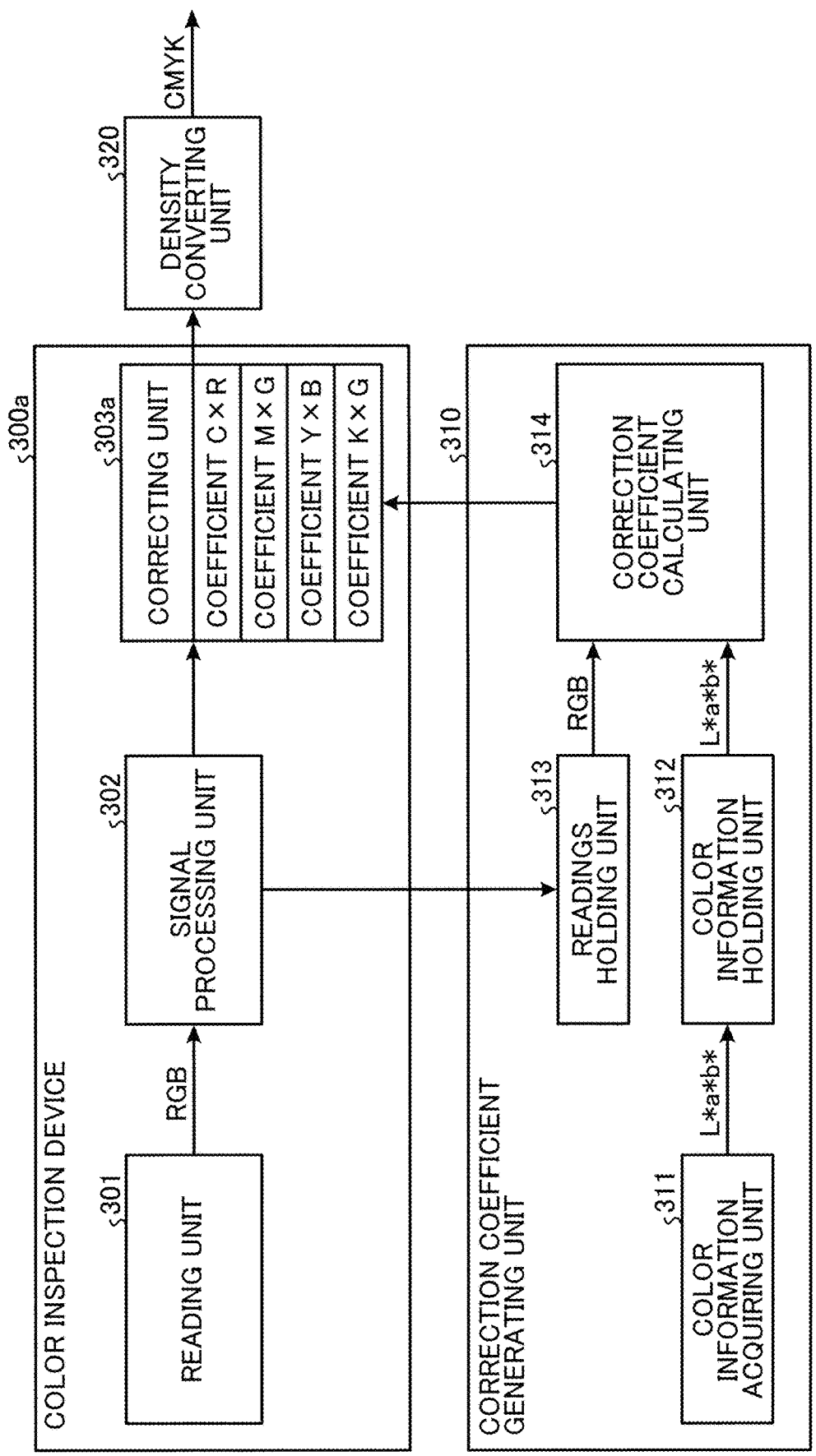
FIG. 35 is a diagram illustrating an example of a configuration of a functional block of a main part of an image forming apparatus according to Modification Example 4.

FIG. 35 is a diagram illustrating an example of a configuration of a functional block of a main part of the image forming apparatus according to Modification Example 4. The configuration of the functional block of the main part of the image forming apparatus according to this modification example will be described with reference to FIG. 35.

The image forming apparatus according to this modification example includes a color inspection device 300a instead of the color inspection device 300, in the functional block configuration of the image forming apparatus 1 illustrated in FIG. 9 described above.

As illustrated in FIG. 35, the correction coefficient generating unit 310 has the same configuration as the configuration of the functional block of the correction coefficient generating unit 310 illustrated in FIG. 10 described above. However, the correction coefficient calculating unit 314 calculates the correction coefficient for color detection of the color of the reference chart, by using readings of a color that is a complementary color, in the readings (the RGB values) held by the readings holding unit 313, according to the color of the reference chart. Specifically, in a case where the reference chart of yellow (Y) is used, the correction coefficient calculating unit 314 calculates a correction coefficient (Y×B) for yellow color detection, from the color information held by the color information holding unit 312, and the readings of blue (B), held by the readings holding unit 313.

In addition, in a case where the reference chart of magenta (M) is used, the correction coefficient calculating unit 314 calculates a correction coefficient (M×G) for magenta color detection, from color information held by the color information holding unit 312, and the readings of green (G), held by the readings holding unit 313. In addition, in a case where the reference chart of cyan (C) is used, the correction coefficient calculating unit 314 calculates a correction coefficient (C×R) for cyan color detection, from the color information held by the color information holding unit 312, and the readings of red (R), held by the readings holding unit 313. Then, in a case where the reference chart of black (K) is used, the correction coefficient calculating unit 314 calculates a correction coefficient (K×G) for black color detection, from the color information held by the color information holding unit 312, and the readings of green (G), held by the readings holding unit 313. The correction coefficient calculating unit 314 outputs the calculated correction coefficient to the correcting unit 303a (described below) of the color inspection device 300a.

As illustrated in FIG. 35, the color inspection device 300a includes the reading unit 301, the signal processing unit 302, and the correcting unit 303a. Among them, the operation of the reading unit 301 and the signal processing unit 302 is the same as the operation described in FIG. 10.

The correcting unit 303a holds the correction coefficient for the correction processing at the time of performing the color detection operation. Specifically, the correcting unit 303a holds four correction coefficients of the correction coefficient (Y×B) for color detection of yellow (Y), the correction coefficient (M×G) for color detection of magenta (M), the correction coefficient (C×R) for color detection of cyan (C), and the correction coefficient (K×G) for color detection of black (K). Therefore, it is sufficient to hold four correction coefficients as described above rather than generating and holding 12 correction coefficients of CMYK× RGB, and thus, it is possible to reduce memory capacity.

Modification Example 5

An image forming apparatus according to Modification Example 5 will be described focusing on a difference from the image forming apparatus 1 according to the embodiment described above. Furthermore, a hardware configuration of the image forming apparatus according to this modification example is the same as the hardware configuration of the image forming apparatus 1 according to the embodiment described above.

<Change in Sheet Posture According to Sheet Type>

Figure 36A:
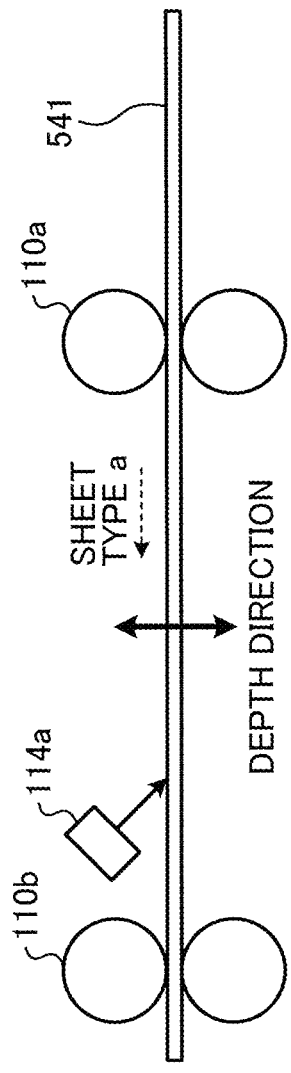
FIGS. 36A and 36B are diagrams illustrating an example of a change in a sheet posture according to a sheet type.
Figure 36B:
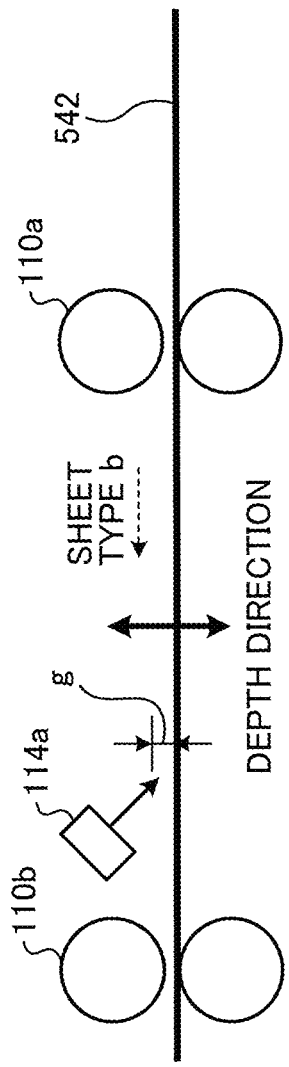
Figure 37A:
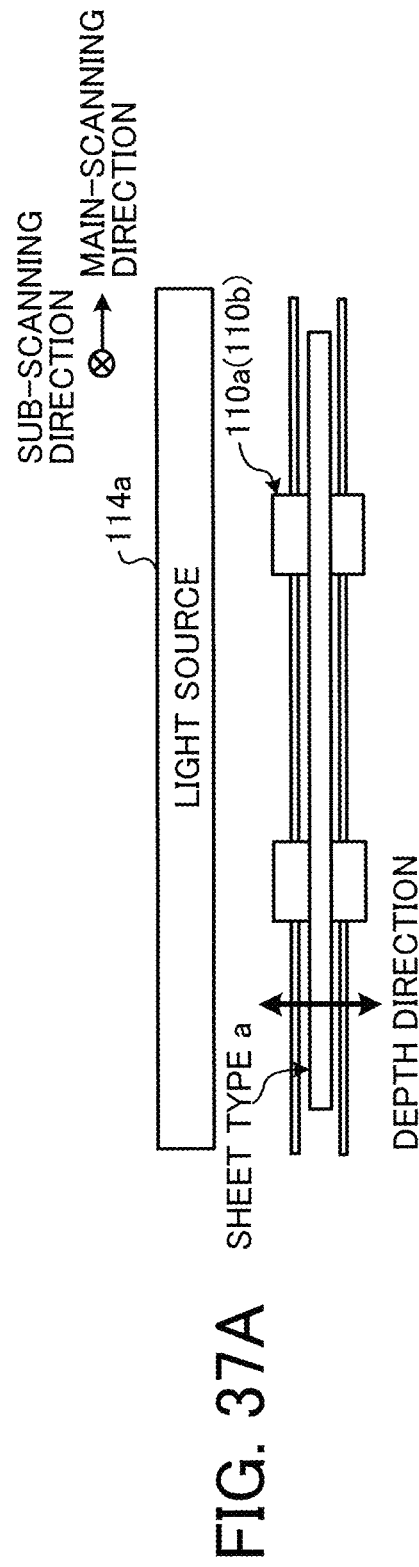
FIGS. 37A and 37B are diagrams illustrating a fluctuation in the sheet posture according to bending.
Figure 37B:
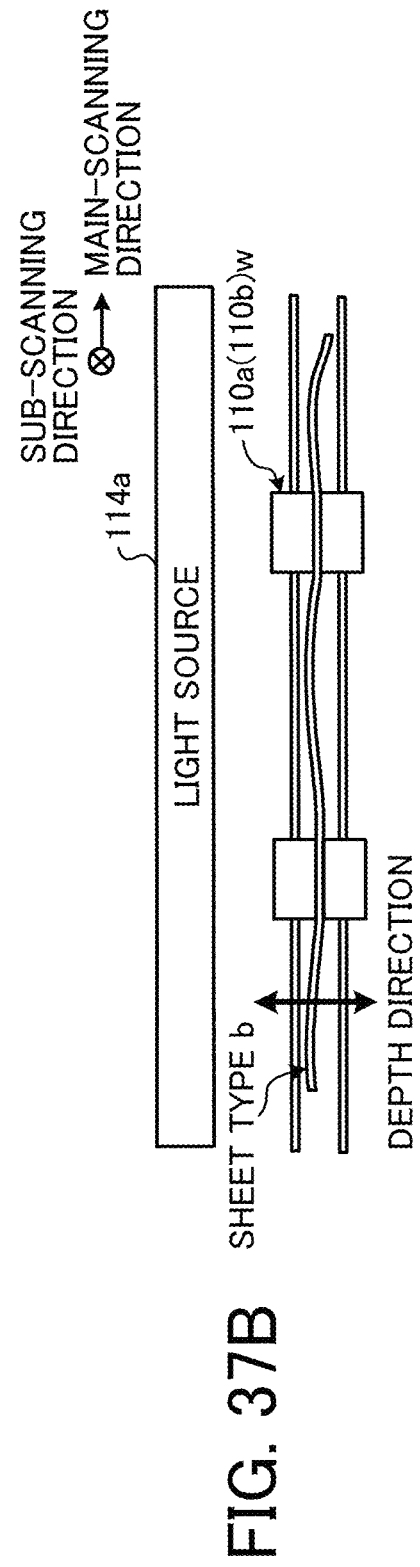
Figure 38:
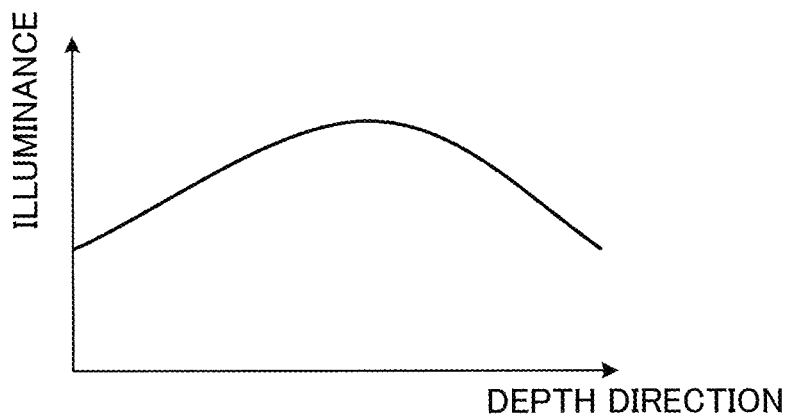
FIG. 38 is a diagram illustrating an example of illuminance characteristics of a light source.
Figure 39A:
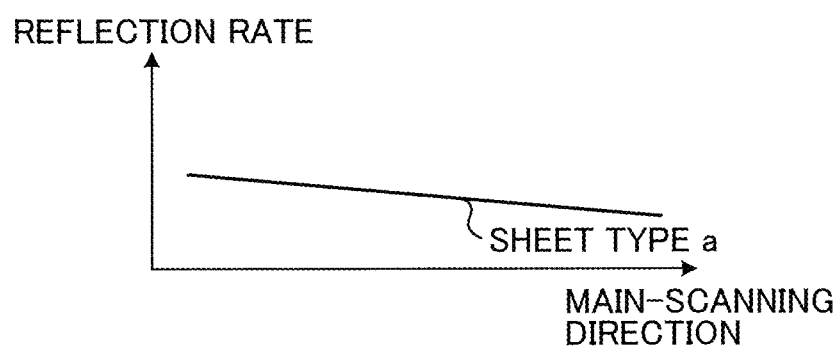
FIGS. 39A and 39B are diagrams illustrating a reading error according to the sheet type.
Figure 39B:
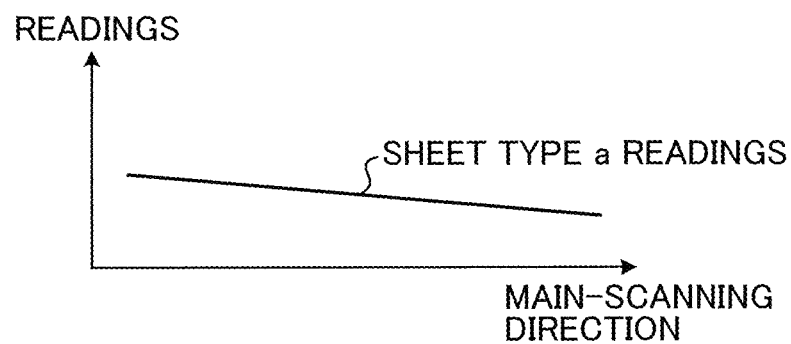
Figure 40A:
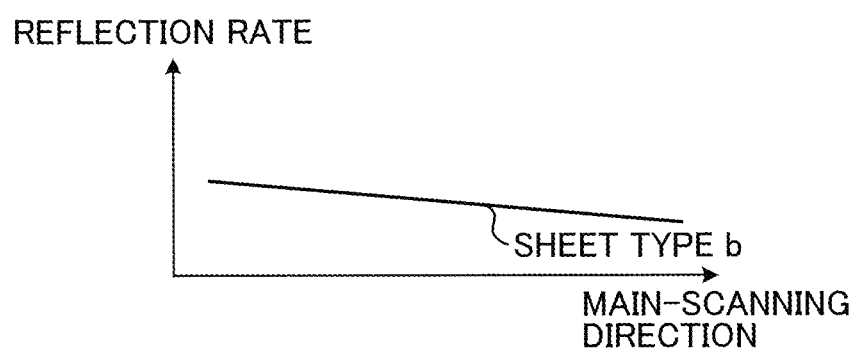
FIGS. 40A and 40B are diagrams illustrating the reading error according to the sheet type.
Figure 40B:
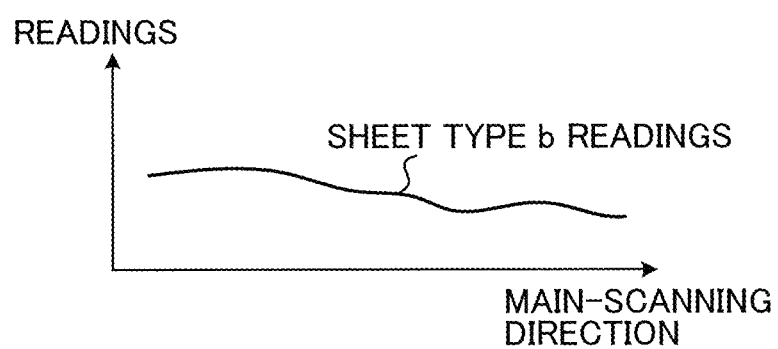

FIGS. 36A and 36B are diagrams illustrating an example of a change in a sheet posture according to a sheet type. FIGS. 37A and 37B are diagrams illustrating a fluctuation in the sheet posture due to bending. FIG. 38 is a diagram illustrating an example of illuminance characteristics of the light source. FIGS. 39A and 39B are diagrams illustrating a reading error according to the sheet type. FIGS. 40A and 40B are diagrams illustrating the reading error according to the sheet type. A change in the sheet posture according to the sheet type will be described with reference to FIGS. 36A to 40B.

FIG. 36A illustrates a behavior at the time of conveying a sheet 541 of a sheet type a, which is a thick sheet, and FIG. 36B illustrates a behavior at the time of conveying a sheet 542 of a sheet type b, which is a thin sheet. In addition, as illustrated in FIGS. 36A and 36B, a distance in a depth direction until the light emitted from the light source 114a reaches the front surface of the sheet, is different according to the thickness of the sheet (in the example of FIGS. 36A and 36B, the distance in the depth direction in the sheet 542 that is the sheet type b, is longer than the distance in the sheet 541 by a gap g), and as illustrated in FIG. 38, the illuminance of the light of the light source 114a is changed in the depth direction. Further, as illustrated in FIGS. 37A and 37B, in the sheet 542 of the sheet type b, which is the thin sheet, the sheet posture is easily changed due to the bending of the sheet, compared to the sheet 541 of the sheet type a, which is the thick sheet. Thus, in a case where the posture of the sheet is changed, a reading height (depth) is changed in each position in the main-scanning direction, and readings in each of the positions are changed due to the influence of the illuminance characteristics (FIG. 38) with respect to the depth of the light source 114a.

For example, in the sheet 541 of the sheet type a, which is the thick sheet, in which the posture is rarely changed, it is possible to obtain the readings in the distribution as illustrated in FIG. 39B, according to the distribution of the reflection rate, illustrated in FIG. 39A. On the other hand, in the sheet 542 of the sheet type b, which is the thin sheet, in which the posture is easily changed, as illustrated in FIG. 40B, the readings are changed in each of the positions in the main-scanning direction, with respect to the distribution of the reflection rate, illustrated in FIG. 40A. That is, an optimal correction coefficient for correcting the readings is different between the thick sheet of the sheet type a, and the thin sheet of the sheet type b. Therefore, in this modification example, various correction coefficients are generated according to the sheet type (for example, a general sheet, a thick sheet, a thin sheet, a color sheet, and the like). In such a case, a functional block configuration of this modification example will be described below.

<Functional Block Configuration of Main Part of Image Forming Apparatus>

Figure 41:
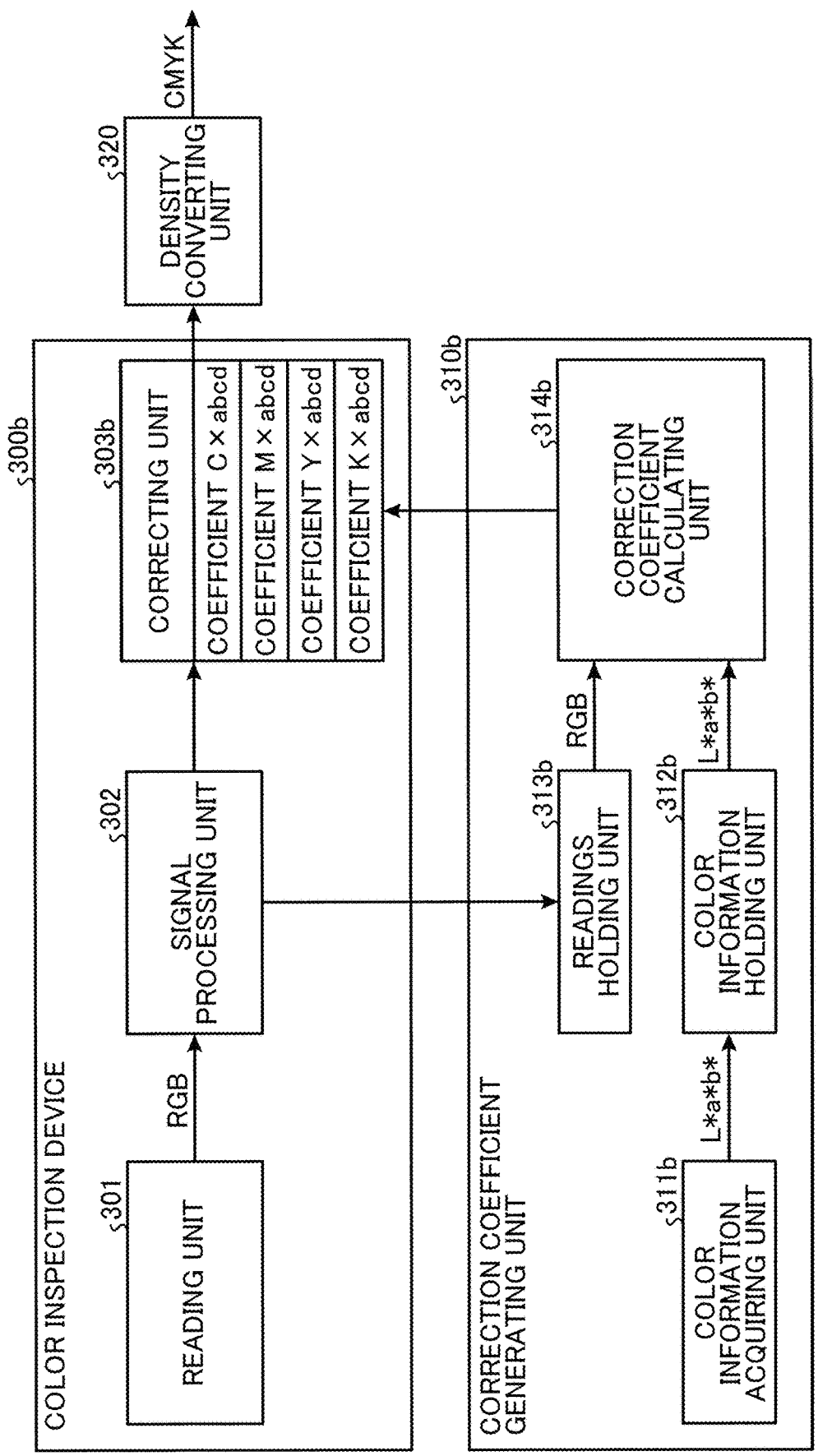
FIG. 41 is a diagram illustrating an example of a configuration of a functional block of a main part of an image forming apparatus according to Modification Example 5.

FIG. 41 is a diagram illustrating an example of a configuration of a functional block of a main part of the image forming apparatus according to Modification Example 5. The configuration of the functional block of the main part of the image forming apparatus according to this modification example will be described with reference to FIG. 41.

In the functional block configuration of the image forming apparatus 1 illustrated in FIG. 9 described above, the image forming apparatus according to this modification example includes a color inspection device 300b instead of the color inspection device 300, and includes a correction coefficient generating unit 310b (a generating unit) instead of the correction coefficient generating unit 310.

As illustrated in FIG. 41, the correction coefficient generating unit 310b includes a color information acquiring unit 311b, a color information holding unit 312b, a readings holding unit 313b, and a correction coefficient calculating unit 314b.

The color information acquiring unit 311b is a function unit that acquires the color information (for example, the L*a*b* values) measured with respect to the color of the reference chart by the colorimeter or the like for each arbitrary region, for each of the sheet types. The color information acquiring unit 311b, for example, is implemented by the program executed by the CPU of the information processing device described above, or the like.

The color information holding unit 312b is a function unit that holds the color information for each of the sheet types, acquired by the color information acquiring unit 311b. The color information holding unit 312b, for example, is implemented by the storage device of the information processing device described above.

The readings holding unit 313b is a function unit that acquires the RGB values subjected to the signal processing by the signal processing unit 302 of the color inspection device 300b, for each of the sheet types, and holds the RGB values. The readings holding unit 313b, for example, is implemented by the storage device of the information processing device described above.

The correction coefficient calculating unit 314b is a function unit that calculates the correction coefficient for each of the sheet types (for example, the sheet types a to d), from the color information held by the color information holding unit 312b, and the readings (subjected to the shading correction) of the reference chart, held by the readings holding unit 313. The correction coefficient calculating unit 314b outputs the calculated correction coefficient for each of the sheet types, to the correcting unit 303b of the color inspection device 300b. The correction coefficient calculating unit 314b is implemented by the program executed by the CPU of the information processing device described above, or the like.

As illustrated in FIG. 41, the color inspection device 300b includes the reading unit 301, the signal processing unit 302, and the correcting unit 303b. Among them, the operation of the reading unit 301 and the signal processing unit 302 is the same as the operation described in FIG. 10.

The correcting unit 303b holds the correction coefficient for each of the sheet types, in order for the correction processing at the time of performing the color detection operation. Specifically, for example, in the case of the sheet types a to d, a correction coefficient (C×abcd) for each of the sheet types for color detection of yellow (Y), a correction coefficient (M×abcd) for each of the sheet types for color detection of magenta (M), a correction coefficient (C×abcd) for each of the sheet types for color detection of cyan (C), and a correction coefficient (K×abcd) for each of the sheet types for color detection of black (K), are held.

As described above, in this modification example, a plurality of types of correction coefficients for each of the sheet types is held in the correcting unit 303b, and the correction coefficient is switched according to the sheet type. Thus, various correction coefficients are held according to the sheet type (for example, a general sheet, a thick sheet, a thin sheet, a color sheet, and the like), and the color detection is performed by using an optimal correction coefficient according to the sheet type, and thus, it is possible to improve a color detection accuracy.

Modification Example 6

An image forming apparatus according to Modification Example 6 will be described focusing on a difference from the image forming apparatus 1 according to the embodiment described above. Furthermore, a hardware configuration and a configuration of a functional block of the image forming apparatus 1 according to this modification example are the same as the hardware configuration and the configuration of the functional block of the image forming apparatus 1 according to the embodiment described above.

Figure 42:
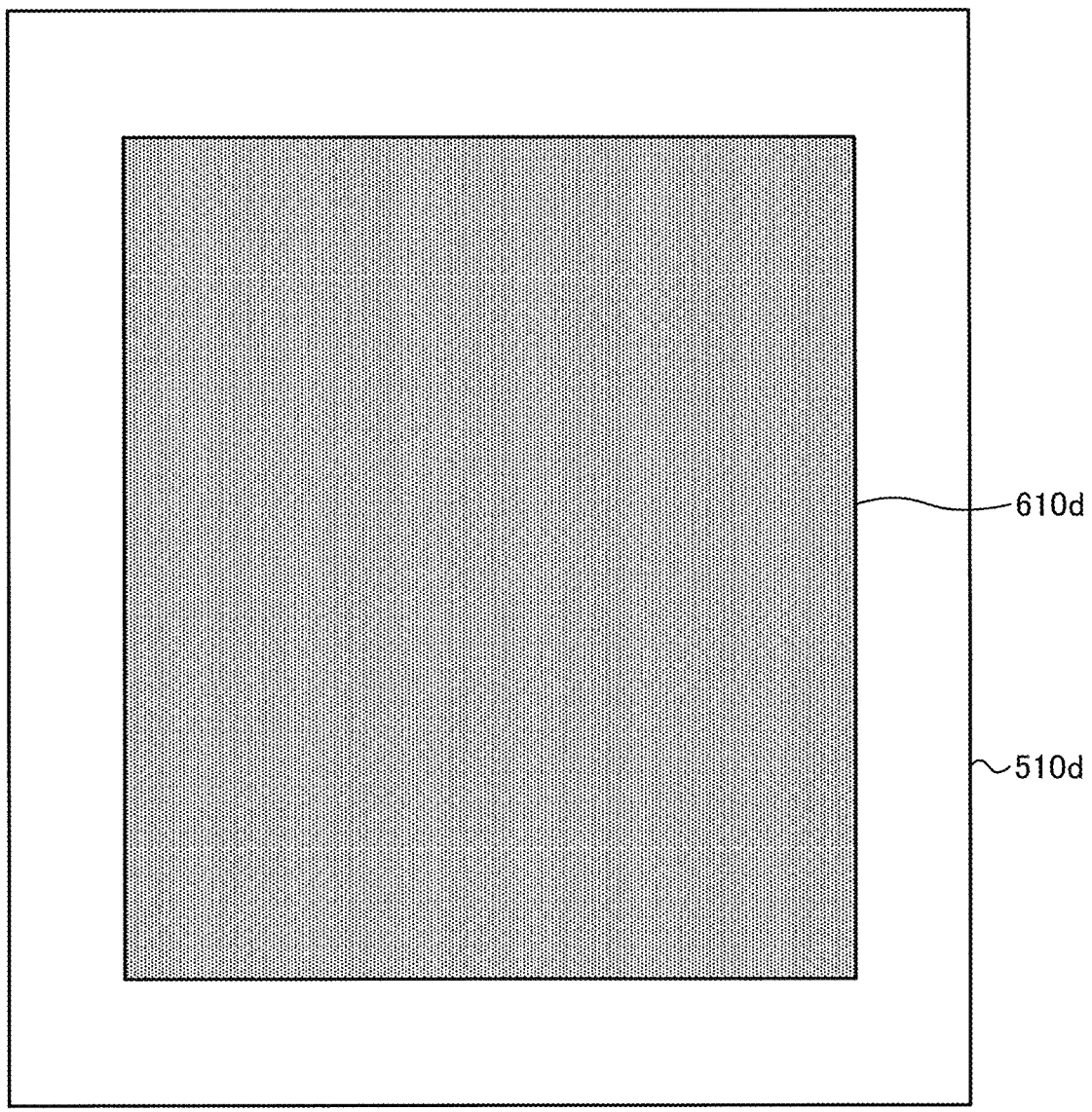
FIG. 42 is a diagram illustrating an example of a color detection chart of a mixed color.
Figure 43A:
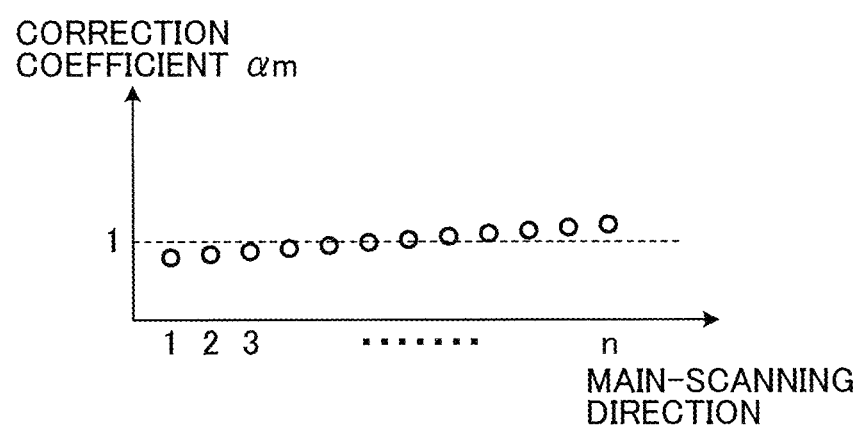
FIGS. 43A to 43C are diagrams illustrating synthesis of a correction coefficient in Modification Example 6.
Figure 43B:
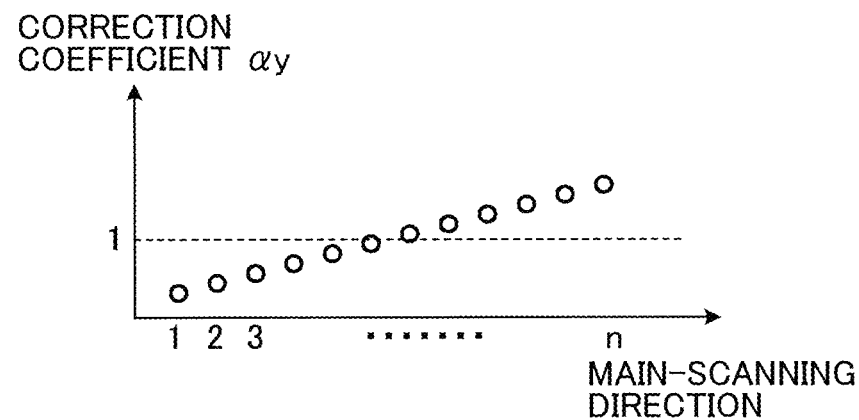
Figure 43C:
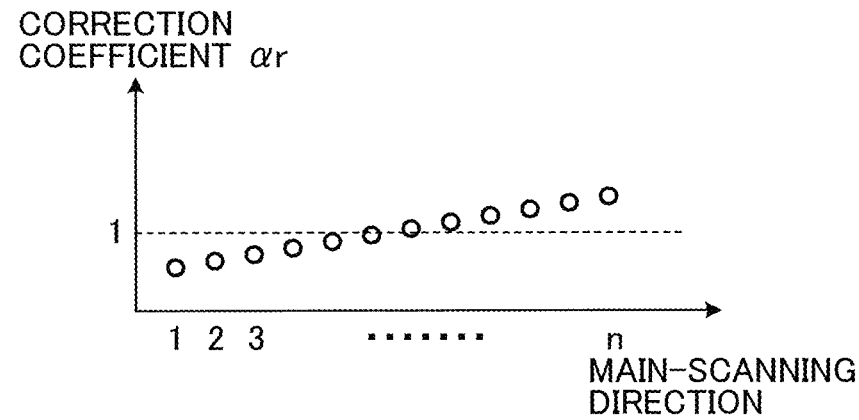

FIG. 42 is a diagram illustrating an example of a color detection chart of a mixed color. FIGS. 43A to 43C are diagrams illustrating the synthesis of the correction coefficient in Modification Example 6. The synthesis of the correction coefficient in this modification example will be described with reference to FIG. 42 and FIGS. 43A to 43C.

In the embodiment and the modification examples described above, the color detection operation of a single color of CMYK has been described, the correction coefficient corresponding to each of the colors is synthesized according to a color mixture ratio of CMYK, and thus, it is possible to execute the color detection operation. For example, as illustrated in FIG. 42, a case is considered in which the color detection operation is performed by using a sheet 510d on which a color detection chart 610d of red (R) formed by mixing 50% each of magenta (M) and yellow (Y), is printed. Here, in an operation in which the color detection chart 610d is printed on the sheet 510d, the correcting unit 303 is capable of recognizing in advance the mixture ratio of the colors of the color detection chart 610d, and as described above, recognizes that the color detection chart 610d is a chart of red (R) formed by mixing 50% each of magenta (M) and yellow (Y). Then, the correcting unit 303 executes the color detection operation by using a correction coefficient $\alpha r$ for red (R), illustrated in FIG. 43C, in which 50% of a correction coefficient $\alpha m$ for magenta (M), illustrated in FIG. 43A, and 50% of the correction coefficient $\alpha y$ for yellow (Y), illustrated in FIG. 43B, are synthesized.

Similarly, in a case where the color of the color detection chart is green (G), the correcting unit 303 synthesizes the correction coefficient for yellow (Y) and the correction coefficient for cyan (C), according to the mixture ratio. In addition, in a case where the color of the color detection chart is blue (B), the correcting unit 303 synthesizes the correction coefficient for magenta (M) and the correction coefficient for cyan (C), according to the mixture ratio.

As described above, the correction coefficient is synthesized according to the mixture ratio of the colors of the object to be a target of the color detection operation, and thus, it is possible to improve a color detection accuracy of the mixed color.

Modification Example 7

An image forming apparatus according to Modification Example 7 will be described focusing on a difference from the image forming apparatus 1 according to the embodiment described above. Furthermore, a hardware configuration and a configuration of a functional block of the image forming apparatus 1 according to this modification example are the same as the hardware configuration and the configuration of the functional block of the image forming apparatus 1 according to the embodiment described above.

<Fluttering of Sheet>

FIGS. 44A to 44C are diagrams illustrating the fluttering of the sheet. The fluttering of the sheet to be conveyed will be described with reference to FIGS. 44A to 44C.

In the color detection operation of the printing image (the color detection chart), as illustrated in FIG. 1 described above, the reading device 114 reading the printing image, is provided on the latter stage of the fixing conveyor 110 of the image forming apparatus 1, but is on a route until an image forming operation (a printing operation) is ended, and the sheet is conveyed to a sheet discharge tray, and thus, there are many cases where conveyance performance is unstable, compared to other parts.

For example, as illustrated in FIGS. 44A and 44B, during a period until both of the conveyance roller on the upstream and the conveyance roller on the downstream nip the sheet, the posture of the sheet is bent, and in a case where the sheet read by the reading device 114, including the bent portion, the readings include the influence of the posture change of the sheet, and thus, a color detection accuracy is degraded.

On the other hand, as illustrated in FIG. 44C, during a period in which both of the conveyance roller on the upstream and the conveyance roller on the downstream nip the sheet, the posture of the sheet is stabilized, and thus, it is possible to perform the color detection with a high accuracy.

<Effective Reading Range of Sheet>

Figure 46:
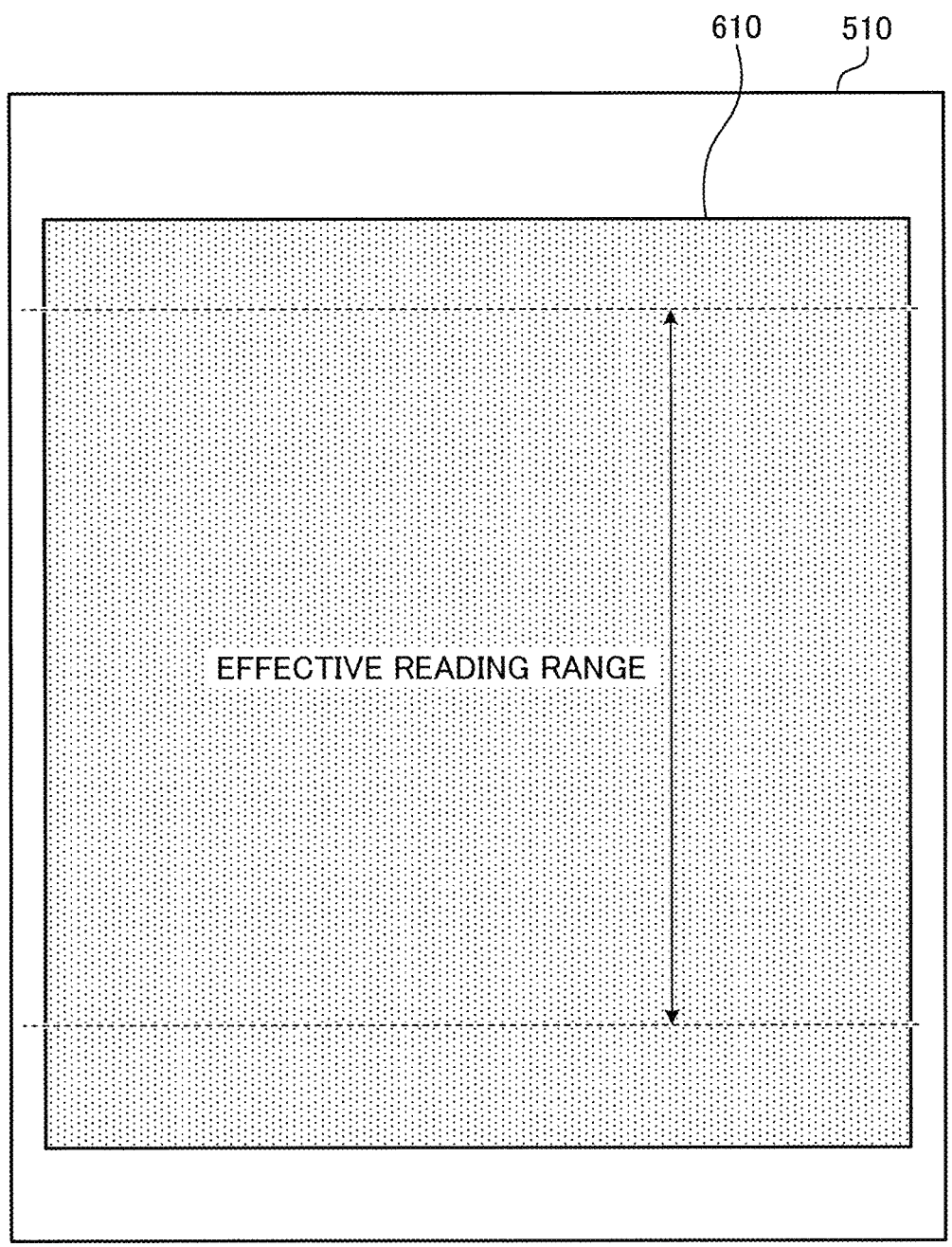
FIG. 46 is a diagram illustrating an effective reading range in the reference chart.

FIGS. 45A and 45B are diagrams illustrating a start position and an end position for reading of the sheet in Modification Example 7. FIG. 46 is a diagram illustrating an effective reading range in the reference chart. The effective reading range of the sheet will be described with reference to FIGS. 45A and 45B and FIG. 46.

In this modification example, the reading unit 301 (the reading device 114) performs reading in a region (the effective reading range) after the nipping of a sheet 550 by the conveyance roller 110b on the downstream side in the reading position is started, as illustrated in FIG. 45A, until the nipping of the sheet 550 by the conveyance roller 110a on the upstream side in the reading position is ended, as illustrated in FIG. 45B. Specifically, in a case where the reference chart 610 is printed on the sheet 510, as illustrated in FIG. 46, the effective reading range is a range indicated by an arrow within a dotted line. Furthermore, in the reading with respect to the color detection chart in addition to the reference chart, the same effective reading range is set. In addition, the effective reading range illustrated in FIGS. 45A and 45B, indicates the maximum range, but is not limited thereto, and may be a range in which the reading is performed in a state where both of the conveyance roller 110a and the conveyance roller 110b nip the sheet.

As described above, the reading is performed in a range (the effective reading range) in which the posture of the sheet is stabilized, such as a state in which both of the conveyance roller 110a and the conveyance roller 110b nip the sheet, and thus, it is possible to perform the color detection with a high accuracy.

Modification Example 8

An image forming apparatus according to Modification Example 8 will be described focusing on a difference from the image forming apparatus 1 according to the embodiment described above. Furthermore, a hardware configuration of the image forming apparatus according to this modification example is the same as the hardware configuration of the image forming apparatus 1 according to the embodiment described above.

Figure 47:
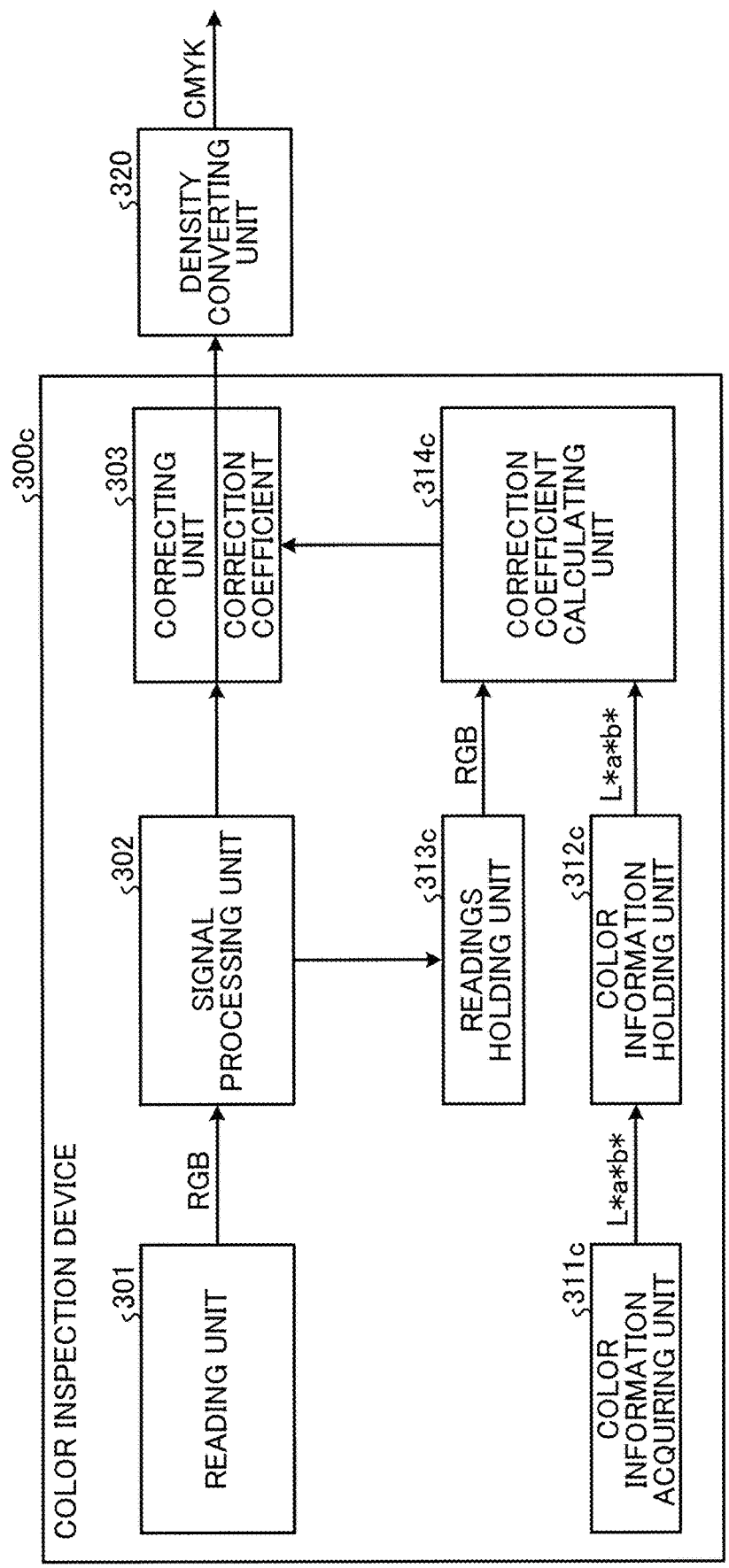
FIG. 47 is a diagram illustrating an example of a configuration of a functional block of a main part of an image forming apparatus according to Modification Example 8.

FIG. 47 is a diagram illustrating an example of a configuration of a functional block of a main part of the image forming apparatus according to Modification Example 8. As illustrated in FIG. 47, the configuration of the functional block of the main part of the image forming apparatus according to this modification example will be described.

A color inspection device 300c according to this modification example includes the constituent of the correction coefficient generating unit 310 illustrated in FIG. 10 described above, inside the color inspection device 300c, not outside the image forming apparatus 1. Specifically, as illustrated in FIG. 47, the color inspection device 300c includes a color information acquiring unit 311c that acquires the color information measured with respect to the color of the reference chart for each arbitrary region, a color information holding unit 312c that holds the acquired color information, a readings holding unit 313c that acquires the RGB values subjected to the signal processing by the signal processing unit 302, and holds the RGB values, and a correction coefficient calculating unit 314c that calculates the correction coefficient from the color information and the readings of the reference chart.

As described above, the color inspection device 300c includes the constituent of the correction coefficient generating unit 310 illustrated in FIG. 10 described above, inside, and thus, it is possible to automatically execute the correction coefficient generating processing performed by the constituent of the correction coefficient generating unit 310, in the image forming apparatus according to this modification example. Accordingly, for example, even in a case where the characteristics of the reading device 114 are changed over time, it is possible to newly generate and switch an optimal correction coefficient. In addition, even in the case of using a new sheet type, it is possible to generate an optimal correction coefficient according to the sheet type, and thus, it is possible to improve a color detection accuracy.

Furthermore, in the embodiment and each of the modification examples described above, in a case where at least any one of each of the function units of the image forming apparatus and the color inspection devices 300a to 300c, is implemented by executing a program, the program is provided by being incorporated in advance in the ROM or the like. In addition, in the embodiment and each of the modification examples described above, the program executed by the image forming apparatus and the color inspection devices 300a to 300c, is recorded in a computer-readable recording medium such as a compact disc read only memory (CD-ROM), a flexible disk (FD), a compact disk-recordable (CD-R), or a digital versatile disc (DVD), as a file in an installable format or an executable format, and thus, is provided. In addition, in the embodiment and each of the modification examples described above, the program executed by the image forming apparatus and the color inspection devices 300a to 300c, is stored on a computer connected to a network such as the Internet, and is downloaded through the network, and thus, is provided. In addition, in the embodiment and each of the modification examples described above, the program executed by the image forming apparatus and the color inspection devices 300a to 300c, may be provided or distributed through the network such as the Internet. In addition, in the embodiment and each of the modification examples described above, the program executed by the image forming apparatus and the color inspection devices 300a to 300c has a module configuration including at least any one of each of the function units described above, and as the actual hardware, the CPU 201 reads the program from the storage device (for example, the system memory 202, the auxiliary memory 208, or the like) described above, and executes the program, and thus, each of the function units described above is loaded on a main storage device, and is generated.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A color inspection device, comprising:
    a reading device to image a reference object and a color detection object to obtain readings at pixels of the reference object and at pixels of the color detection object; and
    circuitry configured to
        acquire color information obtained by measuring, using a device other than the reading device, color values at the pixels of the reference object, and
        correct the readings of the color detection object by using a plurality of correction coefficients that are generated by the circuitry from the readings of the reference object, and the color information, so that, when printed, a printed image of the color detection object is color corrected,
    wherein the circuitry is further configured to generate the plurality of correction coefficients by (1) fitting a straight line or curve to a plurality of points representing the obtained readings at the pixels of the reference object plotted against the measured color values at the pixels of the reference object, and (2) adjusting the obtained reading at each point of the plurality of points so that each of the adjusted points is on the straight line or curve.

2. The color inspection device according to claim 1, wherein the circuitry is further configured to correct the readings of the color detection object by using the generated plurality of correction coefficients such that a distribution of values obtained by correcting the readings of the reference object is identical to a distribution of the color information.

3. The color inspection device according to claim 1, wherein the circuitry is further configured to generate the plurality of correction coefficients, which includes a coefficient for correcting the readings of the color detection object, so that the readings are positioned on the straight line or curve, which is derived from a color difference between a predetermined color and a color indicated by the color information measured for the pixels of the reference object, and the readings of the reference object.

4. The color inspection device according to claim 3, wherein the circuitry is further configured to generate the plurality of correction coefficients using the predetermined color, which is ideal white or ideal black.

5. The color inspection device according to claim 1, wherein the reading device images the reference object and the color detection object using a same reading condition.

6. The color inspection device according to claim 1, wherein the circuitry is further configured to correct the readings of the color detection object by using the plurality of correction coefficients, which correspond to a color of the color detection object, among sets of correction coefficients separately generated for different colors of the reference object.

7. The color inspection device according to claim 6, wherein the circuitry is further configured to synthesize, according to a mixture ratio of colors of the color detection object, the sets of correction coefficients separately generated for the different colors of the reference object, to create a synthesized correction coefficient and correct the readings of the color detection object by using the synthesized correction coefficient.

8. The color inspection device according to claim 1, wherein the circuitry is further configured to correct the readings of the color detection object by using the plurality of correction coefficients, which are generated for each color inspection device.

9. The color inspection device according to claim 1, wherein the circuitry is further configured to correct the readings of the color detection object by using the plurality of correction coefficients, which are generated from a reading of a color most sensitively changing with respect to a density change in a color of the reference object, among the readings of the reference object.

10. The color inspection device according to claim 1, wherein the circuitry is further configured to correct the readings of the color detection object by using the plurality of correction coefficients, which correspond to a type of a medium on which the color detection object is formed, among sets of correction coefficients generated for each type of a medium on which the reference object is formed.

11. The color inspection device according to claim 1, wherein the reading device images the reference object and the color detection object and obtains the readings of each of the reference object and the color detection object, in a state of being conveyed by both of a first roller on a conveyance path on an upstream side from a reading position of the reading device and a second roller on the conveyance path on a downstream side from the reading position in a direction in which each of the reference object and the color detection object is conveyed.

12. An image forming apparatus comprising:
    the color inspection device according to claim 1; and
    an image forming device to form an image of an object to be imaged by the reading device.

13. The image forming apparatus according to claim 12, wherein the reading device images the reference object and the color detection object on which images are formed by the image forming device.

14. The image forming apparatus according to claim 12, wherein the image forming device adjusts an attachment amount of a color material according to a reading result of the reading device.

15. The image forming apparatus according to claim 14, wherein the image forming device includes a light source to adjust a light intensity for forming an image to adjust the attachment amount of the color material.

16. The color inspection device of claim 1, wherein the circuitry is further configured to acquire the color information by measuring the color values at the pixels of the reference object using a colorimeter.

17. A color inspection method, comprising:
    imaging a reference object and a color detection object to obtain readings at pixels of the reference object and at pixels of the color detection object;
    acquiring color information obtained by measuring, using a device other than the reading device, color values at the pixels of the reference object; and
    correcting the readings of the color detection object by using a plurality of correction coefficients that are generated from the readings of the reference object, and the color information, so that, when printed, a printed image of the color detection object is color corrected,
    wherein the method further comprises generating the plurality of correction coefficients by (1) fitting a straight line or curve to a plurality of points representing the obtained readings at the pixels of the reference object plotted against the measured color values at the pixels of the reference object, and (2) adjusting the obtained reading at each point of the plurality of points so that each of the adjusted points is on the straight line or curve.

18. A non-transitory computer-readable recording medium storing program code for causing a computer to execute a method comprising:
    imaging a reference object and a color detection object to obtain readings at pixels of the reference object and at pixels of the color detection object;
    acquiring color information obtained by measuring, using a device other than the reading device, color values at the pixels of the reference object; and
    correcting the readings of the color detection object by using a plurality of correction coefficients that are generated from the readings of the reference object, and the color information, so that, when printed, a printed image of the color detection object is color corrected,
    wherein the method further comprises generating the plurality of correction coefficients by (1) fitting a straight line or curve to a plurality of points representing the obtained readings at the pixels of the reference object plotted against the measured color values at the pixels of the reference object, and (2) adjusting the obtained reading at each point of the plurality of points so that each of the adjusted points is on the straight line or curve.

* * * * *